United States Patent
Freda et al.

(10) Patent No.: US 10,462,674 B2
(45) Date of Patent: Oct. 29, 2019

(54) METHODS AND APPARATUS FOR SPECTRUM COORDINATION

(71) Applicant: InterDigital Patent Holdings, Inc., Wilmington, DE (US)

(72) Inventors: Martino M. Freda, Laval (CA); Jean-Louis Gauvreau, La Prairie (CA); Mihaela C. Beluri, Jericho, NY (US); Scott Laughlin, Montreal (CA); Pekka Ojanen, Espoo (FI); Amith V. Chincholi, Sunnyvale, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/763,564

(22) PCT Filed: Jan. 28, 2014

(86) PCT No.: PCT/US2014/013344
§ 371 (c)(1),
(2) Date: Jul. 27, 2015

(87) PCT Pub. No.: WO2014/117135
PCT Pub. Date: Jul. 31, 2014

(65) Prior Publication Data
US 2015/0373554 A1 Dec. 24, 2015

Related U.S. Application Data

(60) Provisional application No. 61/757,498, filed on Jan. 28, 2013, provisional application No. 61/811,439, (Continued)

(51) Int. Cl.
*H04W 16/14* (2009.01)
*H04L 5/00* (2006.01)

(52) U.S. Cl.
CPC .......... *H04W 16/14* (2013.01); *H04L 5/0064* (2013.01); *H04L 5/0073* (2013.01)

(58) Field of Classification Search
CPC ..... H04L 5/0064; H04L 5/0073; H04W 16/14
See application file for complete search history.

(56) References Cited

U.S. PATENT DOCUMENTS

| | | | | |
|---|---|---|---|---|
| 5,794,151 A | * | 8/1998 | McDonald | H04W 16/16 454/63 |
| 2009/0209265 A1 | * | 8/2009 | Kwon | H04W 16/14 455/454 |

(Continued)

FOREIGN PATENT DOCUMENTS

| | | |
|---|---|---|
| JP | 2011-061759 A | 3/2011 |
| JP | 2012-521729 A | 9/2012 |

(Continued)

OTHER PUBLICATIONS

3rd Generation Partnership Project (3GPP), R1-092468, "Control Channel of Backhaul Link", TSG-RAN WG1 #57Bis, ZTE, Los Angeles, US, Jun. 29-Jul. 3, 2009, 7 pages.

(Continued)

*Primary Examiner* — Shuwang Liu
*Assistant Examiner* — Gina M McKie
(74) *Attorney, Agent, or Firm* — Condo Roccia Koptiw LLP

(57) ABSTRACT

Methods and apparatus for spectrum coordination are described. A method of spectrum coordination includes a spectrum coordinator receiving a request for shared spectrum from a CRS that the spectrum coordinator supports. The request includes at least one minimum protection requirement. The spectrum coordinator determines protection criteria for the CRS based on the at least one minimum protection requirement received from the CRS. The spectrum coordinator sends the protection criteria for the CRS to (Continued)

a geo-location database for use in assigning shared spectrum to other CRSs that the spectrum coordinator does not support.

19 Claims, 54 Drawing Sheets

Related U.S. Application Data filed on Apr. 12, 2013, provisional application No. 61/829,079, filed on May 30, 2013.

(56) References Cited

U.S. PATENT DOCUMENTS

| | | | |
|---|---|---|---|
| 2009/0298522 A1 | 12/2009 | Chaudhri et al. | |
| 2010/0142454 A1* | 6/2010 | Chang | H04W 16/06 370/329 |
| 2010/0246506 A1 | 9/2010 | Krishnaswamy | |
| 2011/0039495 A1 | 2/2011 | Sawai et al. | |
| 2011/0205941 A1* | 8/2011 | Stanforth | H04W 72/0466 370/280 |
| 2012/0014332 A1* | 1/2012 | Smith | H04W 16/14 370/329 |
| 2012/0120887 A1* | 5/2012 | Deaton | H04W 16/14 370/329 |
| 2012/0188878 A1* | 7/2012 | Simon | H04W 4/06 370/241 |
| 2013/0231124 A1* | 9/2013 | Vrzic | H04W 72/08 455/452.1 |
| 2013/0294415 A1* | 11/2013 | Moilanen | H04W 72/0486 370/331 |
| 2013/0336155 A1* | 12/2013 | Jantti | H04W 24/08 370/252 |
| 2014/0080532 A1* | 3/2014 | Oh | H04W 28/26 455/512 |
| 2018/0124686 A1* | 5/2018 | Oh | H04H 60/50 |

FOREIGN PATENT DOCUMENTS

| | | |
|---|---|---|
| WO | WO 2012/009557 A2 | 1/2012 |
| WO | WO 2012/048090 A2 | 4/2012 |
| WO | WO 2012/051151 A1 | 4/2012 |
| WO | WO 2012/051303 A1 | 4/2012 |

OTHER PUBLICATIONS

3rd Generation Partnership Project (3GPP), R1-092965, "Control Structure for Relay Type 1 Nodes", TSG-RAN WG1#57Bis, NEC Group, Los Angeles, CA, US, Jun. 29-Jul. 3, 2009, 5 pages.

Cisco, "Cisco Visual Networking Index: Global Mobile Data Traffic Forecast Update, 2011-2016", White Paper, Available at <http://www.cisco.com/en/US/solutions/collateral/ns341/ns525/ns537/ns705/ns827/white_paper_c11-520862.html>, 2012, 4 pages.

European Telecommunications Standards Institute (ETSI), ETSI EN 301 598 V1.0.0, "White Space Devices (WSD), Wireless Access Systems Operating in the 470 MHz to 790 MHz Frequency Band, Harmonized EN Covering the Essential Requirements of Article 3.2 of the R&TTE Directive", Jul. 2013, pp. 1-71.

European Telecommunications Standards Institute (ETSI), TR 103 113 V1.1.1, "Electromagnetic Compatibility and Radio Spectrum Matters (ERM), System Reference Document(STdoc); Mobile Broadband Services in the 2 300 MHz-2 400 MHz Frequency Band under Licensed Shared Access Regime", Jul. 2013, 37 pages.

FCC, "Notice of Proposed Rulemaking and Order", Federal Communications Commission, FCC 12-148, Available at <http://www.fcc.gov/document/enabling-innovative-small-cell-use-35-ghz-band-nprm-order>, Dec. 12, 2012, pp. 15594-15658.

Forge et. al., "Perspectives on the Value of Shared Spectrum Access", Final Report for the European Commission, Feb. 2012, 216 pages.

Goldman, David, "Sorry, America: Your Wireless Airwaves are Full", The Spectrum Crunch, The Cell Phone Industry Hits its Limits, CNNMoneyTech, Available at <http://money.cnn.com/2012/02/21/technology/spectrum_crunch/index.htm?cnn=yes&hpt=hp_bn1>, Feb. 21, 2012, 2 pages.

Khun-Jush, Jamshid, "Licensed Shared Access as Complementary Approach to Meet Spectrum Demands: Benefits for Next Generation Cellular Systems", Qualcomm, ETSI Workshop on Reconfigurable Radio Systems, Cannes, France, Available at <http://docbox.etsi.org/Workshop/2012/201212_RRS/PRESENTATIONS/>, Dec. 12, 2012, pp. 1-18.

NTIA, "An Assessment of the Viability of Accommodating Wireless Broadband in the 1755-1850 MHz Band", Report, National Telecommunications and Information Administration, United States Department of Commerce, Available at <www.ntia.doc.gov/report/2012/assessment-viability-accommodating-wireless-broadband-1755-1850-mhz-band>, Mar. 27, 2012, 155 pages.

PCAST, "Report to the President—Realizing the Full Potential of Government-Held Spectrum to Spur Economic Growth", President's Council of Advisors on Science and Technology Report, Available at <http://www.whitehouse.gov/sites/default/files/microsites/ostp/pcast_spectrum_report_final_july_20_2012.pdf>, Jul. 2012, 192 pages.

RSPG, "Report on Collective Use of Spectrum (CUS) and Other Spectrum Sharing Approaches", RSPG11-392 Final, Radio Spectrum Policy Group, Nov. 2011, pp. 1-38.

The White House, "Presidential Memorandum: Unleashing the Wireless Broadband Revolution", Memorandum for the Heads of Executive Departments and Agencies, Office of the Press Secretary, Available at <http://www.whitehouse.gov/the-press-office/presidential-memorandum-unleashing-wireless-broadband-revolution >, Jun. 28, 2010, 6 pages.

Wimax, "A Review of Spectrum Requirements for Mobile WiMAX Equipment to Support Wireless Personal Broadband Services", WiMAX forum whitepaper, Sep. 2007, 45 pages.

* cited by examiner

| ASK ID, SOURCE ID, DESTINATION ID | ~1702 |
| --- | --- |
| EXPIRATION TIME | ~1704 |
| ENUMERATION OF RADIO RESOURCES (TIME, SPACE, AND BW) | ~1706 |
| RADIO CAPABILITES | ~1708 |
| Tx SPECTRUM MASK SPECIFICATIONS | ~1710 |
| Tx POWER LIMIT | ~1712 |
| ACS SPECIFICATIONS | ~1714 |
| RADIO TECHNOLOGY | ~1716 |
| PRICE | ~1718 |
| AGREEMENT MODEL | ~1720 |

FIG. 17

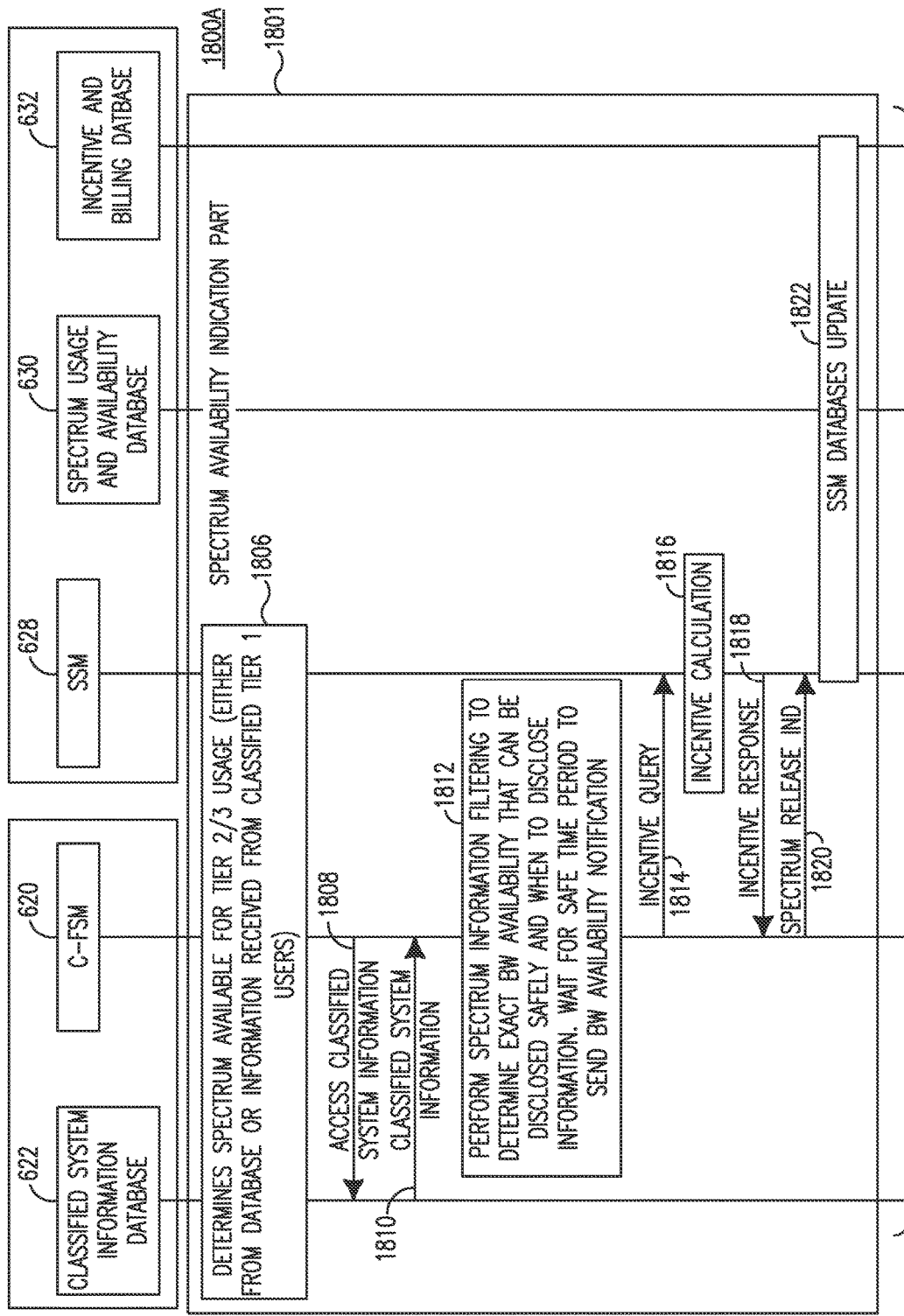

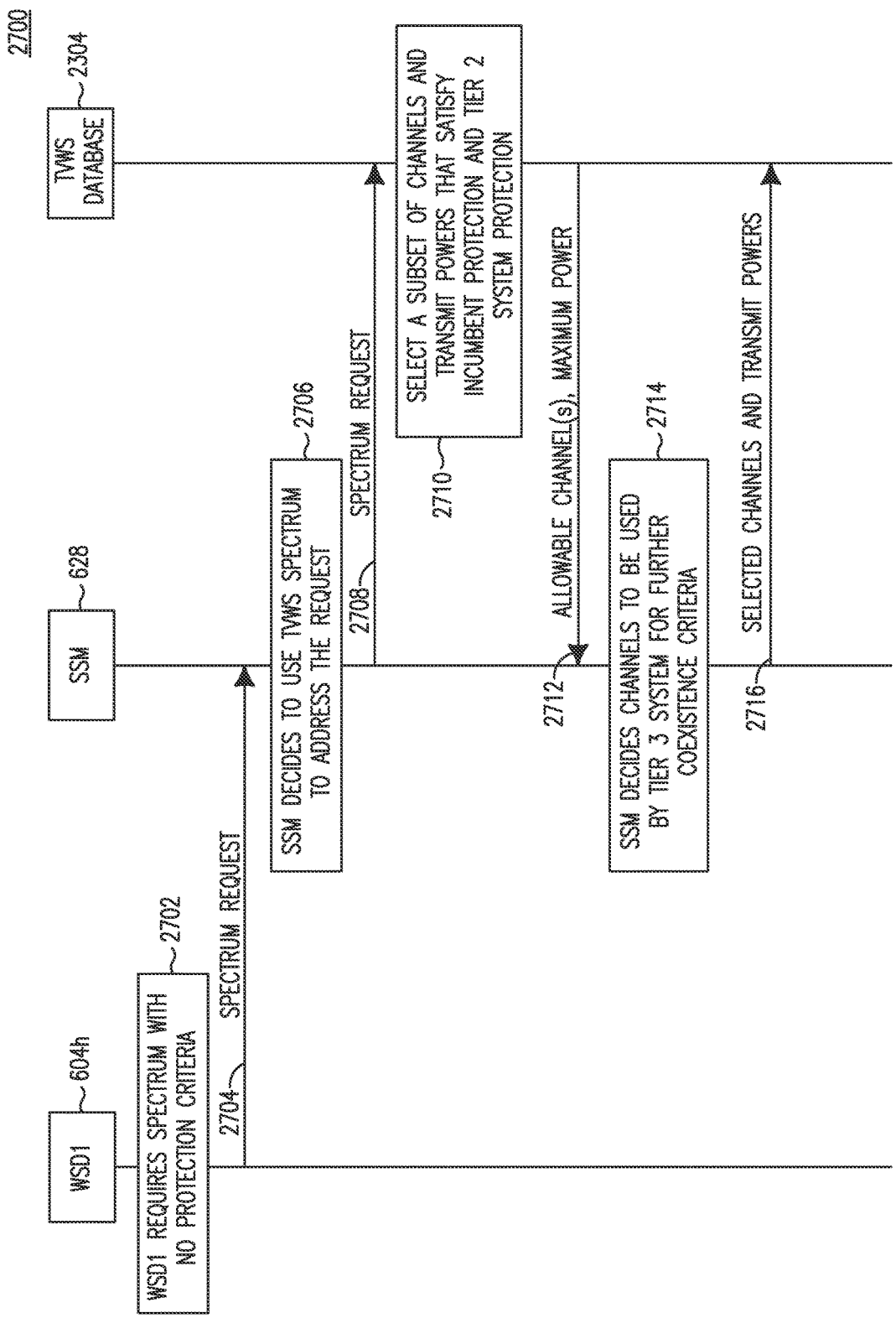

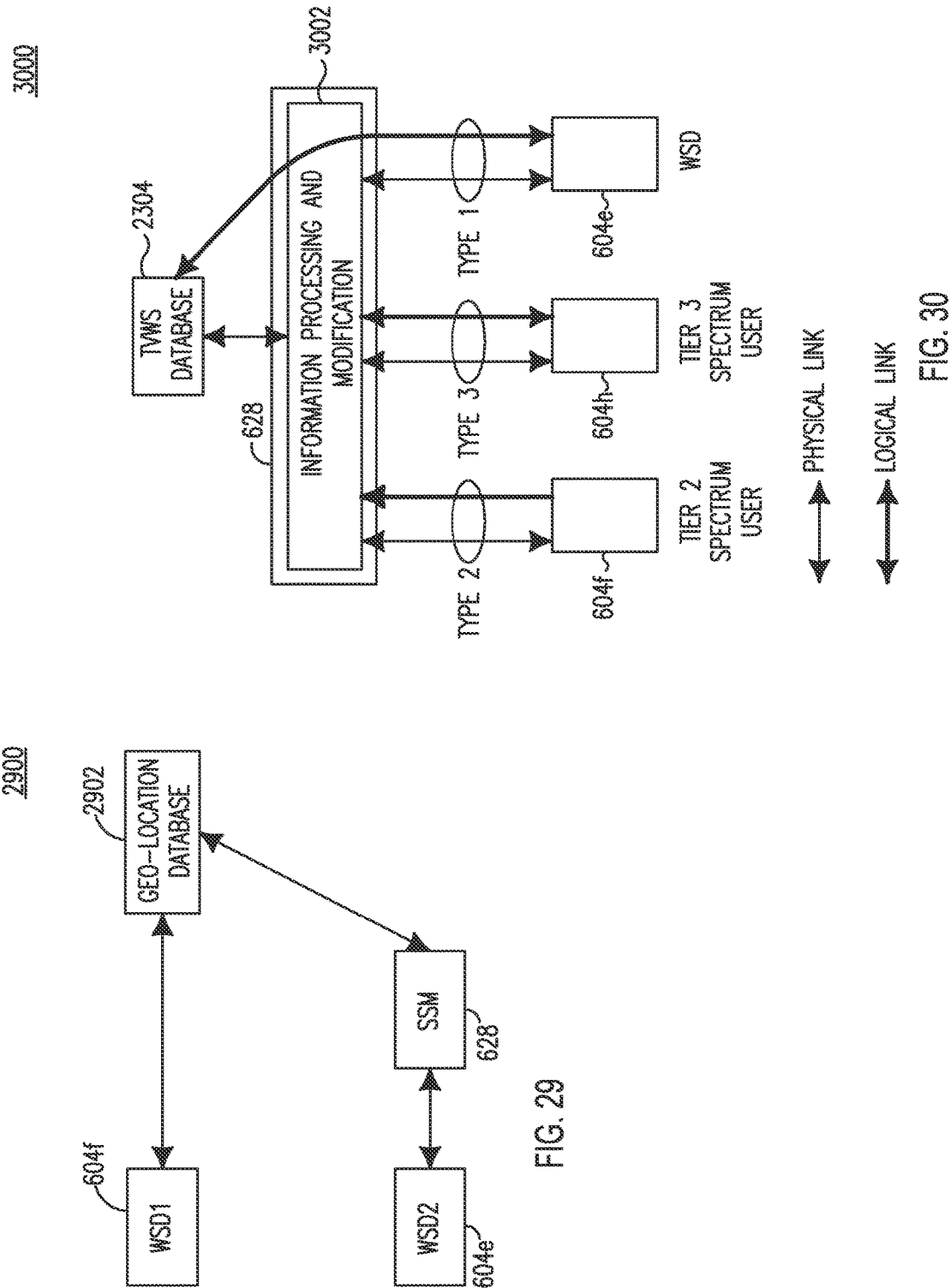

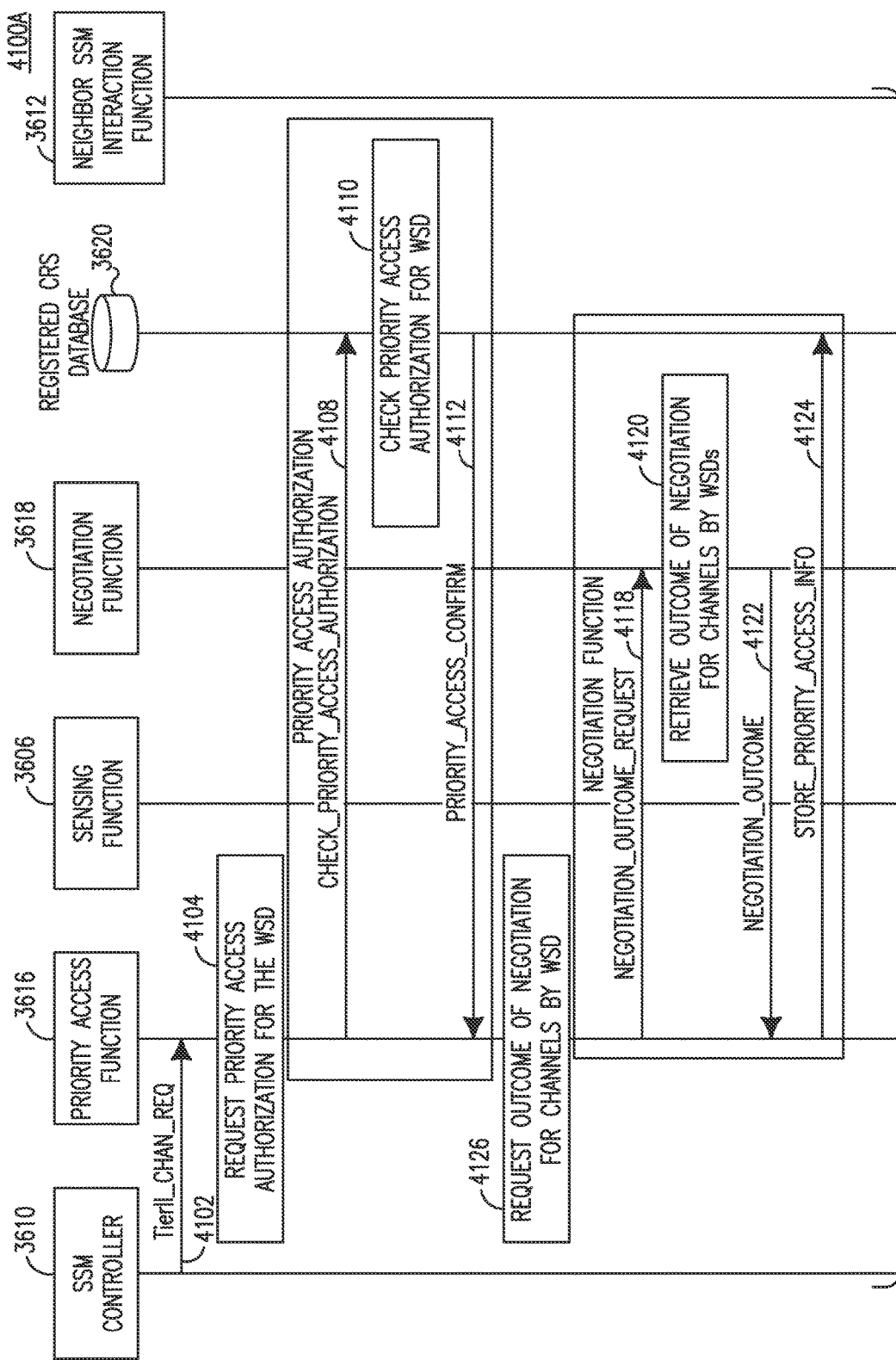

METHODS AND APPARATUS FOR SPECTRUM COORDINATION

CROSS REFERENCE TO RELATED APPLICATIONS

This is the National Stage Entry under 35 U.S.C. § 371 of Patent Cooperation Treaty Application No. PCT/US2014/013344, filed Jan. 28, 2014, which application claims the benefit of U.S. Provisional Patent Application Nos. 61/757,498 filed on Jan. 28, 2013; 61/811,439 filed on Apr. 12, 2013, and 61/829,079 filed on May 30, 2013, the contents of which are hereby incorporated by reference herein.

BACKGROUND

The growth of wireless traffic has been significant in the last decade. Wireless devices, such as smartphones and tablet personal computers (PCs), have become ubiquitous, and due to their enhanced connectivity and the wide use of applications requiring data transmission, such devices and their applications use significantly more spectrum than feature phones or standard mobile devices (as much as 122 times for some tablet PCs, for example). And the market size for mobile broadband services continues to grow. Recent studies have predicted that the market for mobile broadband services may grow from 1 billion users in 2012 to around 8 billion users in 2015. In addition, global mobile data more than doubled for the fourth year in a row in 2011, and it will likely continue to do so in the predictable future. Accordingly, more spectrum is needed for mobile broadband use.

Traditionally, wireless devices have exclusively used dedicated bands, and if additional spectrum was needed for mobile broadband, it was created by repurposing spectrum (i.e., moving primary spectrum users to other bands). However, with time, the practice of repurposing has become more difficult and less feasible due to the nature of primary spectrum user services that would need to be moved to other bands. In particular, repurposing of existing services that are widely in use would be an extremely costly and lengthy undertaking, as confirmed by a recent report that concluded that potential repurposing of the 1755-1850 MHz band would take 10 years and cost some 18 billion dollars. As a result, regulators have begun to realize that methods other than repurposing may be needed to obtain the new spectrum that will solve the bandwidth crunch.

SUMMARY

Methods and apparatus for spectrum coordination are described. A method of spectrum coordination includes a spectrum coordinator receiving a request for shared spectrum from a CRS that the spectrum coordinator supports. The request includes at least one minimum protection requirement. The spectrum coordinator determines protection criteria for the CRS based on the at least one minimum protection requirement received from the CRS. The spectrum coordinator sends the protection criteria for the CRS to a geo-location database for use in assigning shared spectrum to other CRSs that the spectrum coordinator does not support.

BRIEF DESCRIPTION OF THE DRAWINGS

A more detailed understanding may be had from the following description, given by way of example in conjunction with the accompanying drawings wherein:

FIG. 17 is a diagram of example information elements (IEs) associated with bid and ask messages;

FIGS. 18A and 18B are a flow diagram of an example method of assigning classified spectrum;

FIG. 27 is a flow diagram of an example message exchange for an SSM acting a special user of the TVWS with non-pre-reserved spectrum where the SSM behaves as a new type of incumbent spectrum user with respect to a spectrum request from a WSD that is a Tier 3 spectrum user;

FIG. 29 is a diagram of an example system in which the SSM determines the presence of devices that access the geo-location database directly through sensing/measurements;

FIG. 30 is a block diagram of an example architecture for an SSM receiving all spectrum requests from all WSDs;

FIGS. 41A, 41B and 41C are a flow diagram of an SSM procedure for priority access.

DETAILED DESCRIPTION

Figure 1A:
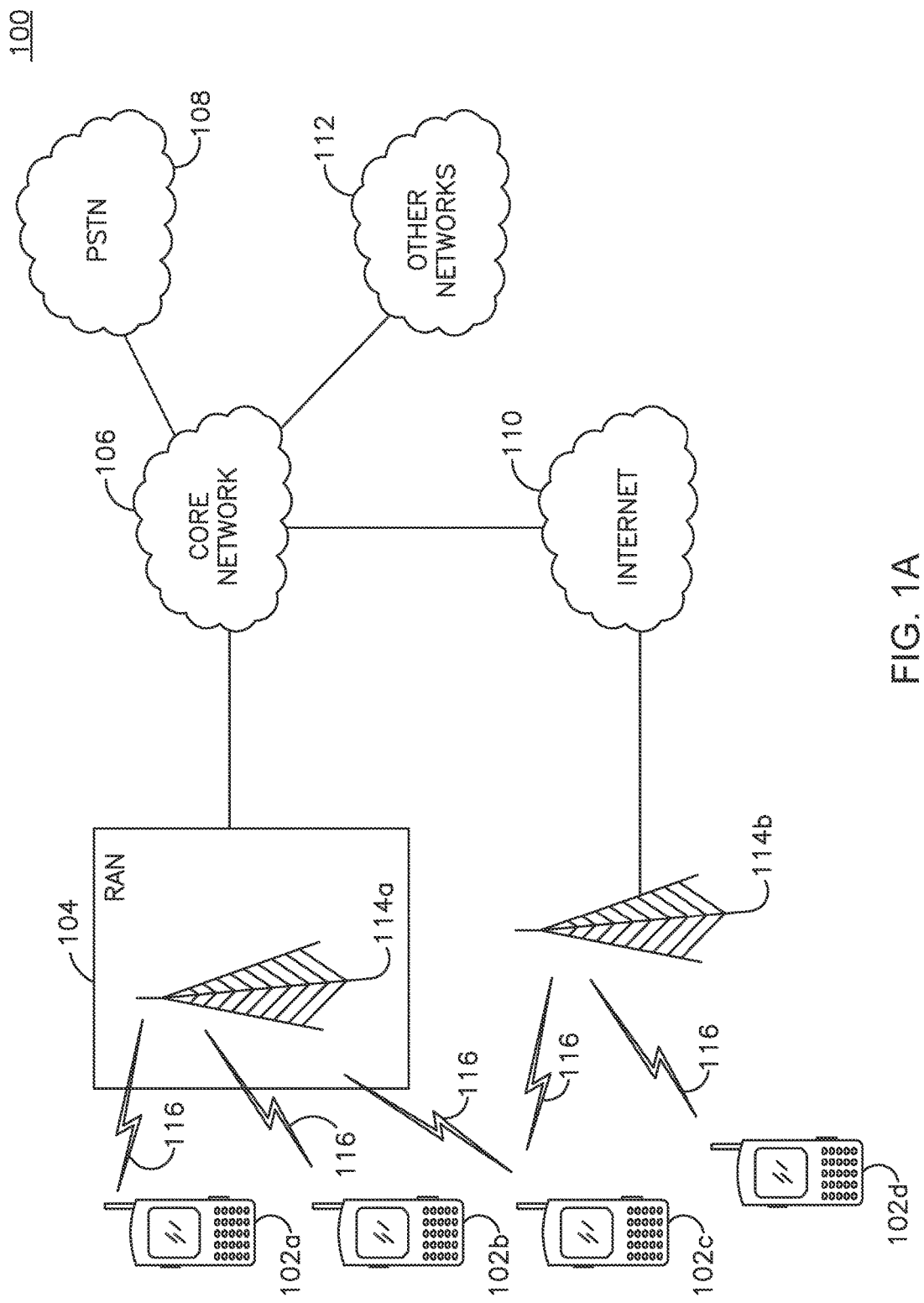
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, a white space device (WSD) and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, a white space device (WSD) and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
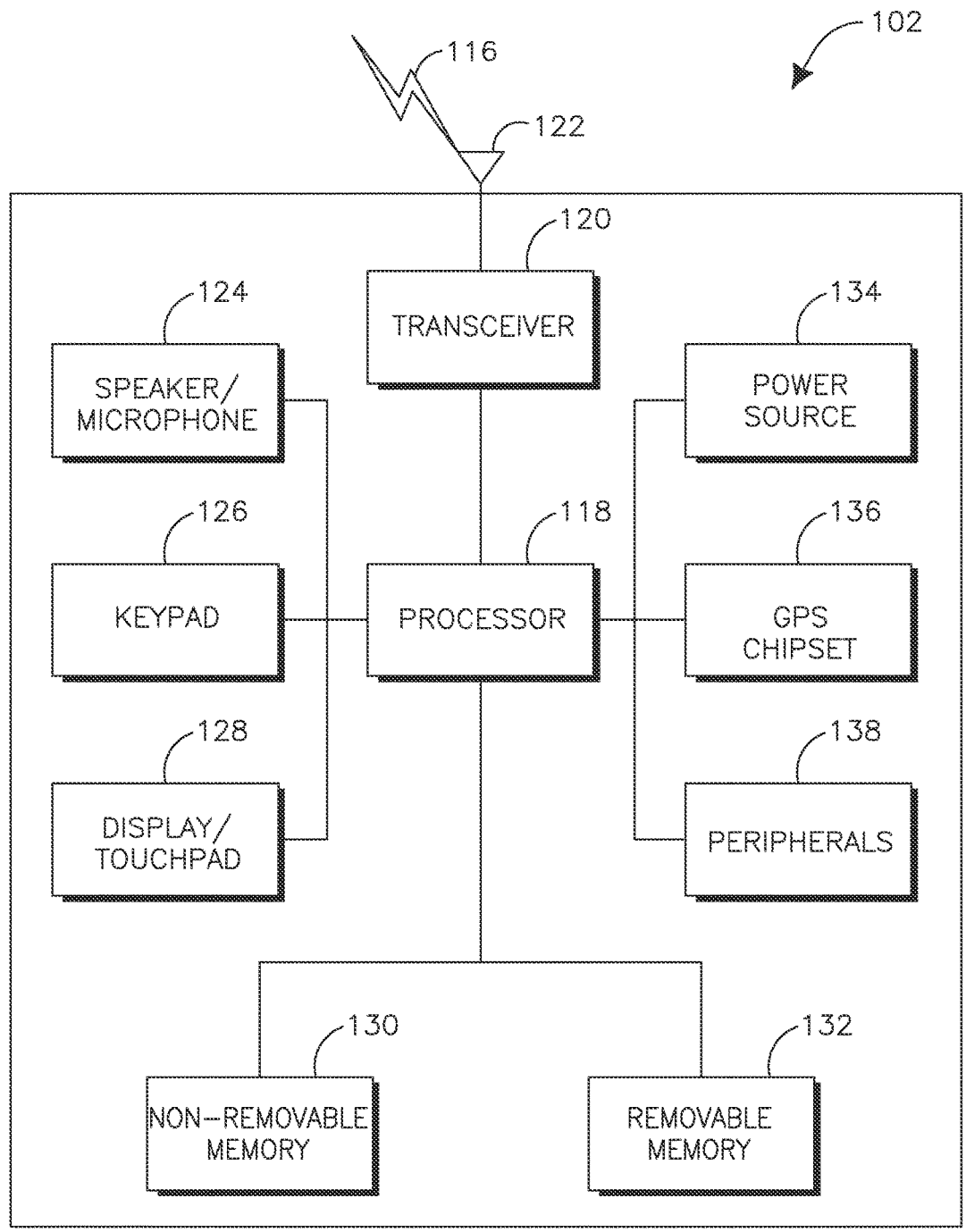
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
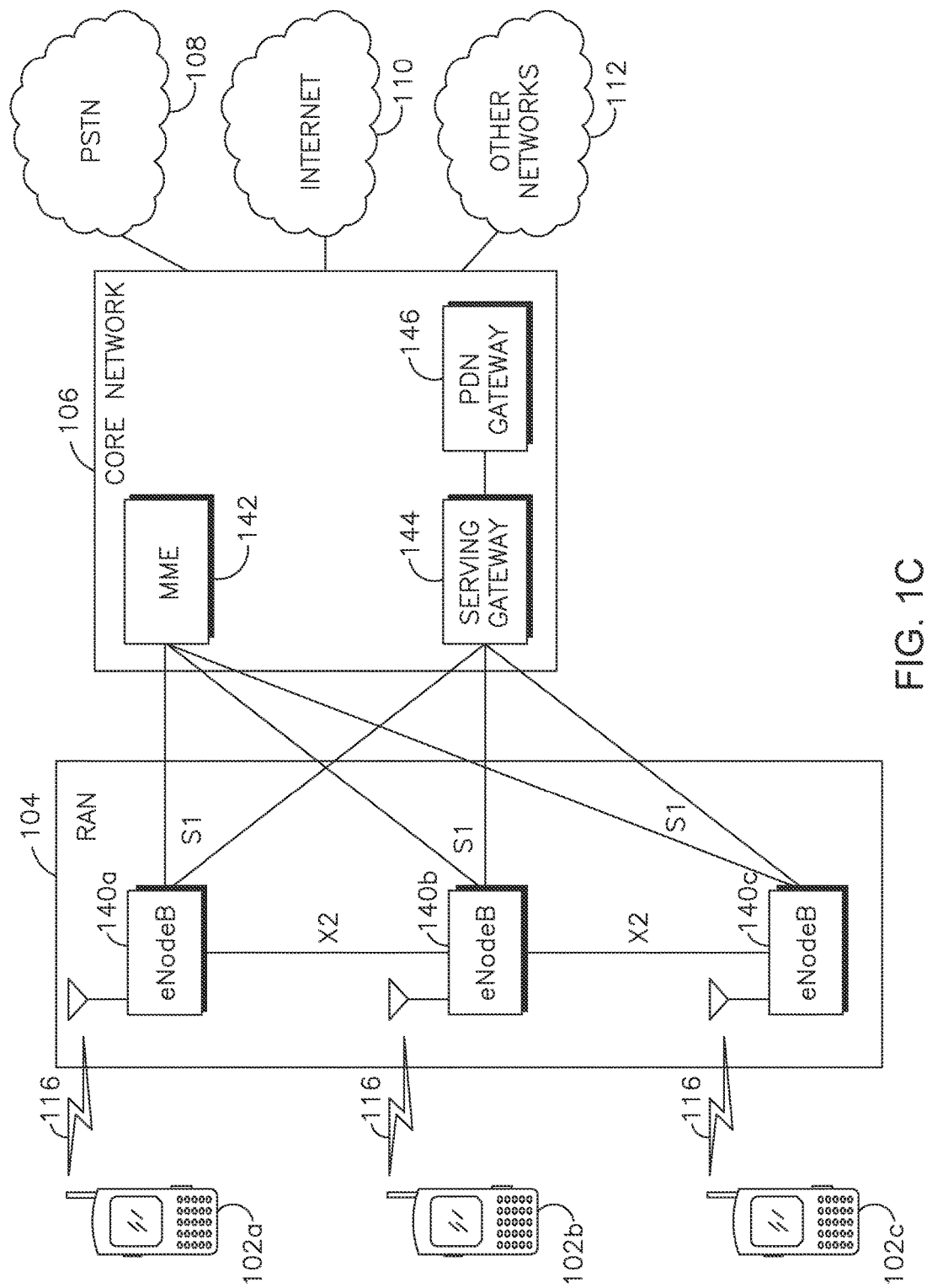
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Many spectrum bands are currently not being fully utilized by their primary spectrum users, and portions of those bands may be available for other use, for example, on a geographical or timely basis. Accordingly, sharing bands may be a tool that may complement repurposing of bands in an effort to meet rapidly increasing bandwidth requirements. Examples of bands that may be available for sharing may include unused portions of the terrestrial broadcast spectrum that are no longer being used for television (TV) transmissions (commonly referred to as the TV white space (TVWS)), spectrum that is currently allocated for use by the United States Federal government, and other un-used or under-used spectrum.

With respect to the TVWS, the Federal Communications Commission (FCC) has opened up these frequencies (e.g., the 470-790 MHz band) for a variety of unlicensed uses and published its initial rules for access to the TVWS database in the United States in 2010. The amount and exact frequencies of unused spectrum may vary from location to location, but they may be exploited by secondary users for any radio communication so long as such use does not interfere with other primary spectrum users. Use of such spectrum for WiFi, Long Term Evolution (LTE) and other cellular technologies is under consideration.

With respect to spectrum that is currently allocated for use by the United States Federal government, a presidential memorandum was released in June 2010, requesting government agencies to make 500 MHz of spectrum available for commercial use within ten years. This request was intended to enable technology expansion and innovation in the mobile space in the United States while recognizing that such innovation would require the creation of new spectrum to be viable. In response to the presidential memorandum, the President's Council of Advisors on Science and Technology (PCAST) released a report in July 2012 (commonly referred to as "the PCAST report"). The PCAST report recommended that the President issue a new memorandum "to make it the policy of the U.S. government to share underutilized Federal spectrum to the maximum extent possible" and to identify 1,000 MHz of spectrum to implement a new shared-use spectrum policy. The report also detailed a recommended plan for exploiting the new Federal spectrum.

The PCAST report further concluded that providing additional spectrum may provide an opportunity for significant economic growth, but that it would not be feasible to provide such additional spectrum by clearing services and reallocating spectrum. Instead, the report recommended encouraging federal agencies to make efficient use of spectrum by, for example, sharing their spectrum during periods when it is unused or in areas where other federal or commercial services could be deployed locally without creating harmful interference. The report also recommended future adoption of a new federal spectrum architecture governed according to a three-tier hierarchy based on spectrum sharing.

Figure 2:
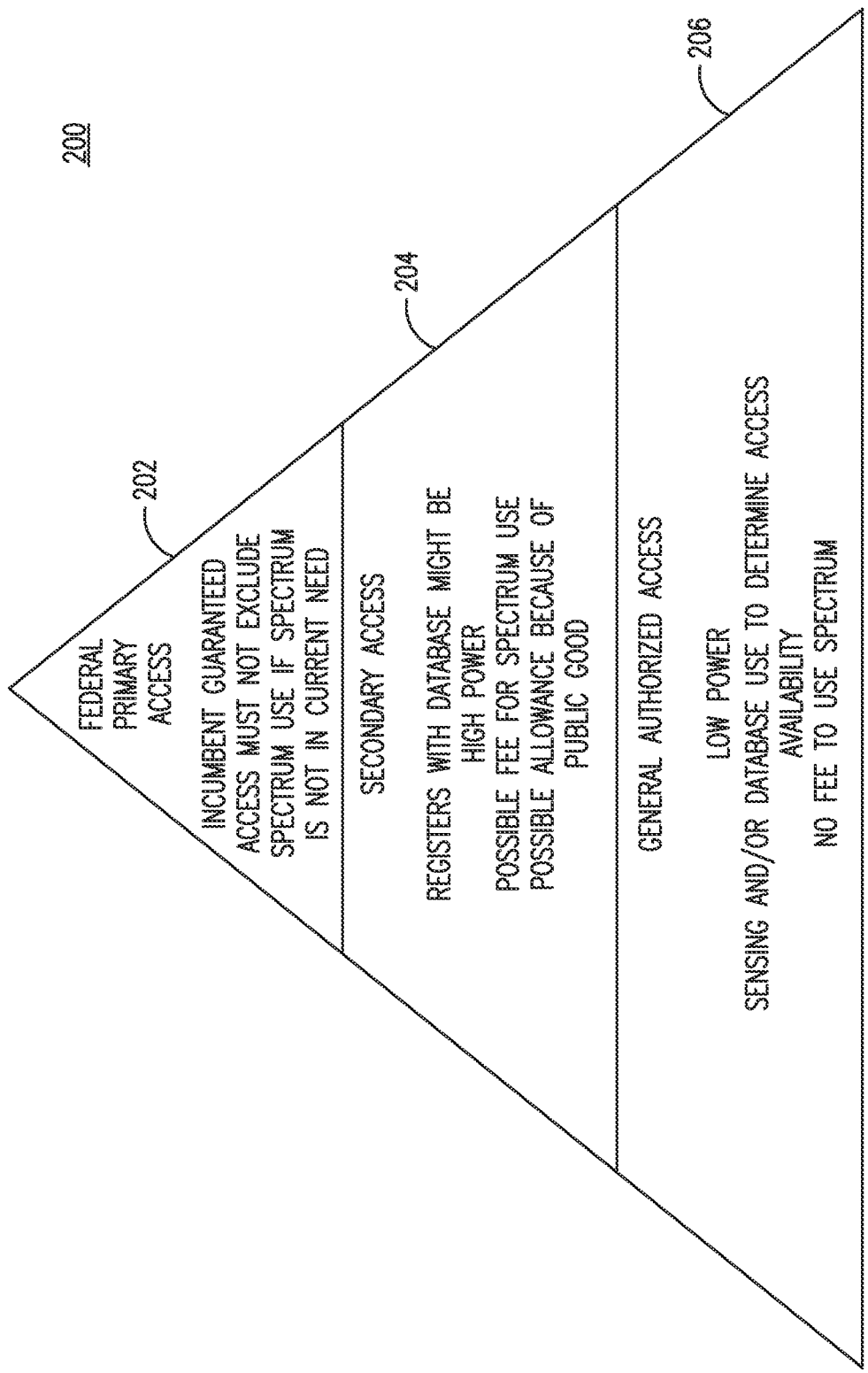
FIG. 2 is a diagram of an example three-tier hierarchy recommended in the President's Counsel of Advisors on Science and Technology (PCAST) report.

FIG. 2 is a diagram 200 of an example three-tier hierarchy recommended in the PCAST report. In the example illustrated in FIG. 2, a first tier 202 (or Tier 1) is for federal primary spectrum users, a second tier 204 (or Tier 2) is for secondary spectrum users that may have a lower priority than Tier 1 users when accessing the spectrum, and a third tier 206 (or Tier 3) is for general authorized spectrum users that may have the lowest priority when accessing the spectrum. When not fully using the spectrum, Tier 1 spectrum users may not exclude use of the spectrum by other spectrum users. Tier 2 users, for example, may need to register with a database and pay a fee to obtain an individual license for spectrum use. Tier 3 users, for example, may not be expected to pay fees for using the spectrum, but they may only use it in an opportunistic manner. Similar to requirements for the TVWS, however, lower level use may not be permitted to cause harmful interference with higher level use of the spectrum.

Figure 3:
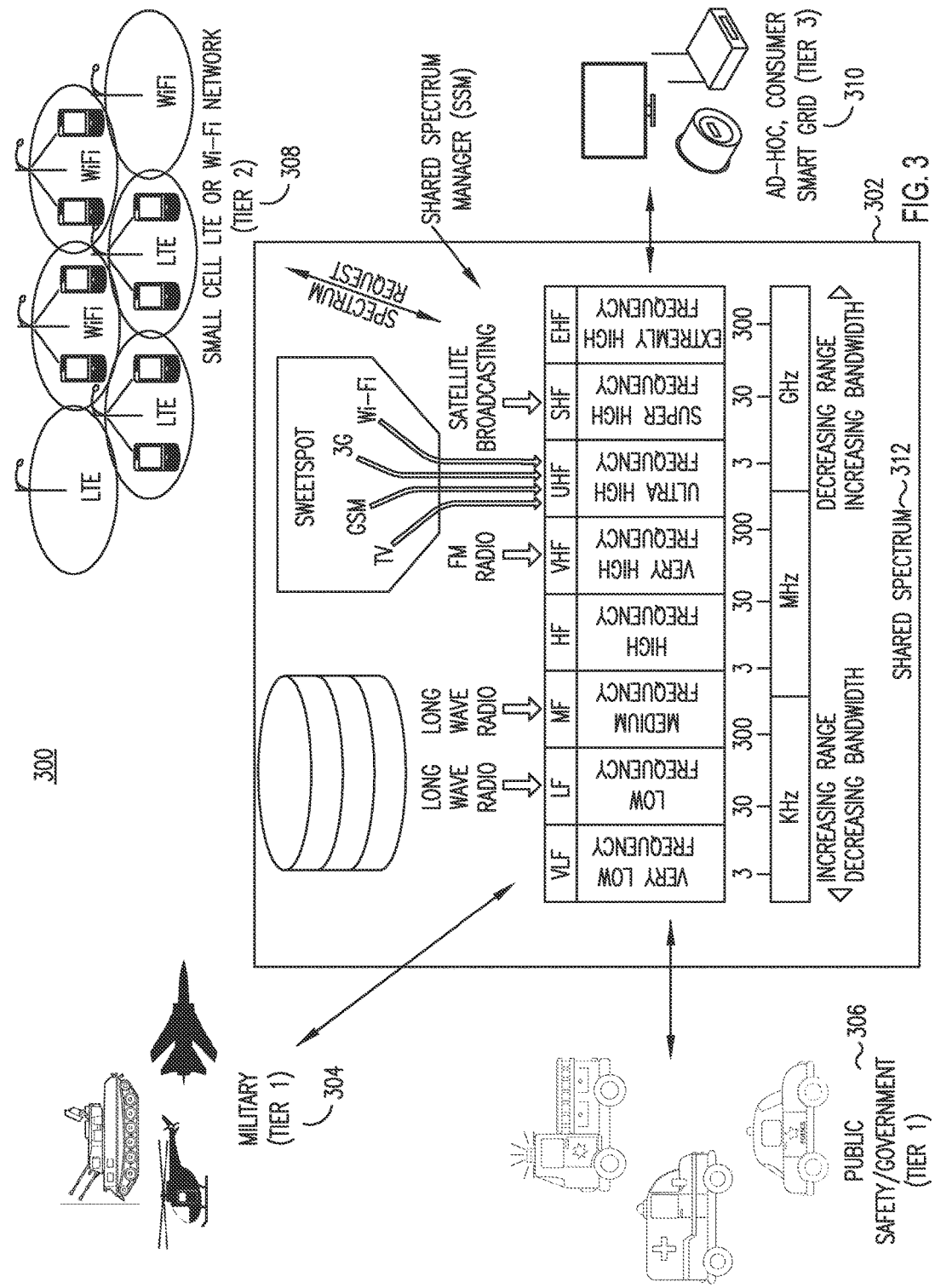
FIG. 3 is a diagram of an example three-tier spectrum sharing model.

FIG. 3 is a diagram 300 of an example three-tier spectrum sharing model. In the example illustrated in FIG. 3, Tier 1 spectrum users, such as military users 304 and public safety/government users 306, Tier 2 spectrum users, such as small cell LTE or WiFi networks 308, and Tier 3 spectrum users, such as Ad-hoc, consumer and smart grid users 310, may all access shared spectrum 312 when it is made available to them.

In addition to recommending future implementation of an architecture governed according to a three-tier hierarchy, the PCAST report recommended future implementation of a framework for coexistence based on technical characteristics of transmitters and receivers, stressing use of receiver performance when making spectrum allocations and the eventual improvement of receiver performance characteristics. The report also recommended that mechanisms to evaluate the use of spectrum be based not solely on the actual use of spectrum in MHz, but also how effectively these mechanisms may allow for other services to use the same spectrum and not be precluded.

The PCAST report set out a plan to implement the recommendations provided therein over the next ten years. Spectrum in the 2700 MHz to 3700 MHz band was targeted for initial use in the three-tier approach.

On Dec. 12, 2012, the FCC followed with a Notice of Proposed Rulemaking (NPRM), in which it proposed creation of a Citizens Broadband Service (CBS) in the 3550-3650 MHz band, which is currently underutilized for military and satellite operations. The proposed CBS would use small cells and spectrum sharing and would use a three-tier shared access model, wherein Tier 1 is referred to as incumbent access, Tier 2 is referred to as priority access (PA) and Tier 3 is referred to as general authorized access (GAA). In the proposed CBS, incumbent users in Tier 1 would be protected from Tier 2 and Tier 3 users, and Tier 2 PA users would also be protected from harmful interference from Tier 3 GAA users. The NPRM also foresaw use of the CBS by Quality-of-Service (QoS)-dependent users (e.g., hospitals, utilities, and state and local governments) as Tier 1 users and use of the shared spectrum by residential and business users (including network operators) as Tier 3 users and listed a number of different proposals with respect to implementing the CBS, including potential use of allowed operational areas for each access type based on zones and fixed limits for maximum transmit power of the devices.

On Nov. 1, 2013, the FCC released a Public Notice soliciting public comment on a Revised Framework that uses the three tier model but expands the eligibility criteria for the PA tier and elaborates licensing concepts for use of that tier. For example, potential spectrum users may apply for an exclusive license to use the PA tier, and auctioning concepts may be applied should multiple parties apply for a license.

With respect to other un-used or under-used spectrum, regulators in Europe, including both the European Conference of Postal and Telecommunications Administration (CEPT) and the European Commission, have also realized the importance of spectrum sharing through licensed shared access (LSA) (also known as Authorized Shared Access (ASA)). The LSA model is a 2-tiered model where Tier 1 spectrum users are the incumbents (e.g., government and defense users) and Tier 2 spectrum users are authorized for exclusive use on a shared and binary basis (e.g., time, location and/or frequency) with the incumbent. The LSA concept is relatively simple: while the current incumbent usage may stay, the unused portions of the band may be exclusively assigned to a secondary user, such as a mobile broadband operator, or, in some cases, two or more operators. If there are two or more LSA licensees, they may not have exclusive rights to the shared band, so there needs to be some coordinator between them in order to allow quality of service (QoS).

Figure 4:
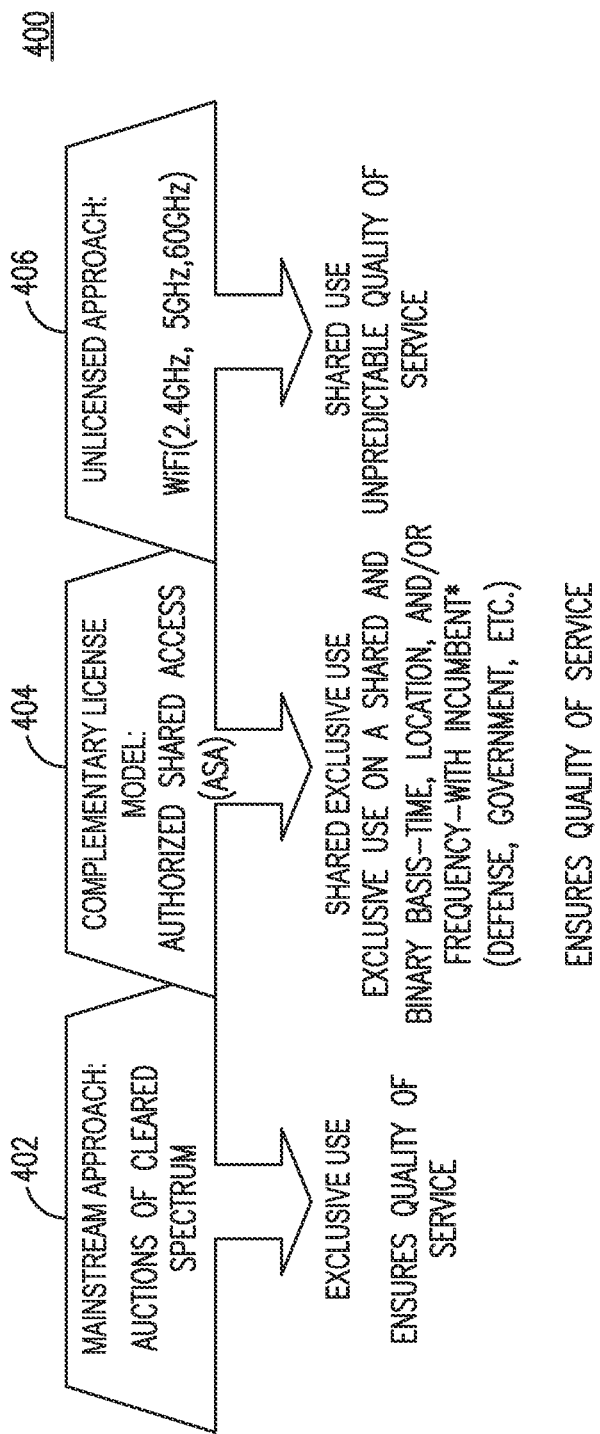
FIG. 4 is a diagram of a comparison between a traditional licensed approach, the licensed shared access (LSA) approach and an unlicensed approach.

FIG. 4 is a diagram 400 of a comparison between a traditional licensed approach, the LSA approach and an unlicensed approach. In the traditional approach 402, auctions may be conducted with respect to access to cleared spectrum for exclusive use by spectrum users to ensure QoS. In the LSA approach 404, exclusive use may be granted to other spectrum users on a shared or binary basis (e.g., time, location and/or frequency) with incumbent users to ensure QoS. In the unlicensed approach (e.g., TVWS), there is no control over other spectrum users' access to the spectrum, which may result in unpredictable QoS.

Figure 5:
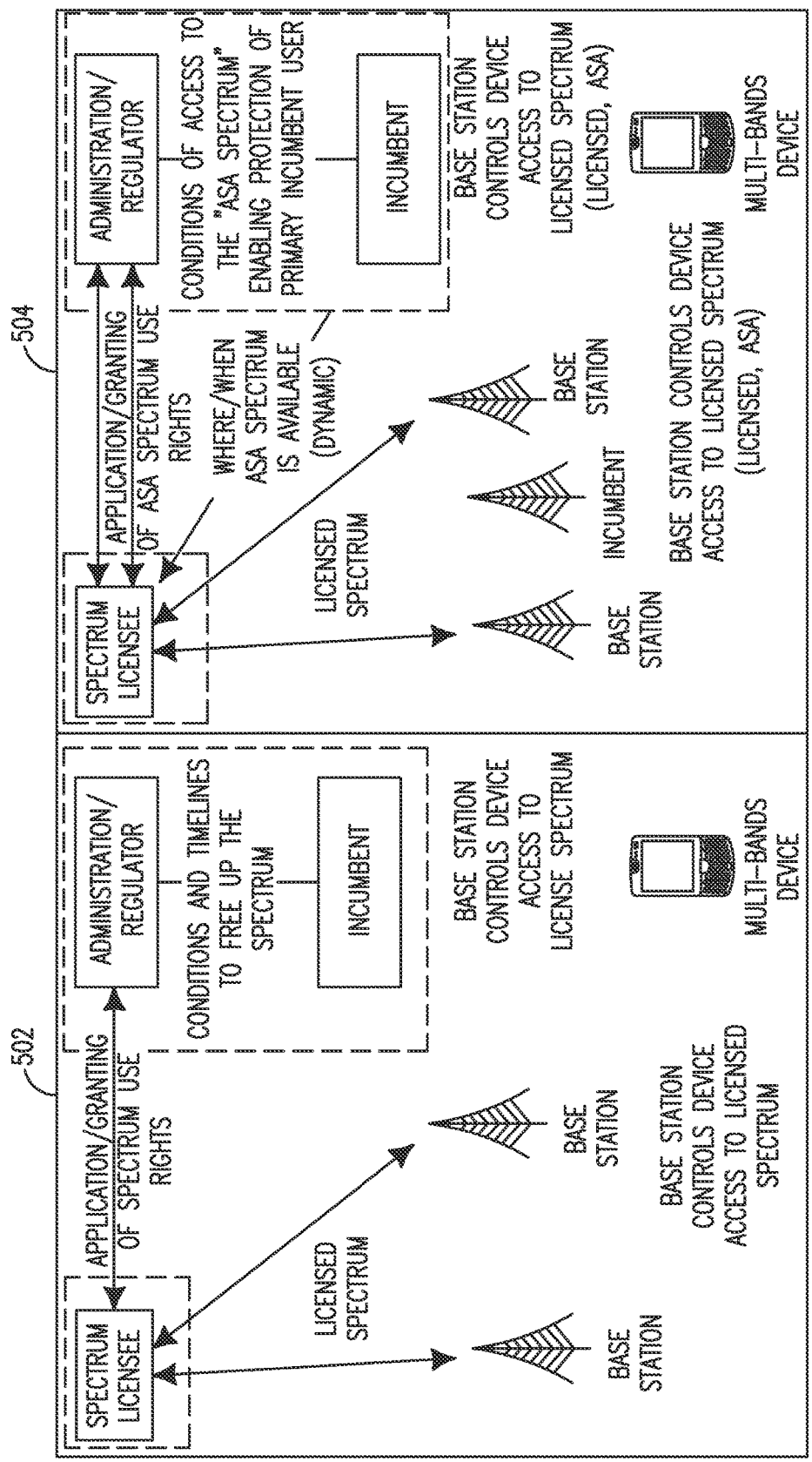
FIG. 5 is a diagram of a traditional individual licensing framework and the LSA framework.

FIG. 5 is a diagram 500 of a traditional individual licensing framework 502 and the LSA framework 504. In LSA, for example, the administration/regulator applies conditions of access to LSA/ASA spectrum to enable incumbents to access the LSA/ASA spectrum while also protecting the primary incumbent user, including dynamic granting of LSA/ASA spectrum licenses when/where such spectrum is available.

Several factors may impact how the LSA is organized and implemented in practice. These include, but are not limited to, the bands and spectrum used by the incumbent and the needs of the LSA licensee(s). For example, in a case where there will be several bands, incumbents, and LSA licensees, use of a centralized entity such as a spectrum manager may be beneficial. On the other hand, in a case where a single incumbent leaves some spectrum available for a single LSA licensee to use in a relatively static way, the sharing may be done without a centralized entity.

Embodiments described herein provide a flexible architecture for shared spectrum access in a hierarchical multi-tier system, including, for example, procedures for a shared spectrum manager (SSM) (also referred to herein as a spectrum coordinator) and tiered access users (e.g., spectrum request or spectrum assignment/re-assignment) and spectrum usage evaluation, incentive pricing models to encourage spectrum sharing by highest tier spectrum users (also referred to as primary spectrum users or incumbent spectrum users), and approaches to de-classify the information from classified primary spectrum users. Further, embodiments are described that enable use of an SSM with other (e.g., non-tiered) unlicensed spectrum (e.g., the TVWS) where, for example, access to the unlicensed spectrum may be controlled by a database (e.g., a geo-location database/TVWS database) that is meant to protect the primary spectrum user only. More specifically, architectures are described where the SSM is a special user of the TVWS and where the SSM receives all TVWS spectrum requests. Some of the embodiments described herein are described with specific reference to a TVWS database or a geo-location database. One of ordinary skill in the art will recognize that these databases may serve the same function and, therefore, these terms may be used interchangeably.

Figure 6A:
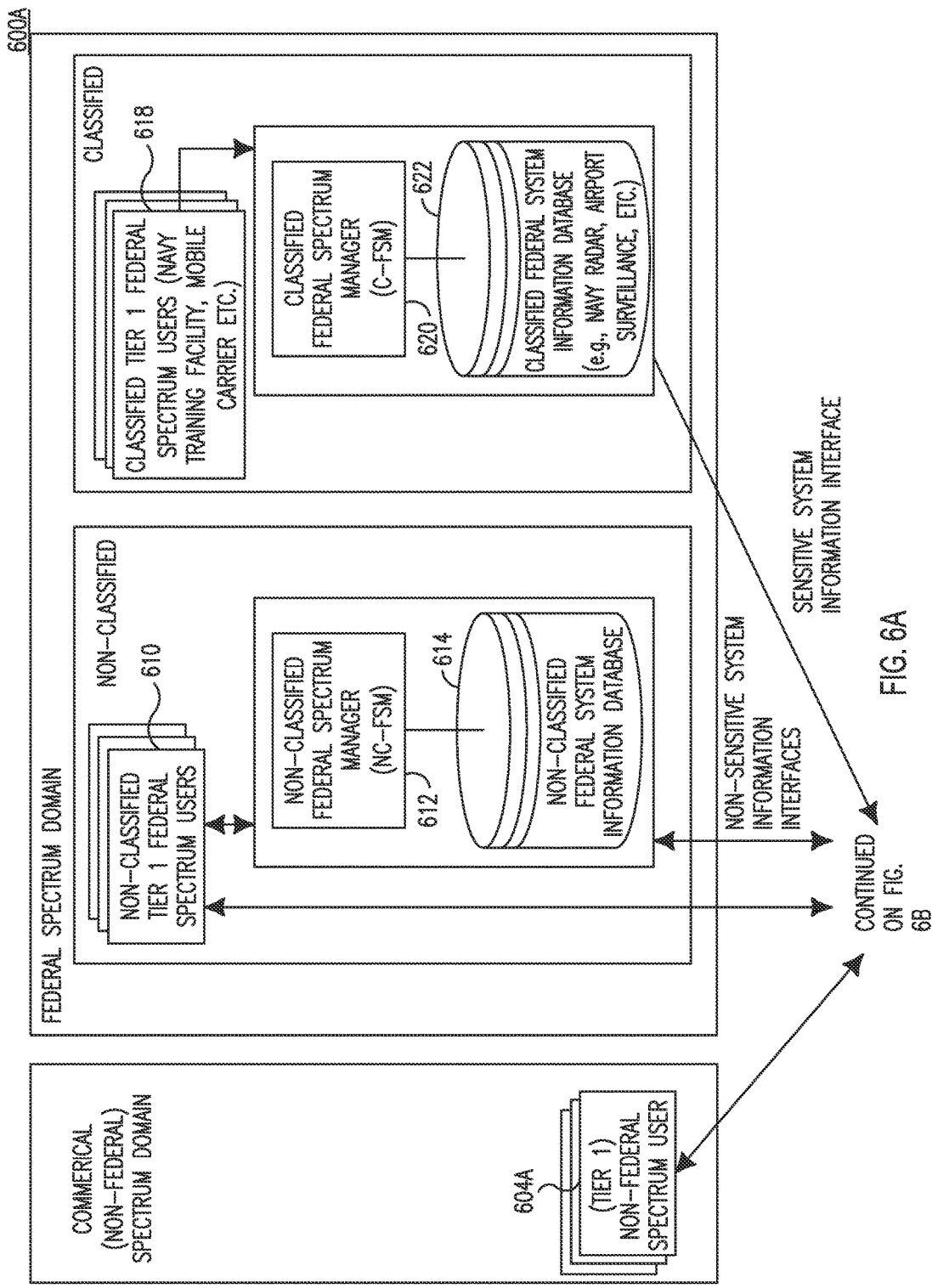
FIGS. 6A and 6B are a block diagram of an example architecture for a hierarchical, multi-tier, shared spectrum model.
Figure 6B:
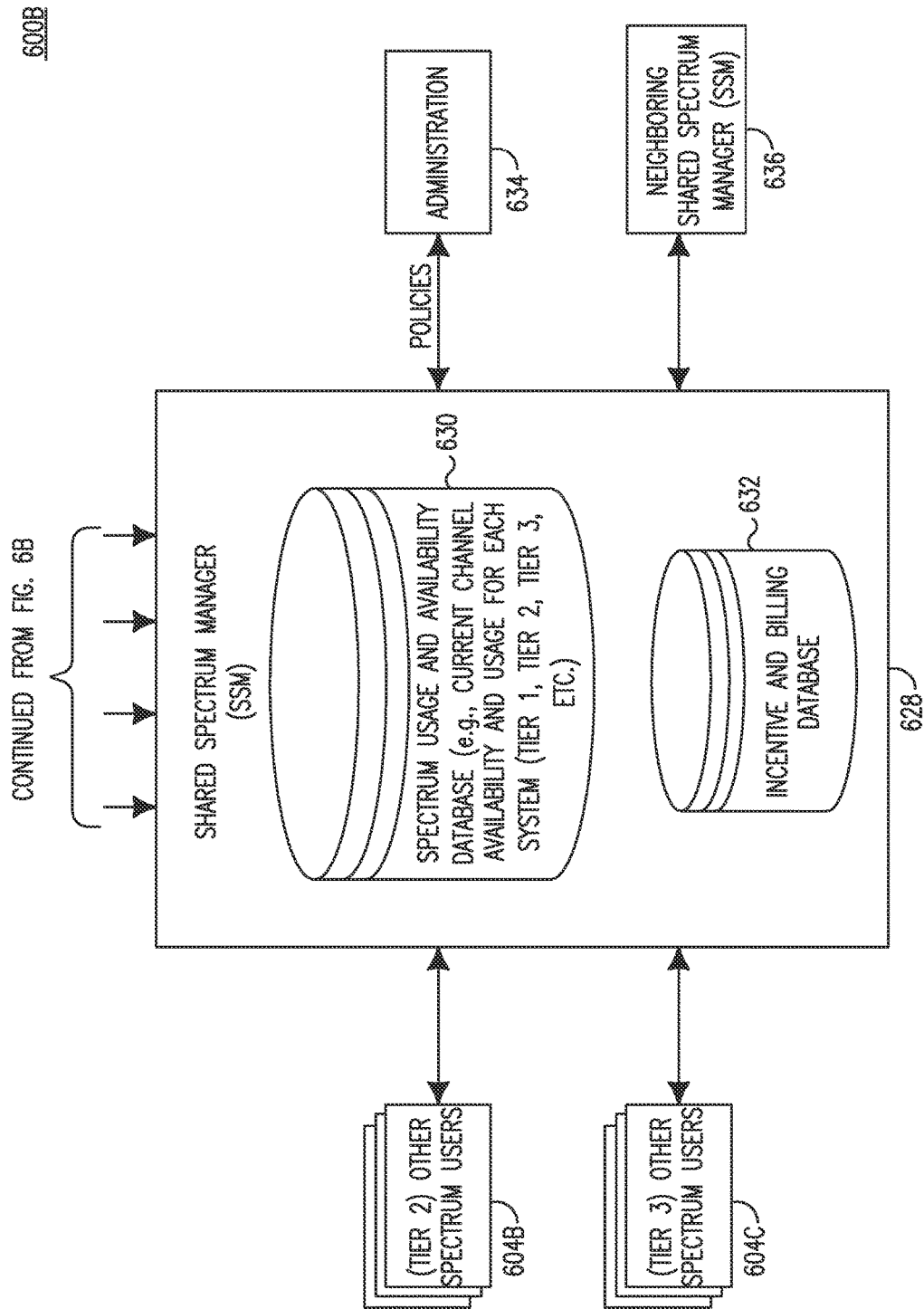

FIGS. 6A and 6B are a block diagram of an example architecture 600a/600b for a hierarchical, multi-tier, shared spectrum model. The example architecture is a general architecture and may be configured to support specific multi-tier models, such as a 3-tier PCAST model, a 2-tier LSA model or a 2-tier TVWS model. The architecture illustrated in FIGS. 6A and 6B includes a shared spectrum manager (SSM) 628 that includes or may be in communication with a spectrum usage and availability database 630 and an incentive and billing database 632. The SSM 628 may be in communication with Tier 1 users, including, for example, direct communication with non-federal (e.g., commercial) Tier 1 users 604a, direct communication with non-classified Tier 1 federal users 610, communication with non-classified Tier 1 federal users 610 via a non-classified federal spectrum manager (NC-FSM) 612, and/or communication with classified Tier 1 federal users 618 via a classified federal spectrum manager (C-FSM) 620. The SSM 628 may also be in communication with Tier 2 users 604b, Tier 3 users 604c, an administrator or regulator (e.g., the FCC) 634 and/or a neighboring shared spectrum manager 636. The NC-FSM 612 may include or be in communication with a non-classified federal system information database 614, and the C-FSM may be in communication with a classified federal system information database 622.

The SSM 628 may control spectrum usage, availability, billing and incentive information in such a way that primary users may offer up spectrum for use by other spectrum users in a reliable fashion, and lower tier spectrum users may use that spectrum in a transparent way. The SSM 628 may handle the details of protection, access guarantee, and actual spectrum usage, which may ensure flexible and dynamic spectrum sharing and may handle cross-border scenarios (which may potentially operate under different regulations) using inter-SSM communications. The SSM 628 may be responsible for assigning spectrum to each requesting access user in such a way that primary users may be protected and that the requested QoS of each spectrum user may be guaranteed. The SSM 628 may also manage computing an incentive associated with spectrum sharing and computing an overall cost associated with spectrum usage by a spectrum user based on the spectrum user's parameters.

The SSM 628 illustrated in FIGS. 6A and 6B includes a spectrum usage and availability database 630 and an incentive and billing database 632. The SSM 628 may maintain the spectrum usage and availability database 630 either internally or through an external interface. The spectrum usage and availability database 630 may maintain information about current spectrum usage and availability and may dynamically alter the information maintained in the database when new spectrum assignments are made, spectrum usage changes, etc. The spectrum usage and availability database 630 may also maintain the current spectrum that the SSM 628 has available to assign to Tier 2 or Tier 3 users based on what the Tier 1 users have indicated is available and currently unused by the Tier 1 users. In addition, the spectrum usage and availability database 630 may maintain information about spectrum that has been assigned to a Tier 2 or Tier 3 spectrum user as well as additional usage parameters associated with that spectrum usage (e.g., the maximum transmit power used by a Tier 2 or Tier 3 spectrum user or associated transmission range, time of use, etc.). The incentive and billing database 632 may be used to dynamically track the amount of money that each Tier 2 or Tier 3 spectrum user must pay for its spectrum usage (e.g., billing) and the amount of money that is owed to each Tier 1 spectrum user whose spectrum the SSM 628 has assigned for use to another spectrum user (e.g., incentive).

In addition to the above, the SSM 628 may compute the current incentive (e.g., payment per unit of spectrum) that Tier 1 users may take advantage of and advertise this information to registered Tier 1 spectrum users. The incentive at any given time may be based on certain factors, such as demand from secondary users, amount of additional coexistence information provided by the Tier 1 spectrum users, type of spectrum, or preliminary agreements. For example, for non-classified Tier 1 users, the more coexistence information that is provided by the Tier 1 users, the more incentive may be paid out. Further, the SSM 628 may, at the request of a Tier 1 spectrum user to share spectrum, collect spectrum availability information from the Tier 1 spectrum user as well as any characteristics of the Tier 1 user required for the spectrum assignment algorithm (e.g., receiver characteristics or sensing parameters) and store this information in the spectrum usage and availability database 630.

The SSM 628 may also collect spectrum requests from each spectrum user (e.g., Tier 2 and/or Tier 3 users), interface with a classified federal spectrum manager (C-FSM) 620 in order to make use of available spectrum under classified federal control (e.g. military spectrum usage), interface with a non-classified federal spectrum manager (NC-FSM) 612, and/or interface directly with non-classified Tier 1 spectrum users 610 as well as non-federal (or commercial) Tier 1 spectrum users 604*a* in order to make use of federal spectrum that is not under classified federal control. While an NC-FSM 612 may control all or part of the federal spectrum, the SSM 628 may also interact directly with Tier 1 spectrum users, as described above, that may not be under control of the NC-FSM 612 (such as in the case of a non-federal spectrum user).

The SSM 628 may also periodically perform spectrum optimization/assignment to ensure the most efficient use of spectrum while satisfying the QoS of each spectrum user. The SSM 628 may assign spectrum in such a way as to optimize the value of a metric related to spectrum effectiveness. The SSM 628 may also maintain current channel usage and relevant coexistence parameters for each Tier 2 and Tier 3 spectrum user in the spectrum usage and availability database 630 in order to simplify future spectrum access requests and ensure maintenance of required QoS for Tier 2 spectrum users and coexistence for Tier 3 spectrum users. The SSM 628 may also maintain cost and incentive information in the billing and incentive database 632 in order to keep track of the charges to each spectrum user and the incentive that may be paid to Tier 1 spectrum users over time and account for changes to charges and incentives as the overall spectrum usage changes. Further, the SSM 628 may communicate to the spectrum users any sensing of primary users that they may need to perform and any additional information that may be required or may help with sensing.

A primary spectrum user is a Tier 1 or incumbent spectrum user or system that shares unused portions of the bandwidth it owns. The primary spectrum user may be a logical entity capable of exchanging information with the SSM 628 or may simply be a passive database with information about the usage of spectrum by the primary spectrum user (or a combination of the two). In addition, the primary spectrum user may be managed by the NC-FSM 612 or the C-FSM 620 (in the case of federal spectrum only) or may be an entity that is independent of either of these (e.g., a non-federal or commercial system or a non-classified federal system that is not managed by the NC-FSM 612). The primary spectrum user may indicate to the SSM 628 information about its willingness to share spectrum, communicate to the SSM 628 the rules of use for the available spectrum, maintain and/or communicate to the SSM 628 any parameters related to the primary spectrum user in order to ensure protection of the system (e.g., receiver characteristics, signal modulation or signature, signal timing information, or other information related to potential sensing algorithms or parameters needed to detect the presence of the primary spectrum user) and communicate to the SSM 628 if spectrum needs to be taken back in case of emergency usage (e.g., time to evacuate, location, or duration). The rules of use for the available spectrum may include, for example, the available time period, the time of validity of any spectrum usage, location/region information, and/or the potential need and/or ability of the primary system to pre-empt the usage of a particular frequency by another Tier 2 or Tier 3 spectrum user for the primary spectrum user to regain access to its spectrum.

The federal spectrum domain includes classified (e.g., military) spectrum and non-classified (e.g., satellite communications used by the government) spectrum. Based on these two classes of spectrum, two different management systems (the NC-FSM 612 and the C-FSM 620) may interact with the SSM 628, each having a different interface with the SSM 628.

The C-FSM 620 may be responsible for managing all spectrum whose usage constitutes sensitive information (e.g., military spectrum) but which may be available for sharing under the control of the SSM 628. The C-FSM 620 may maintain the classified federal system information database 622 with the spectrum usage of each spectrum user and the available spectrum for sharing in a given geographical location and communicate with the SSM 628 about available spectrum in a secured manner by filtering information about the classified spectrum usage. Communication with the SSM 628 may be achieved, for example, by sending limited information about the spectrum usage only or by performing a subtask of the overall work done by the SSM 628 (which may otherwise require sensitive information about the spectrum usage of physical characteristics of the military spectrum). Some properties of the filtered spectrum information may include (but may depend on the primary spectrum in question) absence of any physical (PHY) layer characteristics of the primary spectrum users with which sharing will be done (e.g., modulation scheme or spectral masks) and absence of detailed geo-location information (e.g., location of base station or range), providing of general "availability" information only without provision of information about current usage in neighboring bands or areas. The C-FSM 620 may have the ability to conceal exact spectrum usage in a band by not making all available spectrum usable by the SSM 628. Further, the C-FSM 620 may have additional flexibility to refuse certain spectrum usage based on the identity of the spectrum user (e.g., Tier 2 or 3) proposed for usage as well as the ability to modify or set certain spectrum usage parameters initially proposed by the SSM 628. In other words, when the SSM 628 proposes some spectrum usage by a specific Tier 2 or Tier 3 spectrum user, the C-FSM 620 may have the ability to refuse such spectrum usage if it determines that such usage would create a security risk to the classified system that is allowing its spectrum to be shared. The C-FSM 620 may use the services of the SSM 628 to gain additional spectrum that may be used for classified system usage in a non-sensitive fashion and may communicate to the SSM 628 if spectrum needs to be taken back in case of emergency usage.

In addition to the ability of the C-FSM 620 to filter information presented to the SSM 628, the SSM 628 may itself be developed in conjunction with inputs from federal agencies. Since the SSM 628 is an intermediate entity between the C-FSM 620 and the spectrum users, the spectrum users may not have direct access to the filtered classified information within the SSM 628, thus providing an additional layer of security to classified Tier 1 spectrum users.

The other spectrum users 604*b* and 604*c* represent each of the secondary commercial systems that may request spectrum from the SSM 628. This may include Tier 2 spectrum users (guaranteed QoS) and/or Tier 3 spectrum users (General Access Users). A master device or entity that is responsible for spectrum management within each of these entities may communicate over the access interface with the SSM 628 to negotiate and gain access to spectrum managed by the SSM 628. The other spectrum users may indicate a preferred or required method of access (Tier 2, Tier 3, priority of access, etc.), requested bandwidth and spectrum availability time. Further, the other spectrum users 604a and 604b may indicate a requested transmit power or maximum transmit power to be used and/or provide capability information (e.g., usable frequency range or sensing capabilities) and usage parameters (e.g., spectrum mask) for each usable frequency range. The other spectrum users may also provide device and network information (e.g., radio access technology (RAT), transmitter and receiver characteristics, usable frequency range, traffic or antenna height), provide required QoS, provide information on how much the system is willing to pay for spectrum (e.g., a range of acceptable cost), adapt spectrum usage (e.g., change frequency or tier) based on reconfiguration requests from the SSM 628 at specific time periods (e.g., time to live (TTL)), stop using spectrum at the end of agreed-on usage period, or, in an emergency scenario where spectrum needs to be evacuated, perform any sensing required for use of the spectrum, return sensed information to the SSM 628, and/or allow for negotiation or coexistence with other spectrum users for common spectrum.

For LSA systems, the SSM 628 may interact directly with Tier 1 spectrum users (the LSA incumbent), and Tier 3 access may not be allowed. Instead, Tier 2 spectrum users 604b may negotiate an agreement to share spectrum through the SSM 628. Here, the SSM 628 may be a regulatory entity or a third party entity that facilitates such communication between the Tier 1 spectrum users and potential Tier 2 spectrum users 604b. Because the sharing agreement and terms may be negotiated beforehand, there may be no need for the SSM 628 to maintain any incentive or billing information. For instance, payments from Tier 2 spectrum users 604b (the LSA licensee) to the Tier 1 spectrum users (LSA incumbent) may be made prior to any spectrum usage. In this example, the only Tier 1 spectrum users may be Non-Federal spectrum users 604a or Non-Classified Tier 1 Spectrum users, and the architecture 600 may be adapted for LSA so as not to include an NC-FSM 612, a non-classified federal system information database 614, a C-FSM 620, a classified federal system information database 622, an incentive and billing database 632 or Tier 3 spectrum users 604c.

In order to use the services of the SSM 628, all entities in the spectrum sharing hierarchy may register with the SSM 628. The registration may be used to provide the SSM 628 with specific information about the entity that is likely to remain fixed in time. Examples of such information include location (of the network itself), general transmit/receive characteristics, RAT, antenna height, and sensing capabilities. For a Tier 1 spectrum user, this information may be provided by the Tier 1 spectrum user itself or by either of the C-FSM 620 (appropriately filtered to obfuscate sensitive information) or the NC-FSM 612.

The SSM 628 may employ such a registration procedure in order to later broadcast or advertise spectrum availability or potential spectrum incentive, depending on the system involved. For example, a Tier 1 spectrum user that registers with the SSM 628 may later receive regular advertisements or broadcasts about the incentive (potential payment per unit of spectrum) that it may receive if such spectrum were to become available or if the Tier 1 spectrum user would be willing to share such spectrum. For a Tier 2 spectrum user, the advertisements may indicate the required price to be paid per unit of spectrum at any given time.

Figure 7:
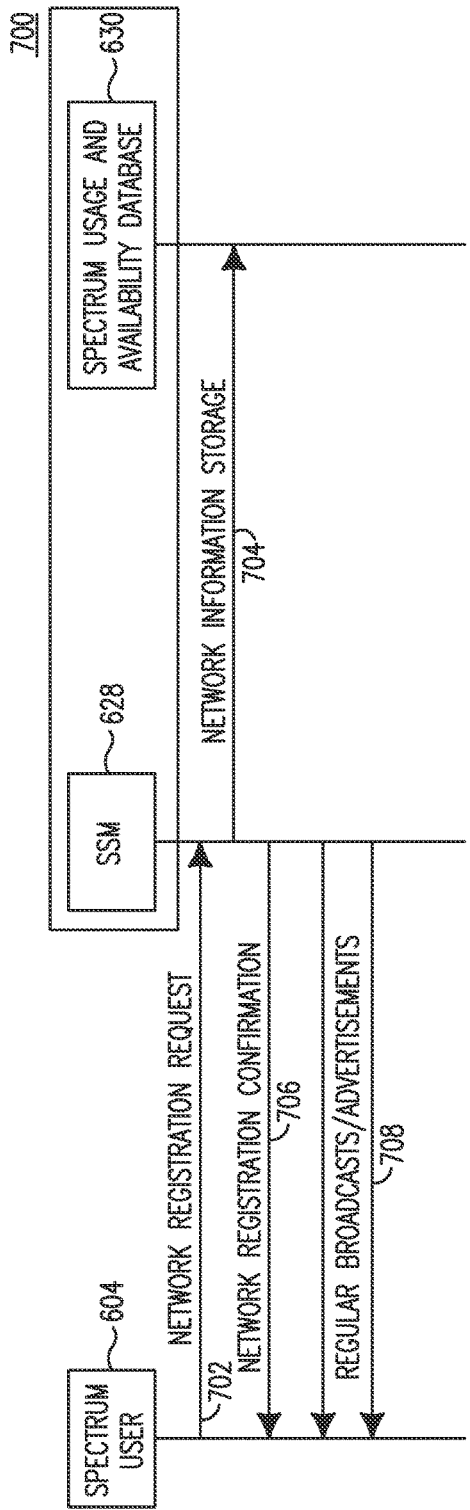
FIG. 7 is a flow diagram of an example network registration method.

FIG. 7 is a flow diagram 700 of an example network registration method. In the example network registration method, a spectrum user 604 is illustrated as interacting directly with the SSM 628. This may be the case for a non-federal spectrum user or a non-classified Tier 1 spectrum user that interacts directly with the SSM 628 as described above with respect to the architecture 600. However, this may also be generalized to the case where the NC-FSM 612 or the C-FSM 620 communicates with the SSM 628. As a result, although the information flows show the spectrum user itself, it may also be generalized to the case where the NC-FSM 612 or the C-FSM 620 communicates with the SSM 628 on behalf of one or several Tier 1 spectrum users. This may be true for other flow diagrams provided herein where a spectrum user is illustrated as communicating directly with an SSM.

In the method illustrated in FIG. 7, the Tier 1, Tier 2 or Tier 3 spectrum user 604 (as the case may be) sends a network registration request (702) with specific network information to the SSM 628. The SSM 628 may store this information in the spectrum usage and availability database 630 (704) and confirm the registration process with the requesting spectrum user 604 (706). Since the requesting spectrum user 604 may now be registered with the SSM 628, the SSM 628 may send periodic or occasional broadcasts or advertisements (708).

At some time, a spectrum user 604 may decide to de-register from the services provided by the SSM 628. In this case, the spectrum user 604 may engage in de-registration with the SSM 628.

Figure 8:
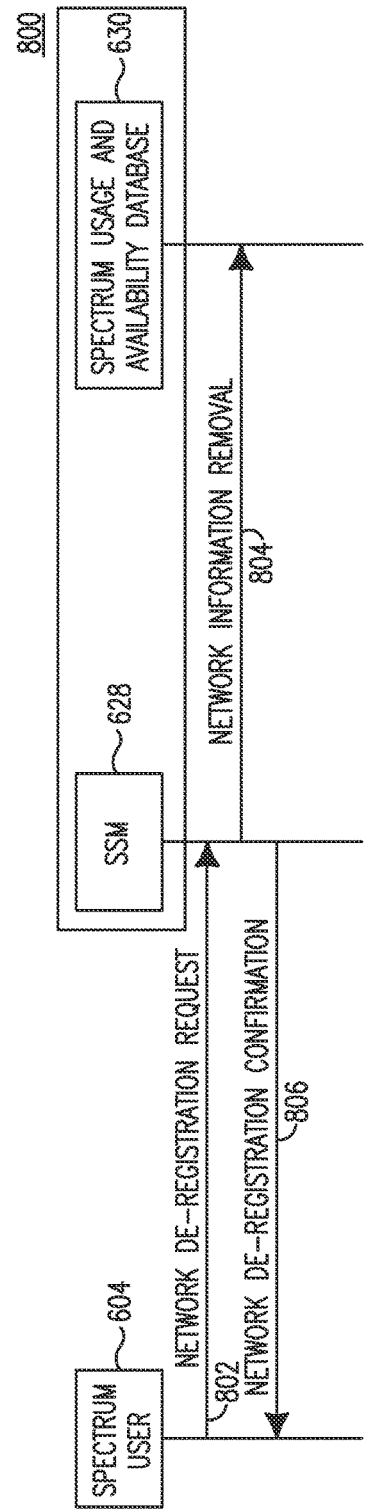
FIG. 8 is a flow diagram of an example network de-registration method.

FIG. 8 is a flow diagram 800 of an example network de-registration method. In the method illustrated in FIG. 8, the spectrum user 604 sends a network de-registration request message to the SSM 628 (802). The SSM 628 may remove the previously stored network information from the spectrum usage and availability database 630 (804) and send a network de-registration confirmation to the requesting spectrum user 604 (806). Such a de-registration process may, therefore, disable any further broadcasts or advertisements to be sent by the SSM 628 to the requesting spectrum user 604.

In a scenario where some of the static or semi-static information provided with the registration 702 changes, a spectrum user 604 may attempt to modify the information currently stored by the SSM 628 related to that spectrum user 604 through network reconfiguration.

Figure 9:
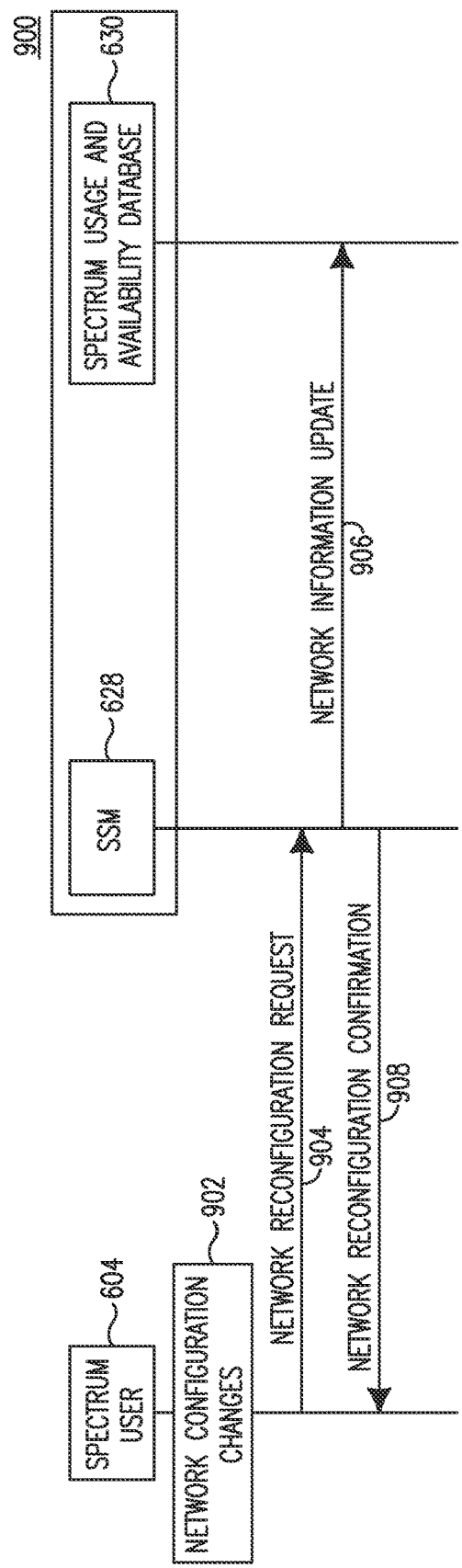
FIG. 9 is a flow diagram of an example network reconfiguration information method.

FIG. 9 is a flow diagram 900 of an example network reconfiguration information method. In the example method illustrated in FIG. 9, a spectrum user 604 that previously registered with the SSM 628 has network configuration changes (902) that it needs to make. The spectrum user 604 may send a network reconfiguration request to the SSM 628 (904), including the changed information (e.g., new location, new RAT, new transmit/receive characteristics, new antenna height, new capabilities, new bandwidth or new sensing). The SSM 628 may update the network information associated with the requesting spectrum user 604 in the spectrum usage and availability database 630 (906) and send a network reconfiguration confirmation to the requesting spectrum user 604 (908).

The spectrum sharing process may be started when one or more Tier 1 spectrum users decide that they would like to make spectrum available for sharing. The one or more Tier 1 spectrum users may determine that they have spectrum that they will not be using in part or in full and wish to make that spectrum available for sharing with other spectrum users under control of the SSM 628. The Tier 1 spectrum user may or may not have been receiving regular or occasional broadcasts from the SSM 628 of the approximate incentive per unit of bandwidth.

Figure 10:
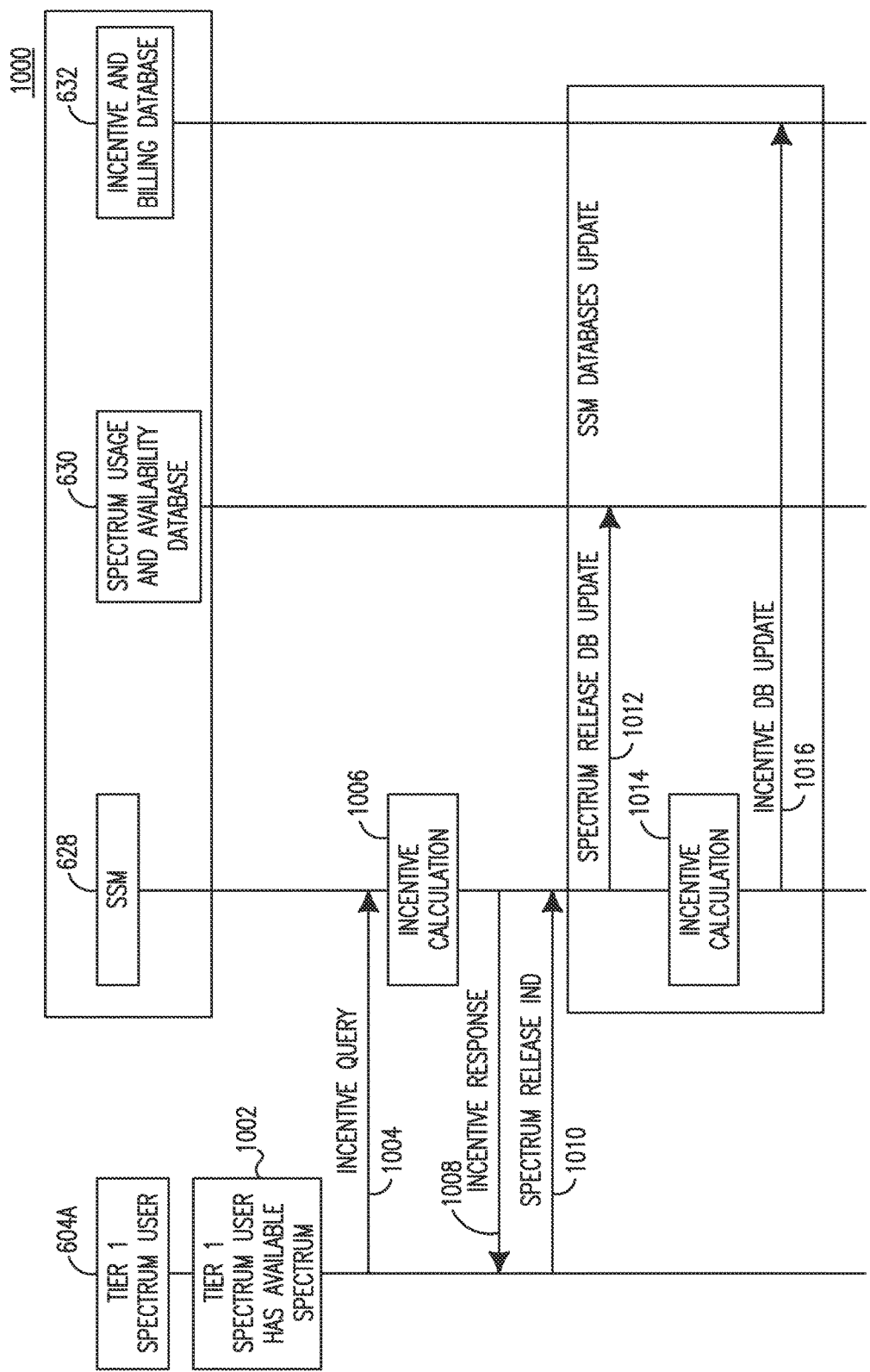
FIG. 10 is a flow diagram of an example method of a Tier 1 spectrum user making spectrum available to other spectrum users for sharing.

FIG. 10 is a flow diagram 1000 of an example method of a Tier 1 spectrum user making spectrum available to other spectrum users for sharing. In the example method illustrated in FIG. 10, the Tier 1 spectrum user 604*a* determines that it has spectrum available for sharing (1002) and sends an incentive query (1004) to the SSM 628 to find out the actual payment it may receive from the SSM 628 by making its spectrum available for use by other spectrum users. The Tier 1 spectrum user 604*a* may make this inquiry regardless of whether it was previously receiving broadcasts from the SSM 628 regarding incentives for spectrum sharing. The incentive query may include characteristics about the bandwidth the Tier 1 spectrum user 604*a* has available for sharing. Such characteristics may include, for example, the actual bandwidth/spectrum (e.g., starting frequency and ending frequency), the duration of the availability of the spectrum for sharing, the requirements for evacuation of the spectrum if the Tier 1 spectrum user 604*a* needs to reclaim the spectrum prior to the indicated duration of availability, required protection information (e.g., in the form of a maximum interference level coming from other spectrum users at a given location), and any coexistence-related information that would aid in coexistence with the Tier 1 spectrum user 604*a* (e.g., coexistence methods that are supported, if any). For example, the coexistence information may allow the Tier 1 spectrum user 604*a* and a Tier 2 or Tier 3 spectrum user that may eventually use the spectrum to share the same band in a time domain duplexing (TDD) or a frequency domain duplexing (FDD) manner so that the Tier 1 spectrum user 604*a* only gives up a portion of its spectrum. It may also include information that may allow transmission of both systems with higher power without causing interference to each other (e.g., directionality).

In response to the incentive query, the SSM 628 may calculate the expected incentive that would be paid to the Tier 1 spectrum user 604*a* if the SSM were to assign the spectrum offered by the Tier 1 spectrum user 604*a* to another spectrum user (1006). This calculation may be made immediately based on the current amount of available spectrum in the database (e.g., for a purely dynamic price setting model). In this case, the incentive may be a function of the amount of spectrum available at a given time and, potentially, other factors that are described below. Alternatively, the incentive may be based on a fixed auction procedure that occurs prior to the assignment of spectrum.

The SSM 628 may then report the calculated incentive to the requesting Tier 1 spectrum user 604*a* in an incentive response message (1008). The incentive may be reported as a dollar amount for the proposed spectrum availability and may represent a minimum or estimated incentive that may change by a certain amount when the SSM 628 makes the actual assignment to one or several spectrum users. For example, the SSM 628 may guarantee a certain minimum incentive based on the information provided by the Tier 1 spectrum user 604. The SSM 628 may then ensure that, when an assignment is made for spectrum, the pricing for the other spectrum users is designed so that this minimum incentive is collected and the promised dollar amount is provided to the Tier 1 spectrum user 604*a* providing the shared spectrum. It may also be an estimated dollar amount, which may vary by a certain delta dollar amount that is either communicated to the Tier 1 spectrum user 604*a* or known a-priori by the Tier 1 spectrum user 604*a*.

The Tier 1 spectrum user 604*a* may make a final decision on whether it wishes to share its spectrum based on the incentive response it receives from the SSM 628. For example, if the Tier 1 spectrum user 604*a* decides that the incentive is too low to justify the need to keep the spectrum available to the SSM 628 as initially promised, the Tier 1 spectrum user 604*a* may decide to not share the spectrum or may propose a modified set of characteristics in a new incentive query. If the Tier 1 spectrum user 604*a* decides that it wishes to go ahead with the sharing, it may send a spectrum release indication to the SSM 628 (1010). This indication may confirm that the spectrum initially indicated in the incentive query (and/or indicated in the spectrum release indication) is actually available to the SSM 628 to provide to other spectrum users that may wish to use the spectrum. As a result, the availability of this spectrum as part of a pool of available spectrum for the SSM 628 to allocate may be maintained in the spectrum usage and availability database 630 (1012). In addition, the SSM 628 may re-compute (e.g., if the spectrum release indication indicated a slightly different spectrum for sharing than the incentive inquiry) the actual incentive for the Tier 1 spectrum user 604*a* (1014). This incentive is may be stored in the incentive and billing database 632 (1016) so that the SSM 628 may later determine what it had promised the Tier 1 spectrum user 604*a* in question.

A Tier 2 spectrum user previously registered with the SSM 628 may request spectrum from the SSM 628 at any point in time, for example, if it needs access to new spectrum based on demand or in response to a broadcast of the approximate cost of spectrum provided by the SSM 628.

Figure 11:
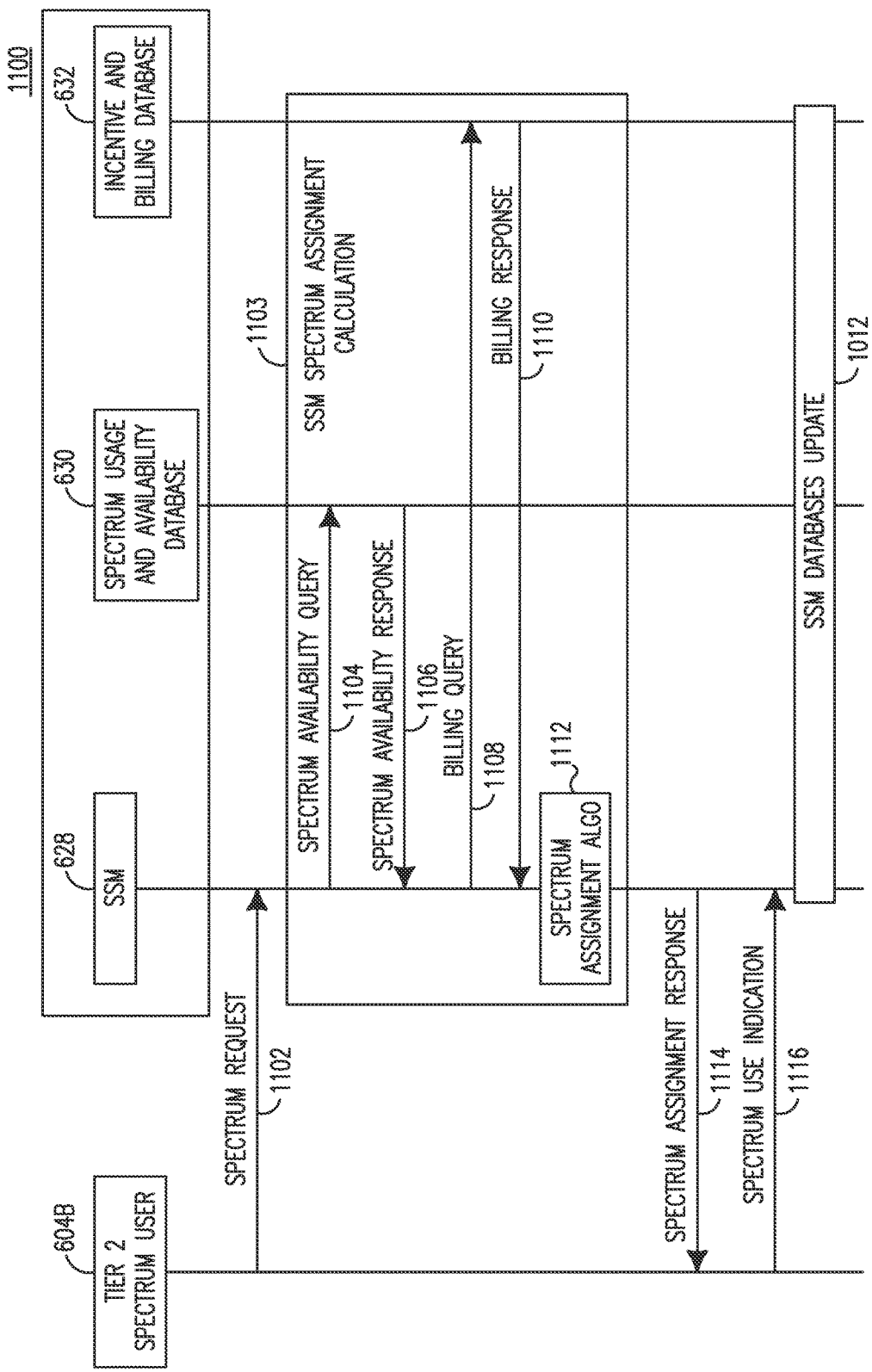
FIG. 11 is a flow diagram of an example method of a Tier 2 spectrum user requesting spectrum.

FIG. 11 is a flow diagram 1100 of a method of a Tier 2 spectrum user requesting spectrum. In the example method illustrated in FIG. 11, a Tier 2 spectrum user 604*b* sends a spectrum request to the SSM 628 (1102) (e.g., for an assignment of spectrum to use for wireless communications). The spectrum request may include information about a bandwidth required for the requested assignment of the shared spectrum (e.g., a specific bandwidth that the spectrum user is requesting or an amount of bandwidth (e.g., in a usable range) that the spectrum user is requesting) and at least one characteristic regarding a quality of access (QoA) for wireless communication on the shared spectrum that the Tier 2 spectrum user 604*b* requires. The at least one characteristic regarding the QoA for wireless communication on the shared spectrum may include, for example, a duration over which the spectrum user is requesting to use the requested spectrum, a minimum level of QoS for the requested assignment, a desired maximum transmission power for wireless communications on the requested spectrum, required coverage, or required range. In addition, the Tier 2 spectrum user 604*b* may indicate an expected price or a range of acceptable prices that the spectrum user is willing to pay for the assignment of spectrum, for example, to ensure that it does not obtain spectrum for which it is not willing to pay for associated costs. In response to the spectrum request, the SSM 628 may perform a spectrum assignment calculation (1103).

To perform a spectrum assignment calculation, the SSM 628 may run a spectrum assignment algorithm (1112), which may include the SSM 628 assigning spectrum for the requesting spectrum user 604*b* that meets the spectrum and QoA needs of the requesting spectrum user 604*b* and calculating the cost for the spectrum assignment that the Tier 2 spectrum user 604*b* must pay for use of the spectrum and that will help satisfy the incentive requirements of the Tier 1 spectrum user 604*a* whose bandwidth will be used to satisfy the assignment. The spectrum assignment and cost calculating may require use of information about the currently available spectrum, its required usage characteristics or usage restrictions associated with that spectrum, and the required incentive to be paid to the Tier 1 spectrum user or users that will be impacted. In addition, calculation of the actual cost for use of the spectrum may require knowledge of the current supply/demand situation (e.g., represented by the amount of available spectrum and information about preference for a specific Tier 2 spectrum user 604*b* (e.g., based on identification of the Tier 2 spectrum user 604*b* during the registration procedure). As a result, the SSM 628 may query its associated databases prior to and/or during the execution of the spectrum assignment calculation. In the example method 1100 illustrated in FIG. 11, the SSM 628 sends a spectrum availability query to the spectrum usage and availability database 630 (1104) and, in response, receives a spectrum availability response message from the spectrum usage and availability database 630 (1106). Similarly, the SSM 628 may send a billing query to the incentive and billing database 632 (1108) and, in response, receive a billing response message from the incentive and billing database 632 (1110).

In response to the spectrum request, the SSM 628 may send a spectrum assignment response message to the requesting Tier 2 spectrum user 604*b* (1114), which may include, for example, an assignment of the shared spectrum for the WTRU to use for wireless communications that meets the bandwidth requirement and the at least one characteristic regarding the QoA included in the spectrum request. In addition, the spectrum assignment response may include any parameters associated with the assignment of the shared spectrum (e.g., maximum power for transmitting on the shared spectrum, information about a requirement for the spectrum user to sense the shared spectrum, at least one rule regarding conditions with respect to which the WTRU is required to evacuation the shared spectrum, or overall duration of the assignment of the shared spectrum) and/or the cost associated with using the assignment of the shared spectrum. The Tier 2 spectrum user 604*b* may agree to pay the costs associated with the spectrum assignment, and it may send a spectrum usage indication to the SSM 628 (1116) in response to the spectrum assignment response, which may indicate to the SSM 628 that the spectrum user has begun using the assigned spectrum for communication. As a result, the SSM 628 may update the databases (e.g., the spectrum usage and availability database 630 and the incentive and billing database 632) to reflect that the assigned spectrum is currently being used (1012). Alternatively, the Tier 2 spectrum user 604*b* may decide that it does not wish to pay the required amount and may send a modified or altered spectrum request to the SSM 628 (not shown).

While the example illustrated in and described with respect to FIG. 11 is for a Tier 2 spectrum user requesting and receiving an assignment of shared spectrum with respect to certain QoA constraints, one of ordinary skill in the art may may easily implement a similar device, system or procedure where a Tier 3 spectrum user requested an assignment of shared spectrum without a request for certain QoA constraints on the assignment. In such an embodiment, the Tier 3 spectrum user may simply indicate that it is a Tier 3 spectrum user (e.g., that it does not require any minum level of QoS for the requested assignment).

As described above with respect to FIG. 11, a spectrum request 1102 from a Tier 2 or Tier 3 spectrum user may trigger a spectrum assignment calculation 1103 in the SSM 628. This same calculation may be triggered for other reasons, which may result in a spectrum reassignment or reallocation for one or more spectrum users. An SSM spectrum assignment calculation may be triggered, for example, by expiry of a sublicensing period of a Tier 1 spectrum user's spectrum. In this example, when the sublicensing period expires, the SSM 628 may attempt to re-assign certain Tier 2 spectrum users to other spectrum rather than having those users stop using the shared spectrum altogether (e.g., higher priority users or higher paying users may get better treatment). In another example, an SSM spectrum assignment calculation may be triggered by a spectrum re-claim request from a Tier 1 spectrum user. In this example, similar to the expiry of a lease, a re-claim request from a Tier 1 spectrum user that eliminates the Tier 1 spectrum user's spectrum from the spectrum available for Tier 2 and/or Tier 3 spectrum users may trigger the SSM 628 to perform the spectrum assignment calculation. For another example, an SSM spectrum assignment calculation may be triggered by spectrum requests from new Tier 2 spectrum users or lease extension requests from existing Tier 2 spectrum users. As with the example method illustrated in FIG. 11, these examples may require the SSM 628 to perform the spectrum assignment algorithm.

In each of the above examples, the spectrum assignments made for Tier 2 and Tier 3 spectrum users may be validated during a specific validity period or Time-to-Live (TTL). The use of a TTL may allow the spectrum assignment calculations to be localized to specific time instances only and may also reduce the number of spectrum re-assignments to different spectrum users. As a result, in an embodiment, a Tier 2 spectrum user may gain access to shared spectrum by the SSM 628 for a specific contract duration (e.g., number of months), but the spectrum may be reconfigured/changed/reduced/increased at the expiry of a TTL, which may be one or several days, for example. The TTL may be determined by the SSM 628 based on factors such as the needs of the Tier 1 spectrum users that agreed to share spectrum (e.g., how much time they allow to reclaim spectrum under normal circumstances), QoS requirements of the Tier 2 spectrum users, or the computational capabilities of the SSM 628. In addition, the TTL may be common to all Tier 2 spectrum users or may be specific to each Tier 2 spectrum user.

Figure 12:
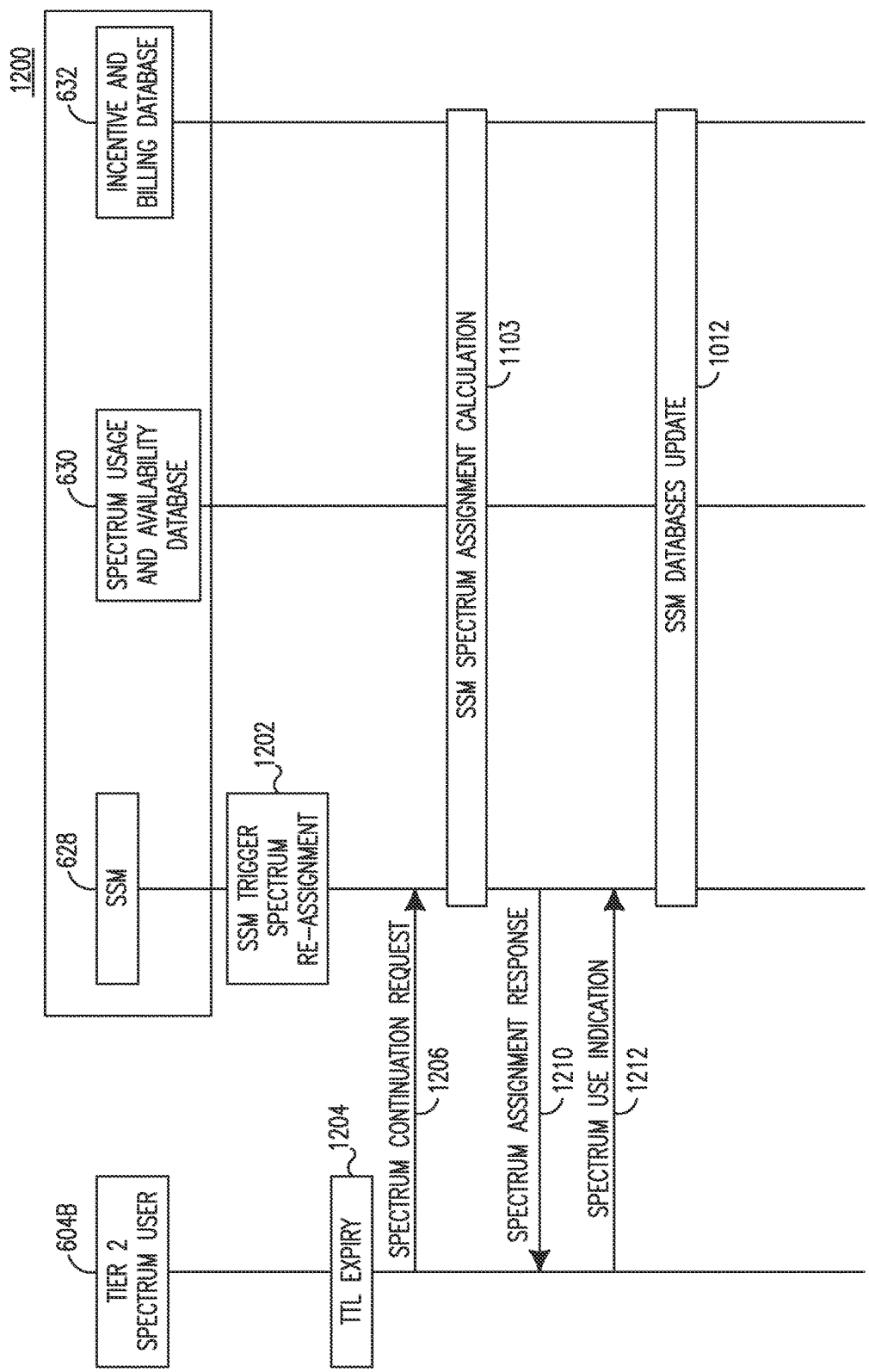
FIG. 12 is a flow diagram of an example method of spectrum re-assignment.

FIG. 12 is a flow diagram 1200 of an example method of spectrum re-assignment. The example illustrated in FIG. 12 shows how each of the triggers for a spectrum re-assignment may interact with the TTL. At each TTL boundary or validity time expiry, if any of the triggers occurred during the last TTL, the SSM 628 may trigger a spectrum re-assignment (1202). Such triggers may include, for example, expiry of a leasing period of a Tier 1 spectrum user's spectrum, a spectrum re-claim request from a Tier 1 spectrum user, a spectrum request from a new Tier 2 spectrum user, or a spectrum lease and/or extension request from an existing Tier 2 spectrum user, as described above. At the expiry of the TTL (1204), the Tier 2 spectrum user 604*b* that is currently using spectrum may send a spectrum continuation request (1206), which may indicate to the SSM 628 that it wishes to maintain the current amount of spectrum use and QoS. Alternatively, the message may indicate to the SSM 628 that the spectrum needs of the Tier 2 spectrum user are larger or lesser for the next validity period. The Tier 2 spectrum user may also request a change of the TTL value itself through this mechanism. Based on the triggers and information provided in the spectrum continuation request, the SSM 628 may execute the spectrum assignment algorithm (1103) and send a spectrum assignment response message to one or more Tier 2 spectrum users 604b (1210) with the new (potentially modified) spectrum assignment, usage parameters (e.g., transmit power), etc. If the one or more Tier 2 spectrum users 604b accept the new assignment and send a spectrum use indicator to the SSM 628 (1212), the SSM 628 may update its current spectrum usage and cost/incentive tracking information in the appropriate database(s) accordingly (1012).

As another alternative, spectrum reassignment within the SSM 628 may be triggered at times that do not fall on the boundaries of the TTL. Accordingly, in another embodiment, a Tier 2 spectrum user may independently decide to change its spectrum usage during the lease or rental period based on its own needs (at a TTL boundary or otherwise). One example of such a change in spectrum usage may be to enable the Tier 2 spectrum user to save money (e.g., reduce costs) by dynamically reducing transmit power, bandwidth, etc. The Tier 2 spectrum user may decide to make such a decision based on the cost savings expected for a reduction in bandwidth or transmit power at any given time during the usage of shared spectrum. This information may be inherent in the initial contract or spectrum request/response information, may be broadcast periodically by the SSM 628, or may be explicitly requested by the Tier 2 spectrum user 604b. In learning that there may be a significant cost savings associated with a reduction in its shared spectrum usage, as well as the fact that the Tier 2 spectrum user 604b can function with such a reduction in bandwidth usage for a period of time, the Tier 2 spectrum user 604b may effectively sell back spectrum to the SSM 628.

Figure 13:
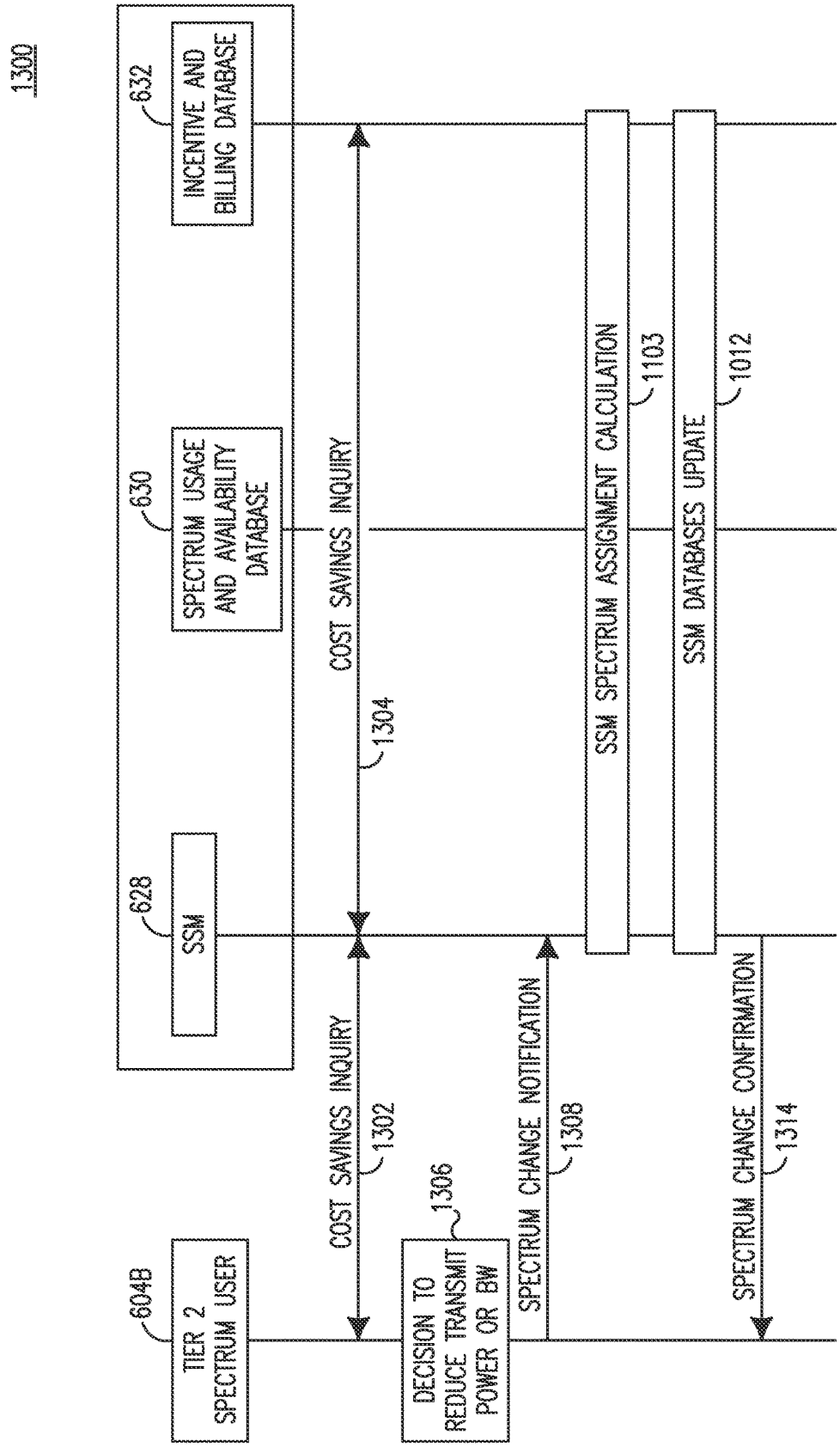
FIG. 13 is a flow diagram of an example method of Tier-2-spectrum-user-triggered spectrum re-assignment.

FIG. 13 is a flow diagram 1300 of an example method of Tier-2-spectrum-user-triggered spectrum re-assignment. In the example illustrated in FIG. 13, a Tier 2 spectrum user 604b learns of potential cost savings for reduction in shared spectrum through a costs savings inquiry with the SSM 628 (1302), which may effectively obtain this information from the incentive and billing database 632 and some calculations/estimates (1304). The cost savings inquiry may be associated with effective bandwidth reduction or power reduction that is planned or may be represented as a unit bandwidth or power reduction. If the Tier 2 spectrum user 604b decides to reduce transmit power or bandwidth (1306), it may send a spectrum change notification indicating the new transmit power (e.g., less than the maximum transmit power initially awarded by the SSM 628) and/or bandwidth (e.g., subset of the bandwidth initially awarded by the SSM 628) (1308). The SSM 628 may then execute the spectrum assignment algorithm, for example, using information in its databases to determine a new set of usage characteristics for the Tier 2 spectrum user, if applicable, in order to ensure overall bandwidth usage efficiency. The proposal of the Tier 2 spectrum user 604b may, alternatively, be taken as is without change. The new cost and incentive information may then be calculated (1103), and the SSM 628 may update databases (e.g., the spectrum usage and availability database 630 and the incentive and billing database 632) accordingly (1012) before confirming the new usage parameters, cost, etc. with the Tier 2 spectrum user 604b (1314).

In order to motivate more efficient usage of spectrum by Tier 2 and Tier 3 spectrum users and to provide the SSM 628 with a tool to evaluate the available spectrum, in an embodiment, the SSM 628 may evaluate a spectrum user's spectrum usage through an extended pixel approach. The pixel-based approach was first used to define the specific geographical areas (e.g., 100 m×100 m) whereby the TVWS database would allow for transmission up to a certain maximum power. In the extended pixel-based approach, the pixel may be extended to include the bandwidth dimension as well as the dimension of out-of-band interference. It may be further generalized so that the approach may also be used not only to specify the maximum transmit power for a device but also to measure or evaluate the amount of spectrum that a spectrum user is using.

The larger the area or the greater the bandwidth used by a spectrum user, the more that spectrum user may preclude use of spectrum by other spectrum users due to interference. Consequently, a greater use of spectrum (e.g., geographically, temporally, or in frequency range) may result in a higher cost to a spectrum user trying to use the spectrum. To effectively evaluate the amount of spectrum precluded for other users, an extended pixel may be defined in units of $m^2 *MHz$. In addition, the precluded spectrum may include not only the active channel of the system being considered but also its adjacent channels (e.g., to account for out-of-band emissions of the spectrum user). Since a wireless system may be characterized by a spectrum mask (e.g., maximum spectral density of its transmission at a given frequency), the preclusion area may depend on the channel being considered and so each channel or bandwidth portion may be separately analysed.

Figure 14:
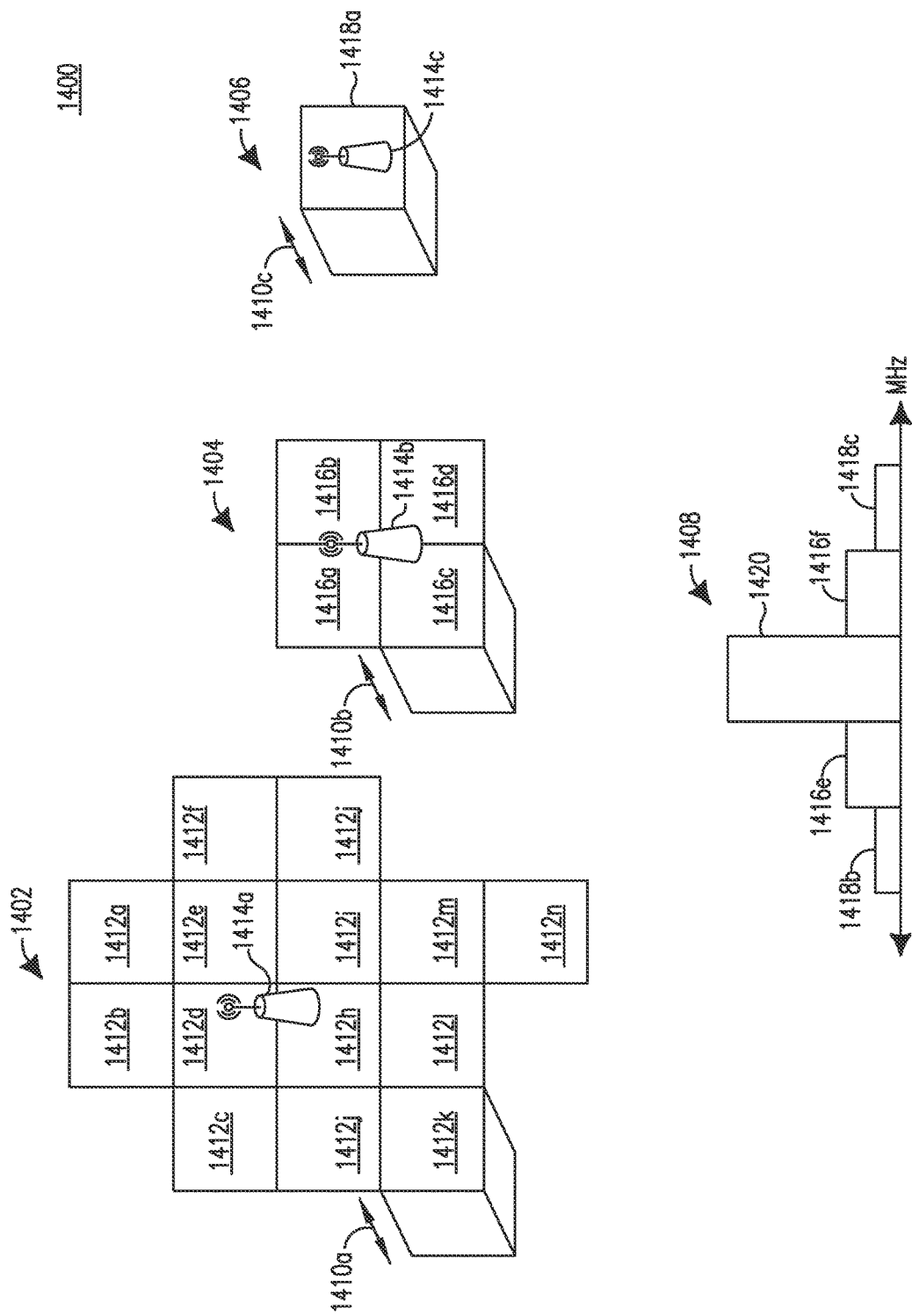
FIG. 14 is a high-level diagram of example preclusion areas.

FIG. 14 is a high-level diagram 1400 of example preclusion areas. The example illustrated in FIG. 14 shows the high-level concept of extended pixels when calculating the preclusion area (and effectively the used spectrum) for a spectrum user. In the illustrated example, a spectrum user may be an AP or base station. On the active channel 1402, the transmission by the AP 1414a occupies bandwidth 1410a and occupies the geographical area represented by 1412a, 1412b, 1412c, 1412d, 1412e, 1412f, 1412g, 1412h, 1412i, 1412j, 1412k, 1412l, 1412m, and 1412n. On a first adjacent channel 1404, the out-of-band emissions by the same base station 1414b may occupy the geographical area represented by 1416a, 1416b, 1416c, and 1416d for the bandwidth 1410b. And on a second adjacent channel 1406, the out-of-band emissions by the same base station 1414c may occupy the geographical area represented by 1418a. Since base station transmission on the adjacent channels 1404 and 1406 is lower than that on the active channel 1402 (e.g., due to out of band rejection), the precluded geographic area on the adjacent channels is smaller. Overall, a spectrum user's preclusion area may be the sum of the bandwidth*area products on each of the channels considered. The spectrum mask for a Tier 2 spectrum user 1408 is also shown in FIG. 14. The preclusion areas for the active channel 1402, the first adjacent channel 1404 and the second adjacent channel 1406 are represented by 1420o, 1416e and 1416f, and 1418b and 1418c, respectively.

Calculation of the precluded area may be made in any of several ways. The spectrum mask of an AP or base station that represents the highest power transmission may be used to define the emitted power at a specific location, and propagation models may be used to estimate the geographical area over which the effective isotropic radiated power (EIRP) due to this transmission may remain above a defined threshold value. Margins may then be built into the propagated signal power to account for the presence of mobile devices, which may add to the level of signal power at a given location. The threshold value ($EIRP_{thresh}$) use to define the extent of the preclusion area may depend on the neighboring spectrum user being considered. For example, for evaluating the amount of spectrum used for evaluation of cost or pricing, the SSM 628 may use a fixed threshold $EIRP_{thresh}$, which may represent an average of the maximum EIRP values that would allow other systems to operate properly with the given amount of interference in that area. Alternatively, if the SSM 628 would like to evaluate the ability of two neighboring systems to operate (for example, during the process of spectrum allocation), $EIRP_{thresh}$ may equal the actual threshold value of the spectrum users themselves.

A procedure for calculating spectrum preclusion based on the above example may be as follows. A master device or management entity in a Tier 2 or Tier 3 spectrum user (e.g., a BS or AP) may provide its own geographical location to the SSM 628 along with its spectrum mask. Such information may be provided in the spectrum request sent to the SSM 628. The management entity may, for example, reside in the operator operations, administration and management (OA&M), for example. A master device may also provide to the SSM 628 (e.g., in the spectrum request) some coarse information about the mobiles stations (e.g., the maximum number of mobile stations, their own spectrum mask, or expected speed) that may be necessary in computing a margin. The SSM 628 may use the information obtained from the master device or management entity to compute the precluded spectrum. The SSM 628 may use the actual precluded area information and any information about neighboring spectrum users (e.g., including $EIRP_{thresh}$ for those spectrum users) to determine the actual geographical usage of spectrum by the spectrum users. The SSM 628 may also use the computed precluded spectrum as part of the calculation of cost/price that the Tier 2 or Tier 3 spectrum user may pay per unit of time. Other factors may affect the actual cost of spectrum and are described in more detail below.

Another approach calculating a preclusion area may be to have the spectrum user or the SSM 628 calculate or estimate the EIRP at each pixel based on the devices in each pixel and their allowable maximum transmit power. This may require the approximate geographical location of each device (or at least the pixel in which that device resides). By defining large enough pixels, the calculation or estimation procedure may not need to be repeated very frequently. In this case, preclusion area calculation may be more dynamic (rather than a static and approximate area for preclusion), and the preclusion may be monitored as the spectrum user changes and devices move.

A procedure for calculating spectrum preclusion based on the above example may be as follows. Slave devices or mobiles may report their geographical locations to a master device and update that location each time the mobile device moves by a certain amount or moves out of a pixel. A master device may collect the slave devices' locations and, using their spectrum mask and the master's spectrum mask, compute an EIRP per pixel. The EIRP per pixel may be sent to the SSM 628 that uses the result as described in the first example (e.g., for spectrum occupancy as well as cost calculations).

The extended-pixel method for evaluation of the amount of spectrum used by a spectrum user may include use of a mechanism that is similar to that developed in OFCOM for TVWS. In the United States, the FCC defined exclusion zones that protect the primary user using contours (e.g., circular areas centered around a broadcast station that do not allow transmission by white space devices (WSDs) in order to protect the broadcast systems from WDS interference). In the context of spectrum usage required by a Tier 2 spectrum user, a similar approach may be used. A Tier 2 spectrum user in the 3-tier approach must be guaranteed some protection from harmful interference by the SSM 628. As a result, its usage may involve the definition of a protected contour. In this case, a Tier 2 spectrum user, when contacting the SSM 628, may indicate the following information to the SSM 628: the location of one or more APs, BSs and/or mobile stations, the center and size of one or more protection contours to be defined for the system on a specific band of frequencies and the required rules for systems transmitting on bands or channels adjacent to the spectrum used by the spectrum user. The one or more protection countours may define the geographical boundaries for neighboring systems that may operate a co-channel with the Tier 2 spectrum user. With respect to required rules for systems transmitting on bands or channels adjacent to the spectrum used by the spectrum user, for example, the Tier 2 spectrum user may indicate to the SSM 628 that, in adjacent channels, spectrum users are to be limited to a reduced maximum transmit power and are to have a certain spectrum mask that guarantees a specific amount of rejection into the adjacent band.

Alternatively, the Tier 2 spectrum user may send the characteristics of its system (e.g., interference limits, locations of BSs and/or devices) to the SSM 628, and the SSM 628 may itself compute the contours and the required rules for spectrum users operating in the adjacent bands.

In both scenarios (Tier 2 computed contours and protection criteria as well as SSM computed contours and protection criteria), the SSM 628 may then evaluate the cost of the spectrum in terms of preclusion of other users. Such cost may involve attaching a quantitative value to the following factors based on the computation of the contours and the technical parameters: the actual geographical area ($m^2$) of the one or more protection contours, the bandwidth (MHz) over which the protection contours may take effect, the relative restrictiveness of the adjacent channel rules to be imposed, and the relative time of use required by the Tier 2 spectrum user (e.g., percentage and usage). With respect to actual geographical area, the larger the area, the larger the associated cost. With respect to bandwidth, the greater the bandwidth over which the protection contours apply, the larger the associated cost. With respect to relative restrictiveness of the adjacent channel rules to be imposed, for example, the transmit power limits on the adjacent channel/band may be compared to a reference power for a typical Tier 2 spectrum user, and the difference in power may be used to evaluate the cost. The larger the difference in power, and the larger the bandwidth over which the power limits are applied, the larger the associated cost.

To facilitate spectrum sharing, an incentive structure may be used that allows spectrum owners to be compensated for renting or subleasing un-used spectrum. The incentive structure may be based on providing the Tier 1 spectrum users with sufficient incentive to make spectrum available for sharing and providing operators that comprise Tier 2 and Tier 3 spectrum users with sufficient guarantee of the availability of spectrum at a specific price such that they will invest in equipment and infrastructure to take advantage of the spectrum and create demand to support the incentives.

Figure 15:
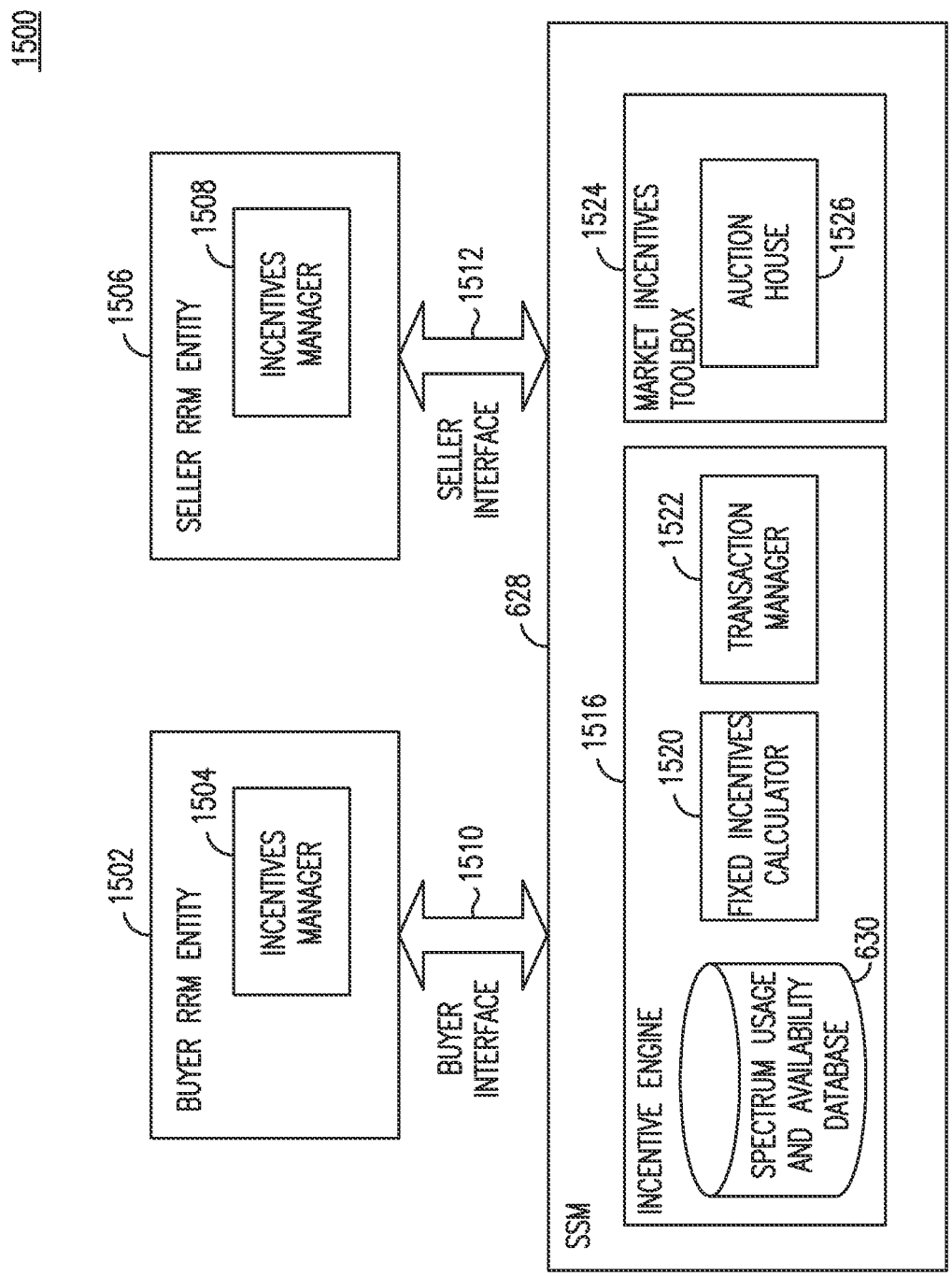
FIG. 15 is a block diagram of an example architecture for a shared spectrum manager (SSM)

FIG. 15 is a block diagram 1500 of an example architecture for an SSM 628. The example SSM 628 illustrated in FIG. 15 includes an incentives engine 1516 and a market incentives toolbox 1524. The example incentives engine 1516 includes the spectrum usage and availability database 630, a fixed incentives calculator 1520, and a transaction manager 1522. The example market incentives toolbox 1524 includes an auction house 1526. The SSM 628 may use these entities to enable the incentive structure. The SSM 628 illustrated in FIG. 15 may interface with a buyer radio resource management (RRM) entity 1502 via a buyer interface 1510 and a seller RRM entity 1506 via a seller interface 1512. The buyer RRM entity 1502 illustrated in FIG. 15 includes an incentives manager 1504, and the seller RRM entity 1506 illustrated in FIG. 15 includes an incentives manager 1508.

Incentives paid to Tier 1 spectrum users may be fixed or market based. With fixed incentives, the incentive may not depend on supply and demand and may have a value that is predetermined prior to use of the spectrum. Market based incentives may fluctuate based on a number of available buyers and sellers.

The spectrum usage and availability database 630 and the fixed incentives calculator 1520 may be needed for a fixed incentives structure, and the auction house 1526 and the transaction manager 1522 may be needed for a market incentives structure (both of which are described in detail below). The transaction manager 1522 may include both the incentive and billing database 632 of FIGS. 6A and 6B as well as some active portion of the SSM 628 that processes transactions associated with billing and incentives. Additionally, any party wishing to buy or sell spectrum may need to support an incentives manager. In an embodiment, a party may be both a buyer and seller. For market-based incentives, the SSM 628 may support the auction house 1526 and act as an intermediary between the buyer and seller. After the buyer and seller come to an agreement, the transaction manager 1522 may handle the account information and manage a secure transaction. In the example illustrated in FIG. 15, only the entities or subcomponents of the SSM 628 that deal with the incentive structure (e.g., determination of incentive and cost) are shown. For example, in the case of the SSM 628, there may be subcomponents that manage and determine what frequency spectrum may be assigned to which spectrum user. However, these subcomponents are not shown in FIG. 15 in order to focus the discussion on the incentive structure only.

In the example architecture illustrated in FIG. 15, a Tier 2 re-seller may have an incentives manager with both a buyer interface 1510 and a seller interface 1512. In this manner, a Tier 2 spectrum user may buy spectrum for a longer term and re-sell it for a shorter term in a dynamic manner. It may also realize, during the use of its spectrum, that it may operate (e.g., on the shorter term) with a lower maximum transmit power or a lower total spectrum amount. In this case, it may act as a seller of spectrum, whereby the SSM 628 may act as the buyer.

Fixed incentives may be set by a regulator, calculated by the SSM 628 or negotiated with a Tier 1 spectrum user using a fixed scheme. In this case, upon receiving a spectrum request from a Tier 2 spectrum user, the SSM 628 may simply look up the fixed incentive value in the database and relay that value to the Tier 2 spectrum user, which may then accept or decline the offer. The transaction manager may then process the payment. In an embodiment, the incentive price may be composed of multiple fixed price factors, and the SSM 628 may use the fixed incentives calculator 1520 to calculate the fixed incentive based on one or more of the following information about the request: time, frequency and space resources required, adjacent channel leakage ration (ACLR) quality, adjacent channel selectivity (ACS) quality, radio technology efficiency (e.g., LTE, WiFi or WiMax), impact on other users in the network, power limit and price limit.

Some of these factors may also be combined by the SSM 628 or the Tier 2 or Tier 3 spectrum users into a mapping of the precluded spectrum. In this example, the incentive price may be a function of the precluded spectrum and, in an embodiment, one or more other factors.

In an example, the incentive price may be calculated given regulated or negotiated prices per unit set by the regulator or the owner of the spectrum. An example calculation is given by:

$$\text{Incentive Price} = (\text{price factor/Time}) * (\text{price factor/active channel bandwidth}) * (\text{price factor/active channel usage area}) * Tx\_Index * Interference\_Index,$$

where there may be a regulated or set price and units for time, active channel bandwidth, active channel usage area, etc. The Tx_Index may be defined based on some parameters of the ACLR and the ACS. The Interference_Index may be a measure of how much the spectrum user may impact other users and preclude them from using spectrum.

In another example, the incentive price may be calculated based on the precluded spectrum described above, such as given by:

$$\text{incentive price} = (\text{precluded spectrum}) * (\text{price factor/time}).$$

In an embodiment, discounts may be made available if the spectrum is purchased for an extended period of time, if larger frequency blocks are used, if a larger pixel area is bought, if the operator managing a second or third Tier spectrum user has priority from the regulator perspective, etc. Further, the price per pixel may vary depending on factors such as population density.

Operators may have certain priority (and, therefore, may take advantage of discounts) based on different factors. For example, operators with a large customer base or large expenditures on the purchase of licensed spectrum may enjoy such priority. Alternatively, regulators may give priority to smaller operators that have less licensed spectrum in an attempt to create a more balanced market for wireless services. In addition, some agreements may be made by certain operators with the regulators to guarantee that they will buy in to a certain amount of spectrum on a yearly basis as long as they have such priority. This agreement may also include having the operator pay for some costs of building or maintaining the SSM 628. In this case, these factors may be made available to the SSM 628 through the policies provided by the administration.

In embodiments where market factors are used to determine the incentives, the owner may trade its spectrum using the SSM 628 if it supports an incentives manager 1508 and the SSM 628 supports an auction house 1526 that uses market mechanisms. Market mechanisms may also be used to increase user quality of experience by enabling Tier 2 spectrum users to re-sell spectrum in a dynamic, time-dependent fashion, which may leverage different levels of service purchases by an end user. Market incentive mechanisms may take the form of automated auctions, of which there may be many forms. Messages and signaling related to market incentives are described below.

Under a market incentives structure, an auction may begin with at least one initial maximum bid from a buyer or one minimum ask from a seller. Buyers and sellers may post multiple offers using different combinations of the bid and ask information elements. Once a bid is accepted by a seller, or an ask is accepted by a buyer, there may be a market window whereby competing offers can be sent. If the market window expires, then the deal may closed, and the details may be sent to the transaction manager to process the accounts of both parties.

Figure 16:
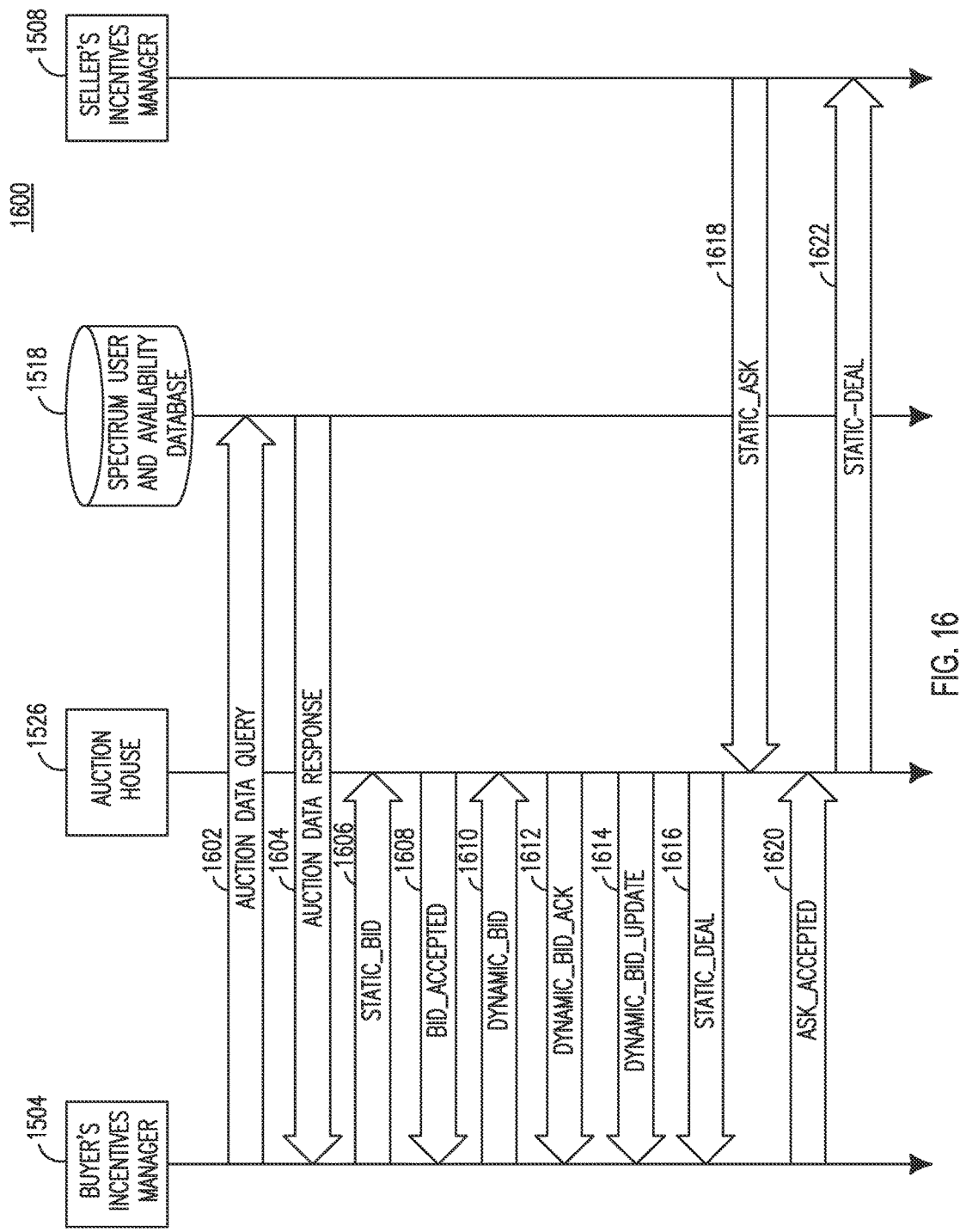
FIG. 16 is a diagram of an example of messages that support auction mechanisms.

FIG. 16 is a diagram 1600 of an example of messages that support auction mechanisms. In the example illustrated in FIG. 16, a buyer's incentives manager 1504 may send an auction data query to a spectrum usage and availability database 630, including information about regions of interest and certain filters (e.g., time range, price, bandwidth, and/or quality of access) (1602). The spectrum usage and availability database 630 may respond with an auction data response, including, for example, current bid specifications for public auctions and current ask specifications for public auctions (1604). An auction may then be carried out according to any of the following. The buyer's incentive manager 1504 may send a static bid including, for example, bid specifications (1606) to an auction house 1526, and, if the bid is accepted, the auction house 1526 may respond with a bid accepted message (1608). If the bid is not accepted at that time, the buyer's incentive manager 1504 may send a dynamic bid to the auction house 1526 including, for example, bid specifications (1610), and the auction house 1526 may respond with a dynamic bid acknowledgement (1612), a dynamic bid update including, for example, a bid specification update since the last auction data query was sent (1614) and a notification that a static deal is accepted, rejected or pending (1616) depending on the status of the static deal at that point in time. Alternatively, the seller's incentives manager 1508 may send a static ask including, for example, ask specifications to the auction house 1526 (1618). If the ask is accepted, the buyer's incentives manager 1504 may send an ask accepted message including, for example, an ask specification (1620) to the auction house 1526. Depending on the status of the deal, the auction house 1526 may send a static deal accepted, rejected or pending message to the seller's incentive manager 1508 (1622).

FIG. 17 is a diagram 1700 of example information elements (IEs) associated with bid and ask messages. The example IEs illustrated in FIG. 17 include an Ask ID, Source ID, Destination ID IE 1702, an expiration time IE 1704, an enumeration of radio resources IE 1706 (e.g., indicating time, space and/or bandwidth information), a radio capabilities IE 1708, a transmit spectrum mask specifications IE 1710, a transmit power limit IE 1712, an ACS specification IE 1714, a radio technology IE 1716, a price IE 1718 and an agreement model IE 1720.

The dynamic for setting the price (e.g., for long term contracts or short-term spot pricing) may need to be slightly different than in the case of traditional goods in a market environment because spectrum usage itself may not be stored. Instead, such a market may be similar, for example, to that of the wholesale and distribution of electricity. One or more models (e.g., as described below) may be used in the context of the SSM 628.

In a uniform clearing price model, the sellers (e.g., Tier 1 spectrum users or spectrum re-sellers) that are willing to share spectrum may inquire with the auction house (e.g., for their desired incentive). The SSM 628 may service all spectrum requests from the lowest ask to the highest ask until all the demand is met, and the actual price set may be the one that satisfied the last demand. This approach may eliminate any unfair price discrimination based on the band of use because all available spectrum may be shared at the same price at a given time. It may also force Tier 1 spectrum users to keep their asks low in a high demand market, which may favor the development of more efficient ways for Tier 1 spectrum users to share spectrum as well as the need to share more spectrum. However, it may be difficult using this model to give Tier 2 spectrum users an exact cost of spectrum when a request for it is made. This model may assume that multiple Tier 1 spectrum users are present.

In a pay as ask price mode, Tier 1 spectrum users that are willing to share spectrum may also place asks with the SSM's auction house, but the money they receive may correspond exactly to the asks that they make. In this model, the motivation for Tier 1 spectrum users to share spectrum may be higher (e.g., because they may dictate the exact incentive they will receive).

In a combined ask and bid model, Tier 1 spectrum users may submit asks, and Tier 2 spectrum users may submit bids. The bids may be made publicly available such that the involved parties may arrive at an equilibrium point of supply and demand. There may be some restriction on the bids or the asks. For example, the asks may include the technical specification of the band to be sold (e.g., space-time-frequency, ACLR, ACS, etc.), and the bids may include only a price for that resource. Since different specifications may lead to different price outcomes, the seller may post multiple asks for the same resource (e.g., in the form of Ask1 OR Ask2 OR Ask 3).

In an SSM-modified price model, any of the models described above may be modified by having the SSM 628 build in some restrictions or incentive modifications based on specific factors. For example, a uniform clearing price model may be used for the bid on a long term (e.g., 1 year) contract for a spectrum user to use spectrum. However, the final incentive given to the Tier 1 spectrum user may be modified based on certain policies or efficiency criteria that the SSM 628 may enforce. Examples of these policies (which the SSM may receive through an interface with the administration or may be built into the SSM algorithm) may include the SSM awarding a larger incentive to Tier 1 spectrum users that provide more information about the Tier 1 spectrum user that may aid in coexistence (e.g., providing PHY layer timing, modulation, or other code information that may enable transmission of the Tier 1 and Tier 2 spectrum users on the same band without mutual interference), the SSM awarding a larger incentive for spectrum that may have a smaller number of expected interruptions from the Tier 1 spectrum user during the awarded time for that spectrum (whether that spectrum is long-term contract spectrum or short term spectrum relying on spot pricing), and the SSM (or some regulation that may govern it) may require larger incentives to certain types of spectrum. With respect to the SSM awarding a larger incentive for spectrum that may have a smaller number of expected interruptions from the Tier 1 spectrum user during the awarded time for that spectrum, these larger incentives may be generated by charging a higher price to Tier 2 spectrum users due to the higher QoS of that particular spectrum. Spectrum with constant interruptions may still be valuable to some operators, as long as percentage usage is guaranteed. Other operators may require predefined guarantees of usage times. With respect to the SSM requiring larger incentives to certain types of spectrum, Tier 1 spectrum users, for example, sharing sensitive spectrum such as spectrum used for military radar may be rewarded a larger incentive due to the more complex mechanisms required to safely share such spectrum. Alternatively, military spectrum may be cheaper for Tier 2 spectrum users who invest more money into more complex hardware to achieve coexistence.

An SSM 628 may make use of pricing and agreement models to enable spectrum access through one or both of LSA and PCAST models. The agreement models may include, for example, rental agreements, sublease agreements and shared ownership agreements.

In an embodiment, the SSM 628 may include a transaction manager, which may include account information for parties involved in an agreement and may serve to process funds transactions. In an embodiment, the SSM 628 may have built-in security features to protect such information.

For very dynamic interactions, frequent monetary transactions may not be feasible, in which case intermediate tokens may be exchanged instead. Tokens may have some monetary value paid out at the end of a time period (e.g., monthly). Alternatively, a token may be a regenerating value, where the regeneration rate may depend on the amount of money paid, and there may be a maximum number of tokens that a party can amass.

When a deal is reached between the buyer and seller (e.g., through the auction house function or the fixed incentives calculator), a message with the details of the deal may be sent to the transaction manager, which may enact the transaction of funds and send an update message to the database when the transaction is complete. Regulations may also be built into this approach to further protect the interest of major spectrum users by ensuring a certain percentage of spectrum be made available to them through a long-term contract opportunity.

In an embodiment, a rental agreement (e.g., an LSA agreement on the scale of months or years) may be made between the license owner of the spectrum and a radio network operator for a specified amount of money in exchange for a specified amount of spectrum resources. A rental agreement may be sold back to the licensee or to a third party, which may be at a different rent price than the original rental agreement.

As a result of a negotiation, the transaction manager may transfer funds from the buyer's account to the seller's account. In an embodiment, a rental agreement may include a discounted renewal price. This may add value to the spectrum, giving further incentive for a spectrum user to buy the spectrum since a Tier 2 spectrum user may invest in infrastructure knowing that it may benefit from its renewal agreement to outbid other spectrum users.

In an embodiment, a sublease agreement may be made between the license owner (or the rental agreement owner if one exists) and a buyer where money or tokens may be transferred in exchange for a specified amount of spectrum resources. The sublease agreement would need to abide by the rules of the original rental agreement, and further conditions may be added to the sublease agreement. A sublease agreement may be used for temporary automated spectrum agreements on the order of days, minutes, seconds, etc. It may also be possible to further allow subleases since the sublease owner may be considered to own that spectrum.

For example, an operator may enter a rental agreement, an innovator network may enter a sublease agreement, and a specific AP on the innovator network may further enter a sublease on the sublease, creating a layered network architecture. Sublease agreements may be sold back to the licensee, or sold to a third party, potentially at a different price than the original rental agreement.

In a shared ownership agreement, multiple spectrum users may enter into an agreement to share spectrum with certain constraints involved. Such an agreement may add value to a band to allow general access to a band, but only for a specific standard, such as LTE. This may eliminate the need for coexistence procedures with WiFi and may improve overall spectrum re-use and performance while allowing competition. The multiple operators may then independently coordinate the usage of the allocated spectrum among themselves directly (if there are few operators involved) or through the use of a third party management entity (for example, in the case of general access for one specific RAT), or the shared ownership agreement may assume that no coordination is made (e.g., in the case of WiFi networks). In an embodiment, a coexistence standard may be applied to this type of spectrum ownership model.

One way to implement a shared ownership agreement may be to prioritize access based on regenerative tokens. For example, a first spectrum user U1 may spend one dollar on some spectrum, and U1's tokens may regenerate at a rate of one token per time unit. When a second spectrum user U2 places two dollars on the spectrum, U2 may gain two tokens per time unit and may out-bid U1 on short term spectrum allocations. Alternatively, a fixed number of tokens may be generated throughout the spectrum and may be distributed to users proportional to their share of the spectrum. This may allow for a token cap to be established as part of the shared agreement model and may allow innovative users without a large capital (e.g., in the order of billions of dollars) to enter the market in target locations and obtain access to a least some portion of spectrum as needed.

In an embodiment, the SSM 628 may use federal spectrum to satisfy the spectrum needs of Tier 2 and Tier 3 spectrum users. In such an embodiment, information about how such spectrum is used may be classified to the federal government and, accordingly, may not be shared. In the example architecture illustrated in FIGS. 6A and 6B, the C-FSM 620 is included in the federal spectrum domain. The C-FSM 620 may interact with the SSM 628 and may filter the information about the current usage of spectrum (the usage of which may be considered to be classified information) so that this information may not be visible to the SSM 628 or to any of the spectrum users (e.g., 604a, 604b or 604c) that use the services of the SSM 628. Spectrum under control of the C-FSM 620 may be referred to hereafter as classified spectrum.

Figure 18B:
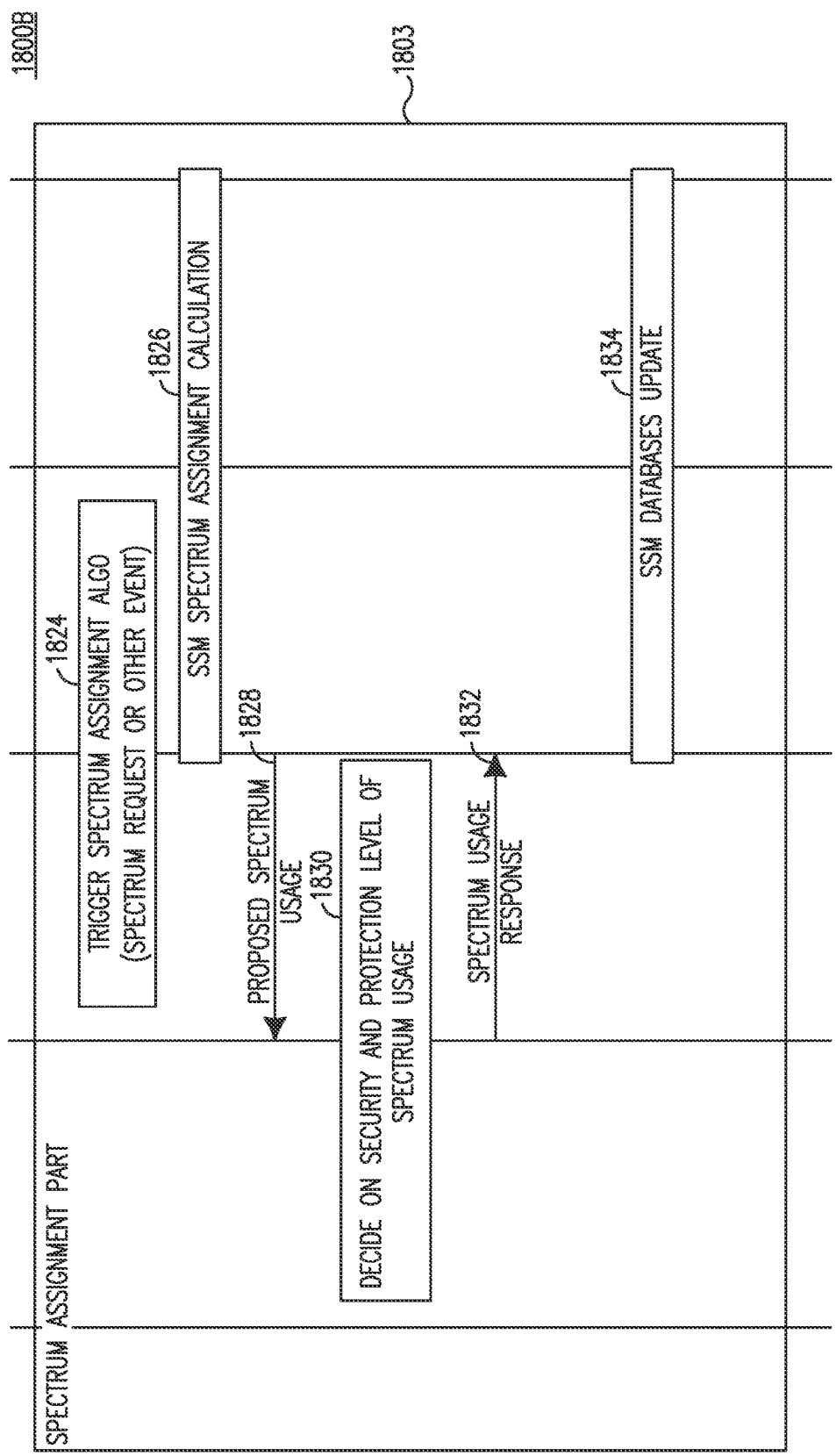

FIGS. 18A and 18b is a flow diagram 1800a/1800b of an example method of assigning classified spectrum. In the example illustrated in FIGS. 18A and 18B, the C-FSM 620 engages in a spectrum availability indication procedure to make spectrum available to the SSM 628 (1801). The SSM later engages in a spectrum assignment procedure to assign the spectrum (1803).

In the example spectrum availability indication procedure 1801 illustrated in FIGS. 18A and 18B, the C-FSM 620 determines the actual spectrum that is available for sharing (1806) and the information about that spectrum by accessing the classified system information database 622 (1808). The classified system information obtained from the classified system information database 622 (1810) may include, for example, knowledge of the nearby spectrum users or spectrum users in a given area, the actual bandwidth available in each area, and the sensitivity associated with each portion of information. For example, while the knowledge that one of the nearby spectrum users is a satellite system may not be sensitive (or necessary to keep classified), the knowledge that another nearby spectrum user is an important military navy training facility may need to be kept confidential. This information may be maintained in the classified system information database 622 and obtained by the C-FSM 620 through query.

Prior to sending an incentive query (1814) (as would be the case with a commercial Tier 1 spectrum user or the NC-FSM 612), the C-FSM 620 may first filter the information to perform a process of de-classification (1812). Such a process may render the information about the available spectrum and usage requirements for that spectrum such that it does not convey enough information to infer or discover any classified information. Following de-classification, the SSM 628 may calculate the incentive (1816) in response to the incentive query (1814) from the C-FSM 620. The C-FSM 620 may indicate its interest in making spectrum as per the procedure described above with respect to FIG. 10. For example, the SSM 628 may send an incentive response to the C-FSM 620 (1818), and the C-FSM 620 may send a spectrum release indication to the SSM 628 (1820). The SSM 628 may then update the spectrum usage and availability database 630 and the incentive and billing database 632 (1822).

The spectrum assignment algorithm that the SSM 628 normally runs may take place as usual (1824/1826); however, the SSM 628 may need to take special measures for spectrum that has been made available by the C-FSM 620. In order to do this, a flag in the spectrum usage and availability database 630 may be used to indicate that the spectrum marked as available is actually coming from the C-FSM 620. In this case, when the SSM 628 is ready to make a specific assignment of spectrum where this flag is present, it may first provide details about the proposed spectrum usage to the C-FSM 620, for example, through a proposed spectrum usage message 1828. The proposed spectrum usage message may include, among other information, the ID of the system or devices that will make use of the spectrum as a spectrum user, the planned duration, and the usage parameters or requirements to be adhered to when using the spectrum. For example, if the device or system to which the proposed assignment has been made by the SSM 628 consists of a system that may propose a security threat, the C-FSM 620 has the opportunity to reject the proposed assignment or modify it. The C-FSM 620 may decide on a security and protection level of spectrum usage (1830) and send a spectrum usage response to the SSM 628 (1832) confirming, rejecting or modifying the spectrum usage requested in the proposed spectrum usage message 1828. The SSM 628 may then update the spectrum usage and availability database 630 and the incentive and billing database 632 (1834).

Spectrum de-classification may take on multiple forms depending on the actual implementation and the primary spectrum user being considered. Some examples are given below for illustration and further indicate the implementation options for de-classification as well as for actual information exchange between the Tier 1 spectrum user (regardless of whether it is a commercial user or a C-FSM) and the SSM.

For one example, de-classification may be implemented by converting spectrum usage to spectrum availability. In this example, the interface to the SSM 628 from the Tier 1 spectrum user (or management entities responsible for the Tier 1 spectrum users) may be such that the information sent to the SSM 628 indicates the current usage of the primary spectrum users (e.g., location of primary user base stations, mobile devices, broadcast stations, transmission powers, allowable interference levels, etc). In this case, the SSM 628 may use this information to determine the actual amount of usable spectrum in a given area by applying certain calculations on the information provided about the primary spectrum user in question.

Figure 19:
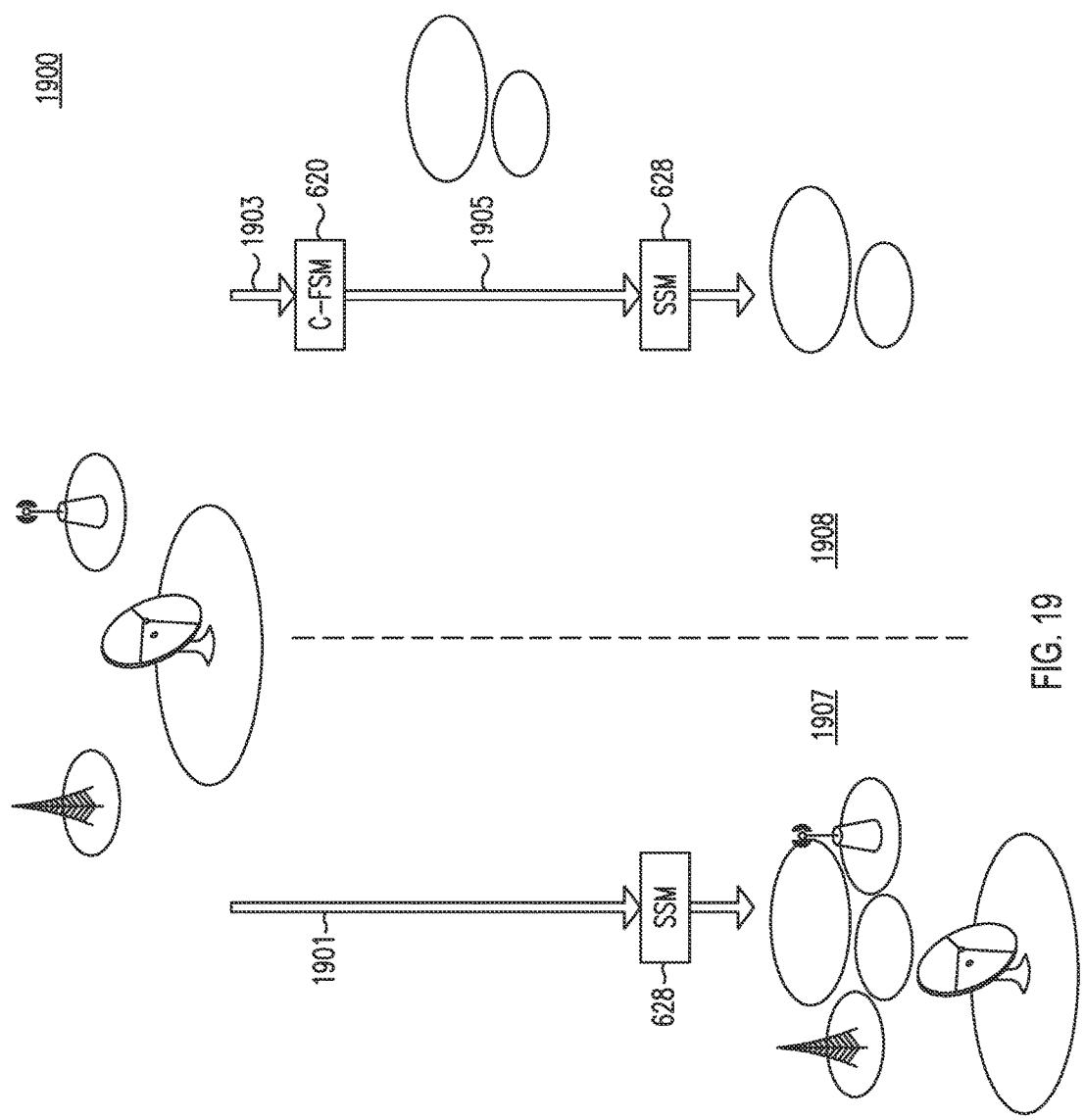
FIG. 19 is a diagram of an example method of de-classification by converting spectrum usage to availability.

FIG. 19 is a diagram 1900 illustrating an example method of de-classification by converting spectrum usage to availability. In the example illustrated in FIG. 19, for non-classified or commercial spectrum (1907), non-classified (and not filtered) information is sent directly to the SSM 628 (1901), which may make spectrum availability calculations and decisions as described above. However, for classified spectrum (1908), the non-classified and not filtered information may be sent to the C-FSM 620 (1903). In both cases, the non-classified and not filtered information may include, for example, used bandwidth and/or channels, geographical locations of towers, radar and/or antennas, interference limits, time usage of primary spectrum users, required range of signal and/or transmission power of transmitters. For classified spectrum (1908), the C-FSM 620 may perform de-classification by making the spectrum availability calculations and sending to the SSM 628 only the declassified information (1905) (e.g., available spectrum and the restrictions of use of the other systems, such as available bandwidth and/or channels, potential areas of spectrum usability, required maximum EIRP per location and/or required spectrum mask per location). In this way, a portion of the work normally performed by the SSM 628 may be performed by the C-FSM 620, and the C-FSM 620 may not need to send any information about the current systems. In dealing both with classified and non-classified spectrum, the SSM 628 may need to perform spectrum assignments using information from primary spectrum users, which may be de-classified (coming from the C-FSM 620) and non-classified and not filtered (coming from the NC-FSM 612 or commercial Tier 1 spectrum user 604a).

For another example, de-classification may be implemented by de-classifying information in time, frequency or geography. For example, if a classified spectrum user is using a specific geographical location, the C-FSM 620 may de-classify the availability information by indicating that other geographical areas are also unavailable (when in fact they are not), making it more difficult to determine the exact location of a specific system in geography. Alternatively, if the time availability of spectrum (e.g. spectrum is available for one hour every day at the same time) provides some sensitive information or some indication of the nature of the spectrum user which in itself constitutes sensitive information, the availability information may be reduced artificially (e.g., one hour every three days or on random days) so that the sensitivity of the information is removed.

De-classification may also be performed by combining multiple factors. For example, a radar signal that performs frequency hopping may be de-classified by not providing the exact hopping sequence in time (or not providing the available frequency slots at each time) but rather indicating that there is a larger number of occupied time-frequency slots than there is in actuality, thus making it more difficult to determine the exact frequency hopping sequence of the radar.

Figure 20:
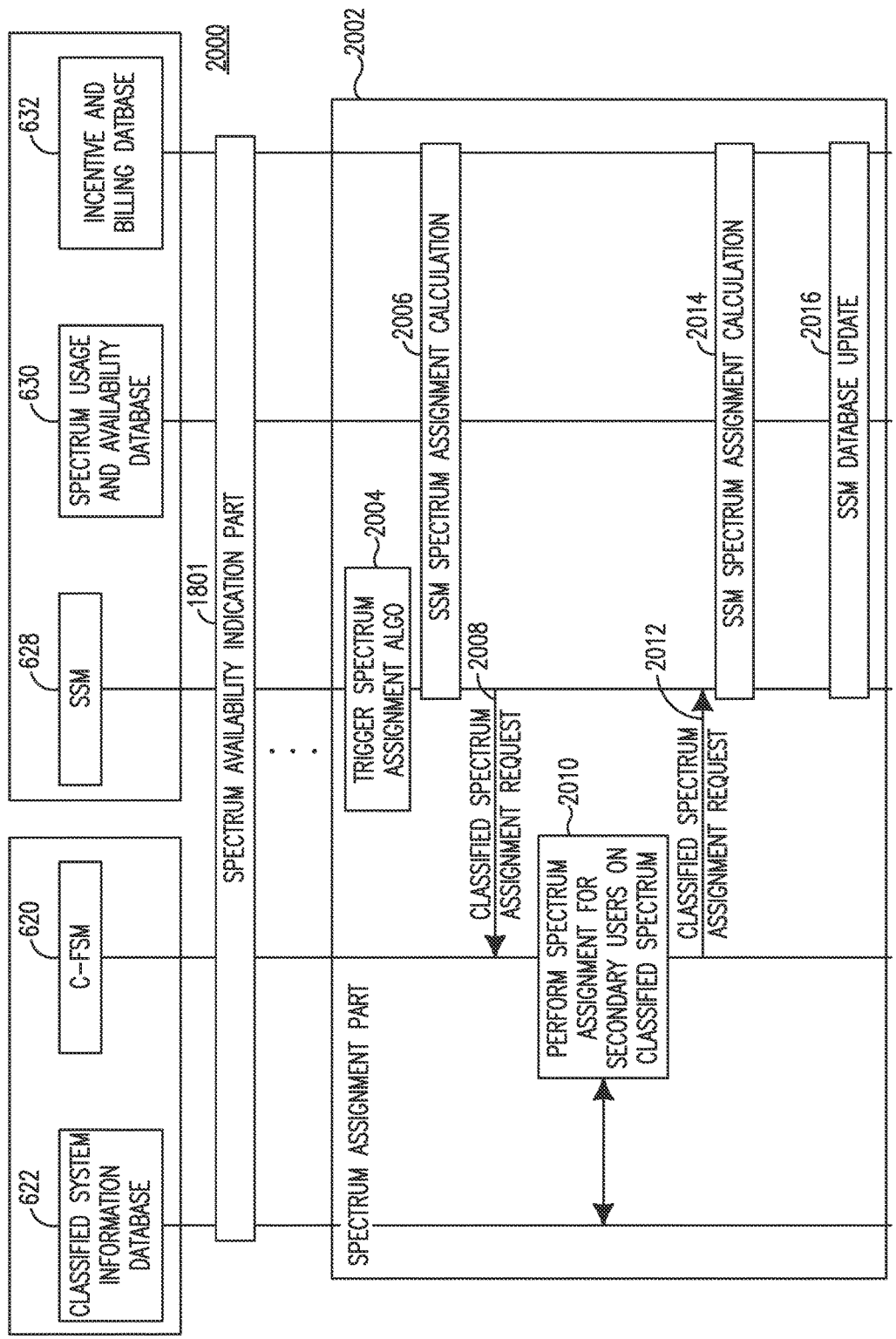
FIG. 20 is a diagram of another example method for allocating classified spectrum where the classified Federal spectrum manager (C-FSM) performs the spectrum assignment for the classified spectrum on behalf of the SSM.

FIG. 18 shows one alternative for spectrum assignment in the context of classified spectrum whereby the SSM 628 performs the actual spectrum assignment of available classified spectrum to satisfy the needs of Tier 2 and Tier 3 spectrum users. FIG. 20 is a diagram 2000 of another example method for allocating classified spectrum where the C-FSM 620 performs the spectrum assignment for the classified spectrum on behalf of the SSM 628. Such a technique may also be a mechanism for providing de-classification of spectrum since the information sent by the C-FSM 620 to the SSM 628 during the spectrum availability indication part may be further reduced.

For example, rather than having to send the SSM 628 information about the available spectrum to allow the SSM 628 to perform the spectrum allocation on such spectrum, the C-FSM 620 may only need to send the amount of available spectrum. The SSM 628 may evaluate the amount of available spectrum based on certain rules or guidance or using a technique similar to that described above where the pixels are assigned as usable and unusable and the amount of unusable spectrum is quantified in terms of number of pixels. Such a quantification may be sufficient for the SSM 628 to determine an approximate incentive and for the C-FSM 620 to decide on whether it is willing to share spectrum for this incentive. As a result, the spectrum availability indication part 1801 illustrated in FIG. 20 may have the same messaging as in the spectrum availability indication part 1801 in FIG. 18, except that the incentive query message 1814 may include less information about the bandwidth availability in the second alternative (only the amount available and general frequency range of the spectrum rather than the actual spectrum available and the required restrictions to use the spectrum).

When spectrum assignment takes place in the second alternative (2002), the SSM 628 may first determine that some spectrum to be assigned is classified spectrum (2006) in response to a spectrum assignment algorithm trigger (2004), such as a spectrum request or other event. When this is the case, the SSM 628 may send a classified spectrum assignment request to the C-FSM 620 (2008) to request the C-FSM 620 to make the allocation of its classified spectrum. The request may include information about the Tier 2/Tier 3 spectrum users that require the spectrum (e.g., their transmit power, spectrum masks, or required range) that would typically be found in the spectrum usage and availability database 630 or obtained from the Tier 2/3 spectrum users at the time of the spectrum request). The C-FSM 620 may perform the spectrum assignment for these spectrum users on behalf of the SSM 628 (2010) and send the result to the SSM 628 (2012). The SSM 628 may then continue the spectrum assignment algorithm on non-classified spectrum that remains to satisfy all spectrum needs (2014), update the spectrum usage and availability database 630 and the incentive and billing database 632 (2016), and eventually notify the Tier 2/3 spectrum users of their assigned spectrum (not shown).

Similar to the database mechanism used in TVWS, the SSM 628 may behave as a database to indicate to a Tier 2 or Tier 3 spectrum user whether it may transmit in a particular geographical location. In this situation, the SSM 628 may act (e.g., during the spectrum assignment/decision) as a type of spectrum availability database similar to that of the TVWS database.

Figure 21:
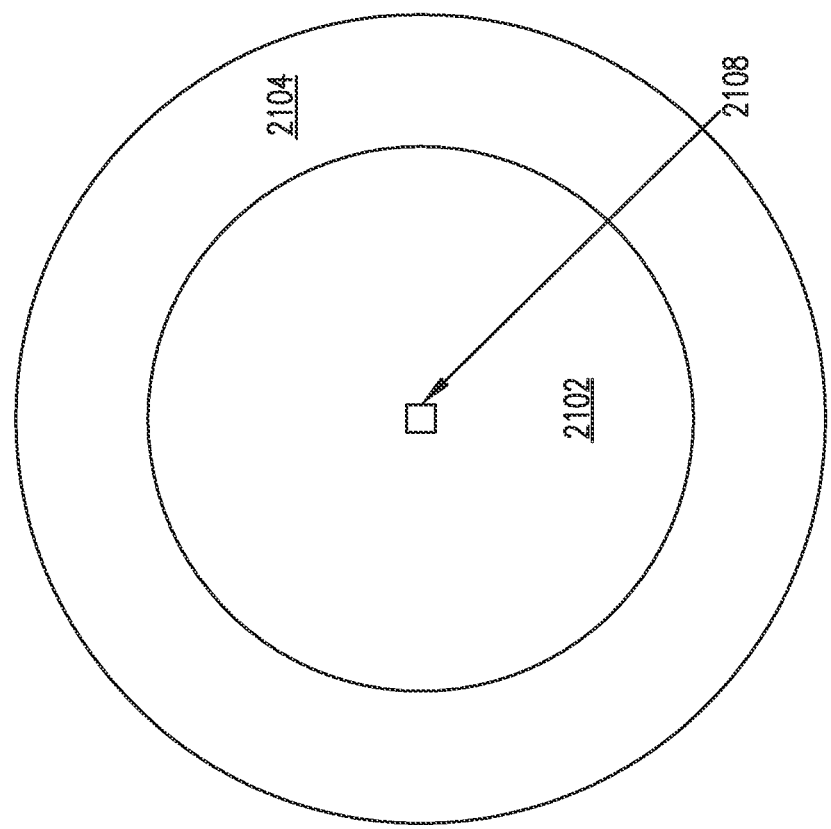
FIG. 21 is a diagram of an example illustration of device operation in the context of a database design with grey-zone.

FIG. 21 is a diagram 2100 of an example illustration of device operation in the context of a database design with grey-zone. The example illustrated in FIG. 21 is based on an exclusion zone 2102 (similar to the FCC contours in TVWS where a spectrum user may not transmit) but also on an additional grey-zone 2104 that may require the use of sensing to determine the availability of spectrum. In the example illustrated in FIG. 21, the exclusion zone 2102 and grey-zone 2104 are centered around a spectrum user 2108 that requires protection from interference. Such a spectrum user 2108 may be a primary spectrum user that owns the spectrum (e.g., a Tier 1 spectrum user) or a Tier 2 spectrum user that requires a guarantee (from the SSM 628 or the database) of protection from interference. The contour may be defined by the spectrum user that is to be protected (e.g., Tier 1 or Tier 2 spectrum user) itself or by the SSM 628 through calculations made based on information provided by the Tier 1 or Tier 2 spectrum user. The exclusion zone 2102 may indicate the geographical area where other spectrum users cannot transmit in order to protect the protected spectrum user (e.g., Tier 1 or Tier 2 spectrum user). The grey-zone 2104, on the other hand, may indicate the area where sensing may be required to determine whether other spectrum users may transmit and may provide database information on its own if not sufficient. For example, in the grey-zone 2104, transmissions by other spectrum users may or may not be possible depending on factors such as the terrain, weather, or whether the spectrum users are indoor-outdoor, which the database may not have access to. In this case, the transmitting spectrum user (e.g., the spectrum user that is allowed to transmit on the same frequency as the protected spectrum user but by ensuring that it does not cause harmful interference), may be asked to perform sensing prior to determination of whether it can transmit. The grey zone may also represent the area in which the transmitting spectrum user may be asked to use some restrictions in order to protect the protected spectrum user, such as the use of lower transmit power, transmission over a restricted period of time, or other operational restrictions that would not be imposed in the safe zone. Finally, a safe zone 2106 may represent an area where the transmitting spectrum user may be allowed to transmit without the need for sensing. While this technique may be applied in the context of an SSM 628 that mainly manages many bands of spectrum for different types of spectrum users, it may also be applied to the design of a simple database that manages a specific band, such as the TVWS database or the LSA repository for LSA.

The exclusion zone 2102 and grey-zone 2104 may be geographical circles as shown in FIG. 21 but may also be structured otherwise (e.g., grid-like areas or non-circular areas defined by terrain, extremities of a city or country, etc.). The zones may be centered around the location of the protected spectrum user 2108, which may be either a transmitter of the protected spectrum user, such as a TV broadcast tower, the receiver of a protected spectrum user, such as an FSS Earth Station, or around the spectrum user itself (such as a cluster of LTE small cells that have protection as a Tier 2 spectrum user). The exclusion zone 2102, therefore, may represent the area over which transmission on the same channel by another spectrum user would cause interference to the protected spectrum user.

In the grey-zone 2104, a potential transmitting spectrum user may first determine, through sensing, the availability of that spectrum and the ability to transmit without causing interference to the protected spectrum user. In this scenario, the SSM 628 may provide information about the protected spectrum user 2108 to guide the sensing. For example, the protected spectrum user 2108 may transmit a specific pilot or synchronization sequence, which may be provided by the database/SSM to the transmitting spectrum user to configure the sensing.

Figure 22:
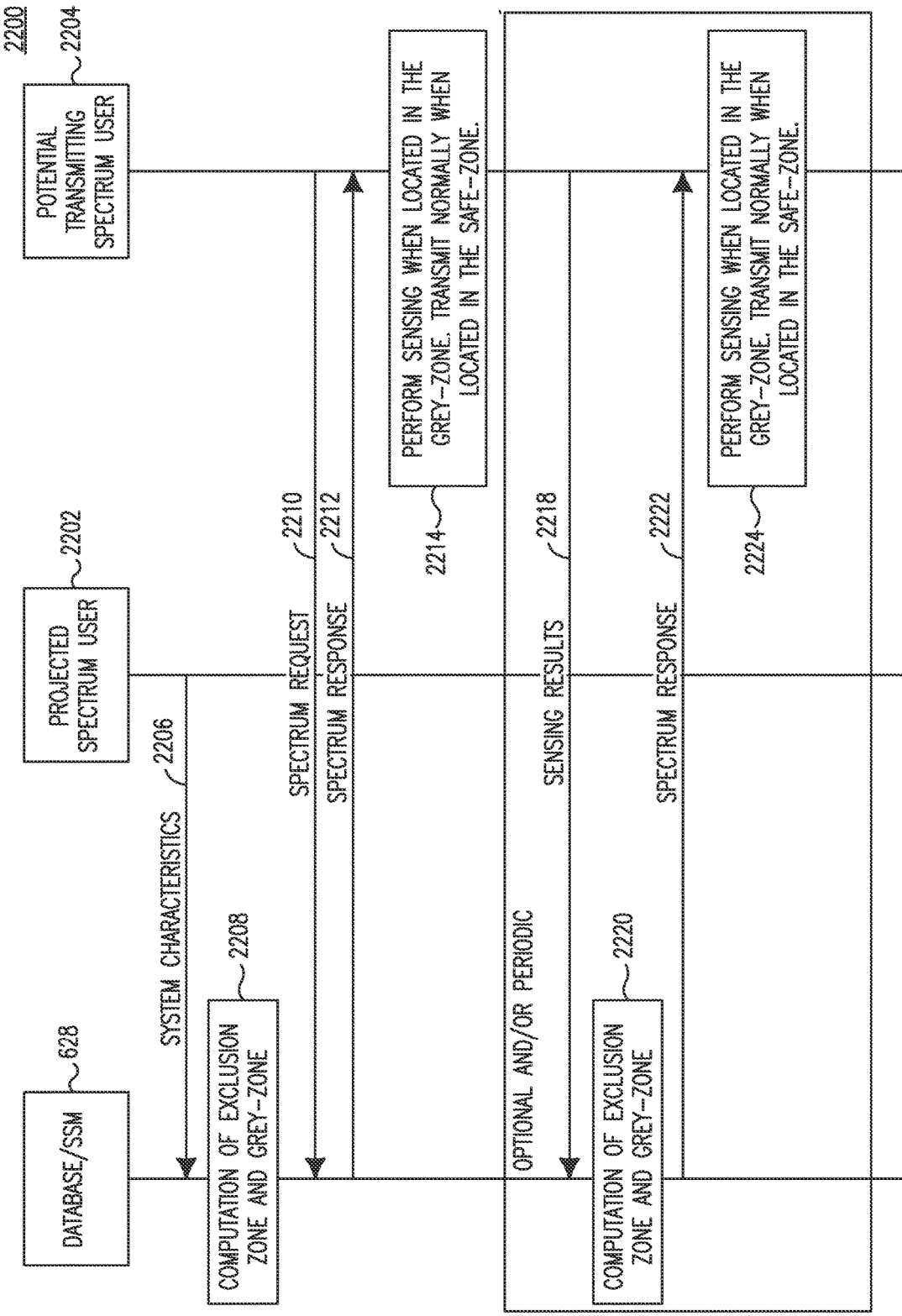
FIG. 22 is a flow diagram for use of the grey zone concept of FIG. 21.

FIG. 22 is a flow diagram 2200 for use of the grey zone concept illustrated in FIG. 21, which provides an information flow that may be involved in interfacing with the database in the case of the grey-zone concept.

In the example illustrated in FIG. 22, the protected spectrum user 2202 may provide information to the database or SSM 628 about its usage of spectrum (2206). This information may include, for example, geo-location information of transmitters and/or receivers of the protected spectrum user 2202, protection criteria, such as the maximum level of interference that transmitters/receivers may allow for proper operation, adjacent channel rejection of the protected spectrum user's receivers, etc. The SSM 628 may then compute the exclusions and grey-zones based on this information (2208). Alternatively, the exclusions and grey-zones may be calculated by the protected spectrum user itself, and this information may be sent to the SSM 628 or database (not shown). At some point in time, a potential transmitting spectrum user 2204 may request to use spectrum from the SSM or database 628 through a spectrum request message (2210). The spectrum request message may include, for example, the geo-location information for the potential transmitting spectrum user 2204 (or components of that system, such as a base station and/or mobile stations) as well as characteristics of the spectrum user, such as ACS, ACLR, transmit power, or expected range. The database/SSM 628 may provide a spectrum response (2212) indicating whether and where transmission by the potential transmitting spectrum user may be allowed. This determination may be made based on the location of the potential transmitting spectrum user relative to the exclusion zone, grey-zone, and safe-zone. For example, the database 628 may indicate that all mobile stations or base stations located in the safe-zone are allowed to transmit.

For devices in the potential transmitting spectrum user that are located in the grey-zone, the SSM/database 628 may indicate that transmission is subject to performance of sensing (2214). In this case, the spectrum response may also include the targeted information for performance of sensing, such as the RAT and characteristics of the protected spectrum user in order to drive the sensing at the sensing devices in the potential transmitting spectrum user (e.g., pilot sequence, synchronization sequence, hopping sequence, or timing of when to perform sensing). The potential transmitting spectrum user may ensure that the usage of spectrum follows the rules described above, namely that transmission in the grey-zone occurs only after sensing is performed in the grey-zone and it is determined that the protected system signal at that location is weak enough to allow use of the spectrum at that location. In addition, the sensing results may also be sent back to the SSM/database 628 (2218). This information may be used by the SSM/database 628 to dynamically modify the grey-zone area and location based on the sensing results. Such an optional update phase of the grey-zones may be performed by periodically sending the sensed information (2218) and recalculating the grey-zone (2220) at the SSM/database 628. In this example, the database/SSM 628 may also periodically send a spectrum response (2222), and the potential transmitting spectrum user 2204 may perform sensing when located in the grey-zone and transmit normally when located in the safe-zone (2224)

Alternatively, the grey zone may also be an area whereby the devices that are located in the grey zone must transmit with some modified transmission characteristics. In particular, the grey zone may require some modified or reduced transmit power from the device or may require use of some coexistence scheme (that may be dictated by the database). In this case, FIG. 21 may easily be adapted so that there are multiple levels of grey zones, each with varying characteristics of the transmitters. Approaching the safe zone, the transmission characteristics in the corresponding grey-zone may become less and less restrictive.

The SSM 628 described in the embodiments above may make use of spectrum from any band, where the spectrum is licensed to a certain licensee using one or more procedures described above. In addition, the SSM 628 may make use of unlicensed spectrum such as the TVWS. In certain instances of unlicensed spectrum, a database may already exist or will be deployed to manage spectrum access by devices (e.g. white space devices (WSDs) in such a way as to protect certain priority spectrum users (also referred to as incumbents). In TVWS, the incumbents may include, for example, digital TV (DTV) and/or wireless microphones. The existing database may already allow spectrum users to access the TVWS spectrum by direct communication with the database. In addition, since the spectrum is assumed to be unlicensed, use of spectrum may be on a non-interfering, non-protection basis, as defined by CEPT. In other words, the WSDs accessing the TVWS database may not get any protection when they use channels in the TVWS.

It may be desirable to grant the SSM 628 access to TVWS spectrum for allocations to spectrum users. However, some changes may need to be made to enable the SSM 628 to communicate with the TVWS database. Further, changes may need to be made to enable the SSM 628 to assign channels from unlicensed spectrum to Tier 2 and Tier 3 spectrum users in a manner that prevents Tier 2 spectrum users from causing harmful interference to the incumbents and that prevents uncoordinated users (e.g., WSDs that may access the TVWS database directly) from interfering with other Tier 2 spectrum users and/or Tier 1 spectrum users or incumbents. In embodiments described below, the term uncoordinated users may refer to WSDs that are assumed to contact the geo-location database without any services provided by the SSM.

Embodiments are described below that enable the SSM 628 to be used in conjunction with existing unlicensed spectrum (such as TVWS) whereby access to the spectrum by spectrum users may be controlled by a geo-location database that is meant to protect the incumbent only (e.g., DTV in the case of TVWS). In particular, two architectures are described, respectively, in which the SSM 628 is a special user of the TVWS and in which the SSM receives all TVWS spectrum requests.

In an architecture where the SSM 628 is a special user of the TVWS, WSDs may make TVWS requests directly to the TVWS database while other spectrum users (e.g., Tier 2 and Tier 3 spectrum users) may make their spectrum requests directly to the SSM. Here, the SSM may be assumed to be a special user of the TVWS database. An interface between the SSM and the TVWS database is described herein to allow the SSM to have more information (e.g., required to serve a larger area and potentially many users) as well as to ensure QoS of Tier 2 spectrum users of the SSM despite the presence of other WSDs that may access the TVWS database directly. Two options are described with respect to this architecture, which may depend on whether the SSM has pre-reserved specific channels by the TVWS database. A third option is also described whereby the SSM may protect Tier 2 spectrum users (e.g., from devices directly accessing the geo-location database) by performing sensing to discover the presence of spectrum users that may communicate directly with the geo-location database.

In an architecture where the SSM 628 receives all TVWS spectrum requests, the SSM may receive all requests for spectrum, both from spectrum users that are using the services of the SSM and WSDs that wish to only access the traditional (or legacy) TVWS database. In this case, three types of access to the SSM are described herein (e.g., Type 1, Type 2, and Type 3), and the SSM may handle requests for each type of access differently. WSDs may request access to the TVWS database (e.g., Type 1) indirectly through the SSM without the WSDs being aware of the presence of the SSM.

In both architectures (i.e. where the SSM is a either special user of the TVWS database or where the SSM receives all TVWS spectrum requests), the SSM may use unlicensed spectrum and potentially derive value from it (e.g., in the form of potential payment from Tier 2 spectrum users that are being given potentially exclusive use of TVWS channels with a controlled interference environment). While the use of economic incentives for incumbents in TVWS (as described above) is not forseen, the value or payments obtained by the SSM may serve other purposes. For example, an SSM that uses TVWS for providing Tier 2 spectrum may be required to pay a fee to the regulator, in which case the costs for accessing Tier 2 spectrum may offset this fee. In addition, if the SSM provider and the TVWS database provider are different entities, the TVWS database provider may require a fee for providing a special service for the SSM beyond the direct access currently provided to white space devices. Again, this fee may be offset through payments collected by Tier 2 spectrum users using TVWS spectrum through the SSM. While embodiments described herein may be described with respect to TVWS specifically, an actual implementation of an SSM may deal with other sources of spectrum in addition to TVWS, including spectrum whereby incentives need to be paid to Tier 1 spectrum users to give up access to their spectrum for periods where that spectrum may not be used. From that point of view, the SSM may need to pool payments from different spectrum sources (including TVWS spectrum) in order to derive the incentives needed for the spectrum sources where Tier 1 spectrum users are present.

Figure 23:
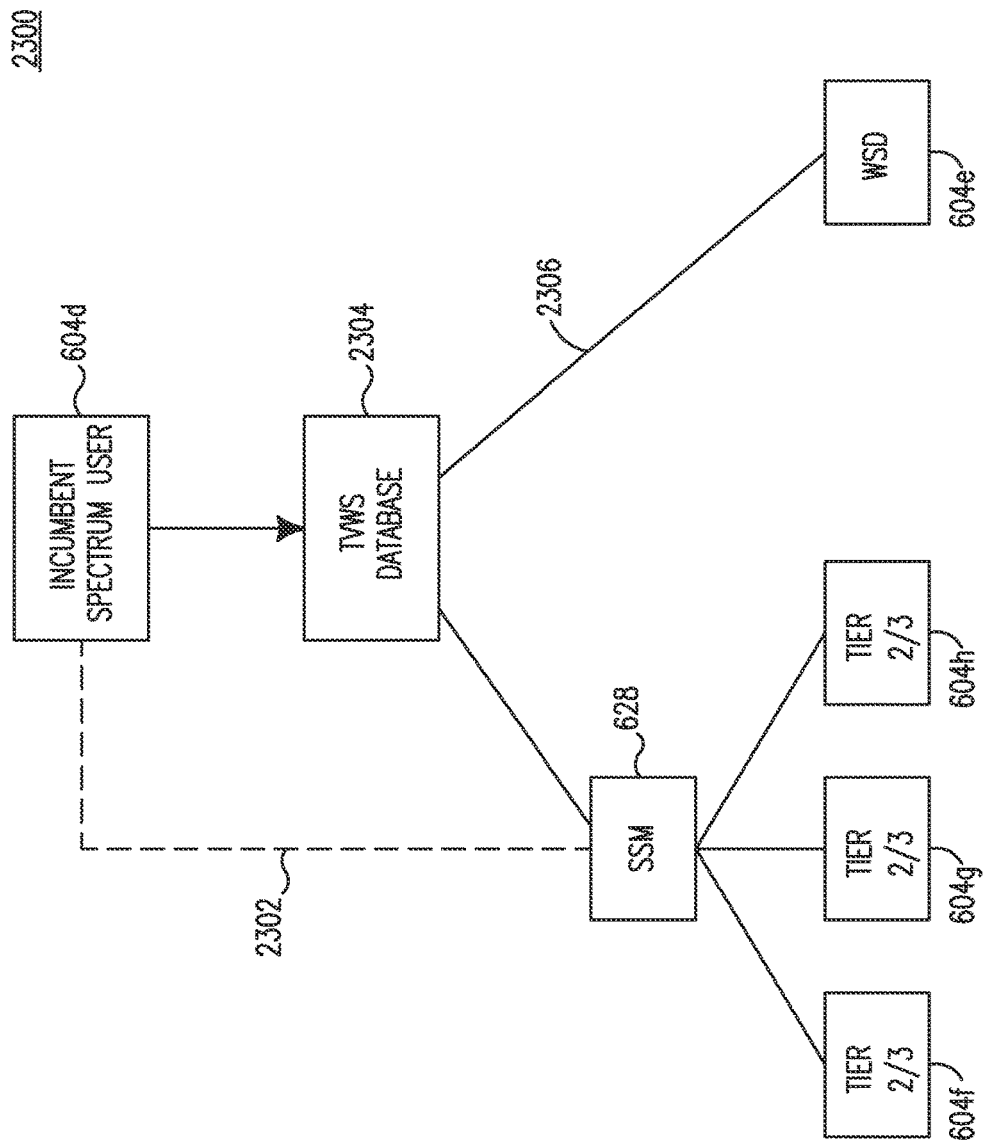
FIG. 23 is a block diagram of an example architecture where the SSM is a special user of a television white space (TVWS) database.

FIG. 23 is a block diagram of an example architecture 2300 where the SSM 628 is a special user of a TVWS database 2304. The example architecture 2300 includes a TVWS database 2304 that is in direct communication with the SSM 628, an incumbent spectrum user 604*d* of unlicensed spectrum and at least one WSD 604*e*. The WSD 604*e* may communicate with the TVWS database 2304 via a classical TVWS link (e.g., using the regulation defined by FCC or OFCOM, or the protocol defined by PAWS). The incumbent spectrum user 604*d* may also be in communication with the SSM 628 via a managerial or special TVWS link 2302. Tier 2 and/or Tier 3 spectrum users 604*f*, 604*g* and 604*h* may access unlicensed spectrum via communication with the SSM 628.

The example architecture 2300 illustrated in FIG. 23 is one possible architecture where the SSM 628 may make use of spectrum from an unlicensed band (e.g., TVWS) that already has a database (e.g., TVWS database 2304) that makes spectrum available for WSDs and ensures protection of the incumbent spectrum users 604*d*. The example architecture 2300 assumes that the unlicensed band is already managed by a geo-location database. In the example architecture 2300, the SSM 628 may be treated as a special user from the point of view of the geo-location database. In this embodiment and embodiments described below, the unlicensed spectrum is described as the TVWS and the geo-location database (GLDB) is a database used to protect the incumbents from TVWS use. However, such embodiments may apply to any shared spectrum band, the access to which may managed by a database.

In the example architecture 2300 illustrated in FIG. 23, one or more WSDs 604*e* may communicate directly with the TVWS databse 2304 to obtain white space resources (e.g., TVWS channels) that are provided by the TLDB using, for example, existing mechanisms described by FCC or OFCOM and using a protocol such as PAWS. In addition, the SSM 628 may use the services of the TVWS database 2304 to obtain spectrum in the unlicensed band, which it may use to satisfy the requests of Tier 2 or Tier 3 spectrum. In this example, a Tier 2 or Tier 3 spectrum user (or WSD) may communicate with the SSM 628 to obtain white space resources from the SSM 628 that are provided by the GLDB.

In an embodiment, Tier 2 and Tier 3 spectrum users and WSDs may communicate with the SSM to obtain white space resources from the SSM that are provided by a GLDB in a first mode (e.g., a coordinated mode) and may communicate directly with the GLDB to obtain the white space resources that are provided by the GLDB in a second mode (e.g., an uncoordinated mode). This is also described in more detail below with respect to FIG. 35.

The Tier 2 or Tier 3 spectrum users 604*f*, 604*g* and 604*h* illustrated in FIG. 23 may be WTRUs, systems or base stations, such as network operators (OA&M), actual APs or base stations managed by an operator. They may also be unmanaged WSDs, such as an AP installed in a home or office. In addition, the Tier 2 or Tier 3 spectrum users may themselves be WSDs, which may like to make use of some services of the SSM 628 that are not available from straightforward access through the classical TVWS link 2306. Such services may include, for example, assignment of channels with some level of protection attached to them or some coexistence service to manage multiple devices operating using different RATs to avoid harmful interference while the systems operate on the same channel. For example, a Tier 2 spectrum user or WSD may communicate with the SSM 628 to receive a guarantee of protection from an agreed upon level of interference from other WTRUs that obtain white resources from the SSM, other WTRUs that obtain white space resources directly from the GLDB and other WTRUs that obtain white space resources from a neighbour SSM. For another example, a Tier 3 spectrum user (e.g., spectrum user 604*h*) may obtain unlicensed spectrum without protection through the SSM 628 (e.g., by registering to the SSM 628 as a Tier 3 spectrum user) or directly to the TVWS database 2304.

An advantage of using the SSM 628 may be that it may obtain some coexistence service from the SSM 628 that it may not obtain from the TVWS database 2304. For example, the TVWS database 2304 may simply indicate the channels that are available for secondary use and from the point of view of protection of the incumbent user 604*d*. The SSM 628 may provide this information as well as some indication of the quality of the available channels, which may allow a Tier 3 spectrum user (e.g., 604*h*) registering to the SSM 628 to pick a better channel for operation. The SSM 628 may also further restrict the Tier 3 spectrum user to operate on a channel or set of channels where other secondary users are operating using a similar RAT or technology that may ensure better coexistence between the different spectrum users. For example, the SSM 628 may ensure that WiFi systems that are close enough to hear each other and back off to each other's transmission operate on the same channel, as this may ensure better coexistence. In this way, a Tier 3 spectrum user may benefit from obtaining spectrum from the SSM 628 that obtains the available channels from the TVWS database 2304.

Alternatively, the SSM 628 may have a direct link 2302 to incumbent spectrum users (e.g., incumbent spectrum user 604*d*) that may use spectrum in TVWS as a Tier 1 spectrum user so that monetary compensation and negotiation procedures to that effect may be realized as part of the Tier 2 reservation and usage (e.g., as described above). Realization of this option may depend on the presence of policy from the regulator that may allow it. In other words, the regulator may allow TV broadcasters to provide protection information directly to the SSM 628. Incumbents may also interface with the TVWS database 2304 to inform it that some spectrum may have been reserved for Tier 2 spectrum users through the direct link with the SSM 628. This alternative direct link is illustrated in the example architecture 2300 of FIG. 23 as the managerial or special TVWS link 2302.

There are two options for the spectrum provided by the SSM 628 acting as a special user of the TVWS database 2304. The SSM 628 may act as a special user with non-pre-reserved spectrum, or the SSM 628 may act as a special user with pre-reserved spectrum.

Where the SSM 628 acts as a special user with non-pre-reserved spectrum, the SSM 628 may make use of the TVWS by registering itself as a special user of the TVWS. In this case, the TVWS database 2304 may give certain controlling power to the SSM 628 and provide an enhanced interface in order for it to assign spectrum to Tier 2 and Tier 3 spectrum users (e.g., the ability to reserve a channel for exclusive use). Once the SSM 628 has registered itself as a special user, it may reserve certain channels for the users it is managing (e.g., Tier 2 users), and the geo-location database may, in turn, ensure that these channels are not shown as available to unlicensed users that are using the TVWS using only access to the geo-location database.

In order to do so, the SSM 628 may register as a special user of the TVWS. When the SSM requires TVWS spectrum, it may send a request to the TVWS database 2304 for the available spectrum, along with the transmission characteristics of the devices that may use the spectrum. The TVWS database 2304 may indicate the list of all the available channels (in addition to the maximum transmit power that may be used on each of these channels).

In an embodiment, the TVWS database 2304 may decide to allow the SSM 628 to access to only a subset of the available channels to ensure that some channels are still available for access by other unlicensed users that are not serviced by the SSM 628. For example, the TVWS database 2304 may reserve a portion of the available spectrum that could be used for Tier 2 or Tier 3 spectrum users. Here, the TVWS database 2304 may broadcast or provide the SSM 628 with two lists of channels, one list that indicates the channels that may be used by Tier 2 and/or Tier 3 users and another list that may only be used for legacy WSD operation. The SSM 628, on behalf of its Tier 2 spectrum users, may only be able to reserve channels or spectrum from the first list. Alternatively, the TVWS database 628 may provide only the first list to the SSM 628 (i.e., the list of channels that are usable by the SSM 628) and maintain the second list (i.e., the list of channels reserved for unlicensed systems that directly access the TVWS database 2304) locally for its own use.

Once a channel or spectrum has been reserved by an SSM 628, the TVWS database 2304 may exclude the channel from the list of available channels for legacy WSD operation for a given time. The amount of time may be decided by policy and/or defined by the incumbent spectrum user that is using the specific channel or channels being assigned. Alternatively, the TVWS database 2304 may continue to assign spectrum from the channels set aside for the SSM 628 as long as the channels are not reserved for any Tier 2 spectrum users.

Based on the available channel list and the SSM's current needs for spectrum, the SSM 628 may decide to assign some of the channels available to its Tier 2 and/or Tier 3 spectrum users. The SSM 628 may make this assignment using knowledge of the TV broadcast incumbent protection criteria that may be provided with the available channel list, for example. Once this assignment is made, the SSM 628 may respond to the TVWS database 2304 with the selected channels that it has decided to assign to spectrum users. Alternatively, the TVWS database 2304 may make the assignment itself based on the needs of the SSM's users that may have been previously provided.

Where some TVWS channels are used by the SSM 628 for Tier 2 spectrum users (with some QoS facilitation), the SSM 628 may indicate to the TVWS database 2304 that such channels may not be used by other WSDs that may access the TVWS database 2304 directly. As a result, the TVWS database 2304 may consider these channels as being occupied and not include them in future responses made to a WSD that directly requests spectrum from the TVWS database 2304. In addition, the TVWS database 2304 may obtain the protection criteria for the Tier 2 spectrum users from the SSM 628.

Based on the protection criteria and the spectrum use information obtained from the SSM 628 about the Tier 2 spectrum users, the TVWS database 2304 may use this information to re-compute the new maximum transmit power allowable on each of the TVWS channels (either neighboring locations to the Tier 2 spectrum user or in adjacent channels) or the available channels list in order to protect the Tier 2 spectrum user 604f that was given access to spectrum by the SSM 628. When future requests from WSDs are made directly to the TVWS database 2304, the TVWS database 2304 may respond with the channel availability and/or potentially maximum transmit power that reflects the newly computed allowable transmit powers which take into account Tier 2 protection criteria.

Alternatively, an incumbent spectrum user may inform the TVWS database 2304 that some spectrum may be available but only for Tier 2 or Tier 3 spectrum user operation, for example, with specific time to live (TTL), in the case where the TTL functionality may not be supported with legacy WSD devices. The incumbent spectrum user may also require that some of its channels be used by the SSM 628 in order for the incumbent to receive some economic incentive or payment for making its channel usage available for secondary usage. In this scenario, the incumbent may indicate to the TVWS database 2304 that its channels were occupied as though it were utilizing the spectrum. In the meantime, the incumbent spectrum user may communicate directly with the SSM 628 to make the channels available to the SSM 628. The incumbent may provide the SSM 628 with the protection criteria of the incumbent spectrum user, and the SSM 628 may then use these channels for Tier 2 and Tier 3 spectrum users using this same protection criteria. In other words, if the SSM 628 assigns channels to Tier 2 spectrum users within the protection criteria and limitations of the actual incumbent spectrum usage, the Tier 2 spectrum user may be provided protection from WSDs that use the TVWS through access directly with the TVWS database 2304 inherently, without the SSM 628 needing to communicate with the TVWS database 2304. In this case, the SSM 628 may achieve protection for its Tier 2 spectrum users by direct communication with the incumbent spectrum user (e.g., DTV station) and may not need communication with the TVWS database 2304 for the specific channels occupied by the incumbent spectrum user. The SSM 628 may, at the same time, obtain channels from the TVWS database 2304 to use from those incumbents that have not communicated directly with the SSM 628. As a result, the direct link between the SSM 628 and the incumbent spectrum user may be assumed with only a subset of incumbents and may not need to be relied on exclusively by the SSM 628.

The procedures described above provide a high level description of the potential interaction between a TVWS database and an SSM. A more detailed description of the information exchange may depend on how the responsibilities for protection of the incumbent and protection of the Tier 2 spectrum users are split between the two entities. Numerous possible splits for these responsibilities are described below and may describe how the information is exchanged in each case.

In one example split, an SSM 628 may behave as an enhanced WSD with protection rights or a primary spectrum user, and the TVWS database 2304 may provide channels to the SSM 628. In other words, the SSM 628 may protect the Tier 2 spectrum user by ensuring that other users of the SSM 628 may not be assigned channels that may interfere with Tier 2 spectrum users that are already in use. In addition, the TVWS database 2304 may also provide protection to the Tier 2 spectrum users from the point of view of WSDs that may access the TVWS database 2304 directly. The TVWS database 2304 may obtain the protection criteria for the Tier 2 spectrum users from the SSM 628, and the TVWS database 2304 may then ensure that additional channel assignments may not cause interference to the Tier 2 spectrum users.

Figure 24:
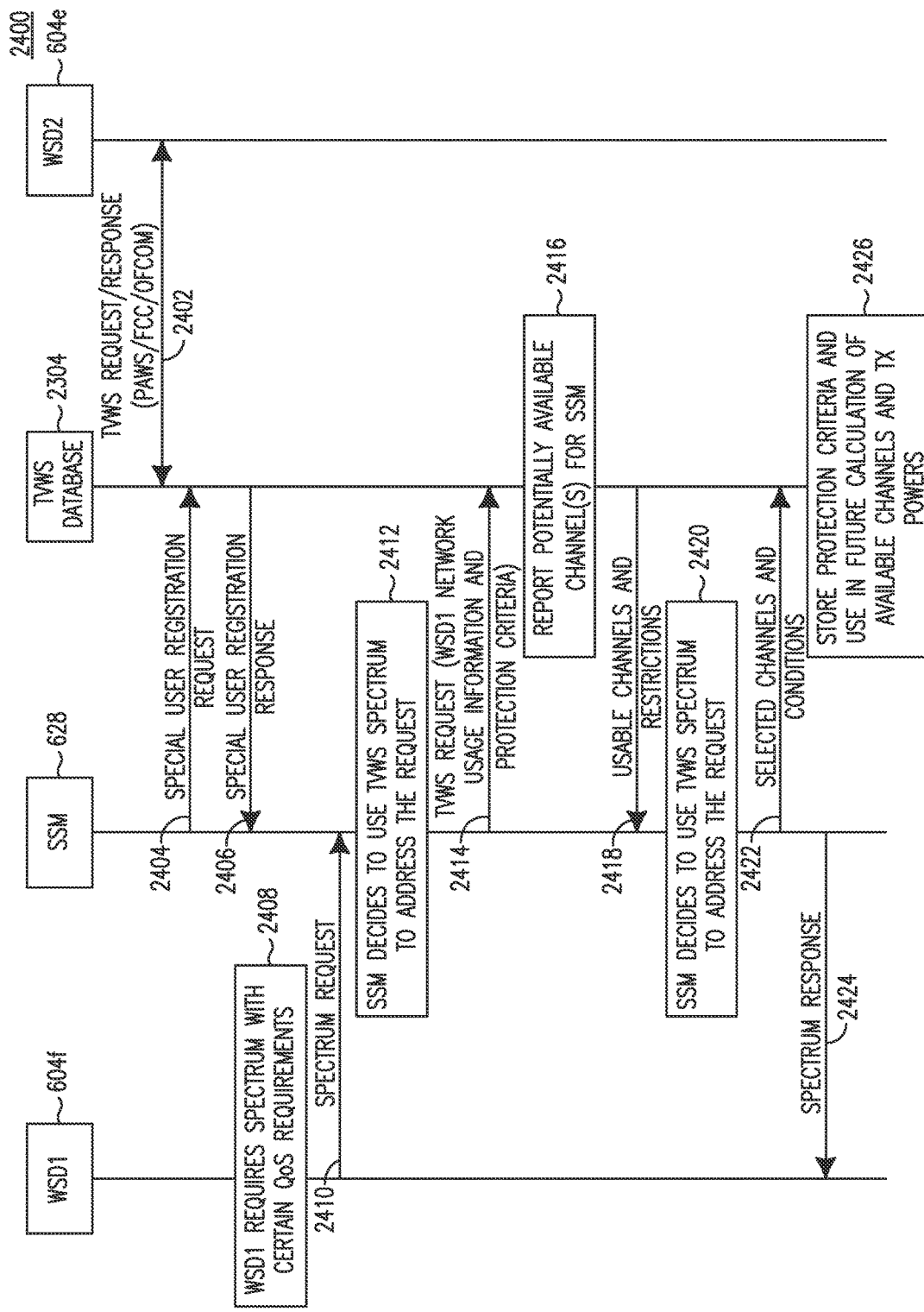
FIG. 24 is a flow diagram of an example message exchange for an SSM acting a special user of the TVWS with non-pre-reserved spectrum where the SSM behaves as an enhanced white space device (WSD) with protection rights of a primary spectrum user.

FIG. 24 is a flow diagram 2400 of an example message exchange for an SSM 628 acting as a special user of the TVWS with non-pre-reserved spectrum where the SSM behaves as an enhanced WSD with protection rights of a primary system. In the example illustrated in FIG. 24, WSD2 604e requests TVWS channels from the TVWS database using one of the existing methods specified either by the FCC, PAWS and/or OFCOM (2402). In addition, an SSM 628 may register to the TVWS database 2304 as a special user of the TVWS database 2304. This may allow the SSM 628 to have more controlled access to the TVWS channels and to support use of channels with additional protection that may simplify assuring some level of QoS.

When registering with the TVWS database 2304, the SSM 628 may first provide some basic information about the location and technology of the users that it supports via a special user registration request (2404). The TVWS database 2304 may use such information to supply channels in response to SSM requests that may be more appropriate to the SSM 628 from a TV broadcast protection point of view. For example, the TVWS database 2304 may later reserve or issue channels to the SSM 628 that are less likely to be in areas where there are frequent uses by TV broadcast systems. For example, the SSM 628 may be serving an area that is a subset of the area served by the TVWS database 2304, and in the SSM service area, channels 1, 2 and 10 may always be available due to the lack of any broadcast stations in that area. In this case, channels 1, 2, and 10 may be ideal candidates for the TVWS database 2304 to reserve for the SSM 628. In addition, the TVWS database algorithm may decide to reserve spectrum for the SSM 628 internally to satisfy potential requests made eventually by the SSM 628. Such reserved channels may not be made available to the WSDs that communicate directly with the TVWS database 2304. In this case, the rough information about the location of users supported by the SSM 628 may be useful for the TVWS database 2304.

In response to the registration request, the TVWS database 2304 may provide to the SSM 628 some rough availability information in the area being operated by the SSM 628 via a special user registration response (2406). This information may be used in the SSM's decision process when deciding to use TVWS (or to use other bands instead) to satisfy the requests from Tier 2 or Tier 3 spectrum users using the services of the SSM 628.

WSD1 604f may be, for example, a Tier 2 spectrum user. At some point, WSD1 604f may decide that its needs more spectrum with certain QoS requirements (2408). Accordingly, it may make a request to the SSM 628 for spectrum with certain protection requirements (2410). For example, WSD1 604f may indicate minimum bandwidth requirements, signal-to-noise ratio (SINR) requirements, availability time requirements, or maximum allowable interference level. WSD1 604f may also provide network usage information, which may include, for example, the RAT, spectral masks and desired transmit powers, location of base station(s) and desired range, or receiver sensitivity characteristics.

The SSM 628 may decide to satisfy this request using TVWS spectrum (2412) and, accordingly, may make a special TVWS request to the TVWS database (2414). The special TVWS request may be enhanced compared to the requests made by WSD2. For example, the request may include the network usage information of WSD1 604f, which may include, for example, the technology characteristics of the devices (e.g., masks, locations, RAT, or maximum transmit power). The request may also include the protection criteria for WSD1 604f. The request may also have some timing-related requirements (e.g., a minimum amount of time for which the channel should be available) as part of the protection criteria. The protection criteria for WSD1 604f may be represented in the form of the location of transmitters and/or receivers of the Tier 2 spectrum user and the required maximum EIRP of the interference that each of these transmitters/receivers may accept. Alternatively, the SSM 628 may provide a spectrum map of the geographical usage of the Tier 2 spectrum users. This may include the expected power transmitted by each of the Tier 2 spectrum user transmitters at a given geographical location. Alternatively, the SSM 628 may provide a map of required SINR level for a given set of locations, which the TVWS database 2304 may then need to respect for other WSDs that may be allowed to use the same channel (but in a neighboring location) or be allowed to use an adjacent channel in such a way that the interference protects the Tier 2 spectrum user. In this alternative, the TVWS database 2304 may not need to perform complex calculations to protect the Tier 2 spectrum users but simply ensure some maximum interference from other WSDs that the SSM 628 may not be aware of at the locations specified by the SSM 628. The maximum interference or SINR may be calculated by the SSM 628 from the QoS requirements of the Tier 2 spectrum user that is received by the SSM 628. In other words, the required SINR at each geographical location may first be computed by the SSM 628 based on the QoS requirements from the Tier 2 spectrum user that is made during the initial spectrum request by the Tier 2 spectrum user.

The algorithm performed by the TVWS database 2304 may be enhanced to ensure that the assignment takes into account the protection criteria of the Tier 2 spectrum user that was provided. In the example where the protection criteria is in the form of some maximum interference guarantee, the TVWS database 2304 may first compute the expected maximum interference on the channels that may be used without providing interference to the DTV incumbent and provide only those channels that meet the maximum interference level needed by the Tier 2 spectrum users. Such functionality may be added to the TVWS database 2304 as a functional layer of SW, for example, to enhance the current functionality of the TVWS database 2304.

The TVWS database 2304 may use the protection criteria to select potential channels to assign to the SSM 628 that may meet the protection criteria (2416) and communicate these potential channels to the SSM (through usable channels and restrictions) (2418). The restrictions associated with the usable channels may include, for example, maximum transmit power, time availability (e.g., TTL), spectral mask requirements, or out-of-band emissions, which may ensure protection of the incumbent spectrum user and, in an embodiment, other Tier 2 spectrum users being protected by other SSMs. Based on the available channels and restrictions, the SSM 628 may decide to use these channels or a subset of channels (or use more restricted conditions on these channels) (2420) and may communicate its selection to the TVWS database 2304 through a selected channels and conditions message (2422). It may also send the spectrum response back to the WSD1 604f to indicate the spectrum that has been granted. Alternatively, the selection of the channel to be used may be made by the WSD1 604f. In other words, the options provided by the TVWS database 2304 may be forwarded by the SSM 628 to WSD1 604f via a spectrum response message (2424), and WSD1 604f may select the channel to be used and indicate this to the SSM 628.

In turn, the TVWS database 2304 may store the protection criteria for WSD1 604f (2426) based on the selected channels and conditions communicated by the SSM 628 (or by WSD1 604f, depending on the aforementioned alternative). These protection criteria may be used for future calculations made when other WSDs (e.g. WSD2 604e) make requests for TVWS channels. In other words, the available channels in a given area, the maximum transmit power allowable on these channels, the time availability of these channels, etc., may be altered by the information stored by the TVWS database 2304 as protection criteria. Following this, the SSM 628 may periodically check with the TVWS database 2304 (e.g., at the expiry of a validity time associated with channels allocated by the SSM 628) whether the channels may continue to be used by the devices or Tier 2/Tier 3 spectrum users managed by the SSM 628.

As an alternative, the SSM 628 may make a generic request to the TVWS database 2304 for a range of locations that may be usable. Some assumed technology or potential technologies may be specified in the request, or the TVWS database 2304 may assume the request applies to a worst case technology that may be applied in the requested locations so that the TVWS database 2304 has the information required to provide a set of channels that may ensure protection of the incumbent spectrum users. These locations may include a combination of the needs of multiple pending Tier 2 or Tier 3 spectrum users that require spectrum.

When the SSM 628 makes a request to the TVWS database 2304 for channels, it may first determine whether the channels provided by the TVWS database 2304 may be employed for one or more Tier 2 spectrum users based on the allowable power levels that may be used on these channels (e.g., obtained from the response from the TVWS database 2304). If the allowable power levels, as reported by the TVWS database 2304, satisfy the needs of the Tier 2 spectrum users, the SSM 628 may decide to reserve these channels with the TVWS database 2304 using the selected channels and conditions message. To facilitate the QoS of the Tier 2 spectrum users, the SSM 628 may indicate to the TVWS database 2304 the expected power of the Tier 2 spectrum user (which may be lower than or equal to the maximum power indicated by the TVWS database 2304) at each location and the SNR that may need to be maintained at each of these locations in order to maintain the previously guaranteed QoS. The SNR requirements may be communicated to restrict further use by WSDs contacting the TVWS database 2304 directly in order to protect the Tier 2 spectrum users. With this information, the TVWS database 2304 may then be able to compute the transmit powers for other WSDs that may request a TVWS channel directly from the TVWS database 2304 as shown in FIG. 24 in the case of WSD2 (604e).

Figure 25:
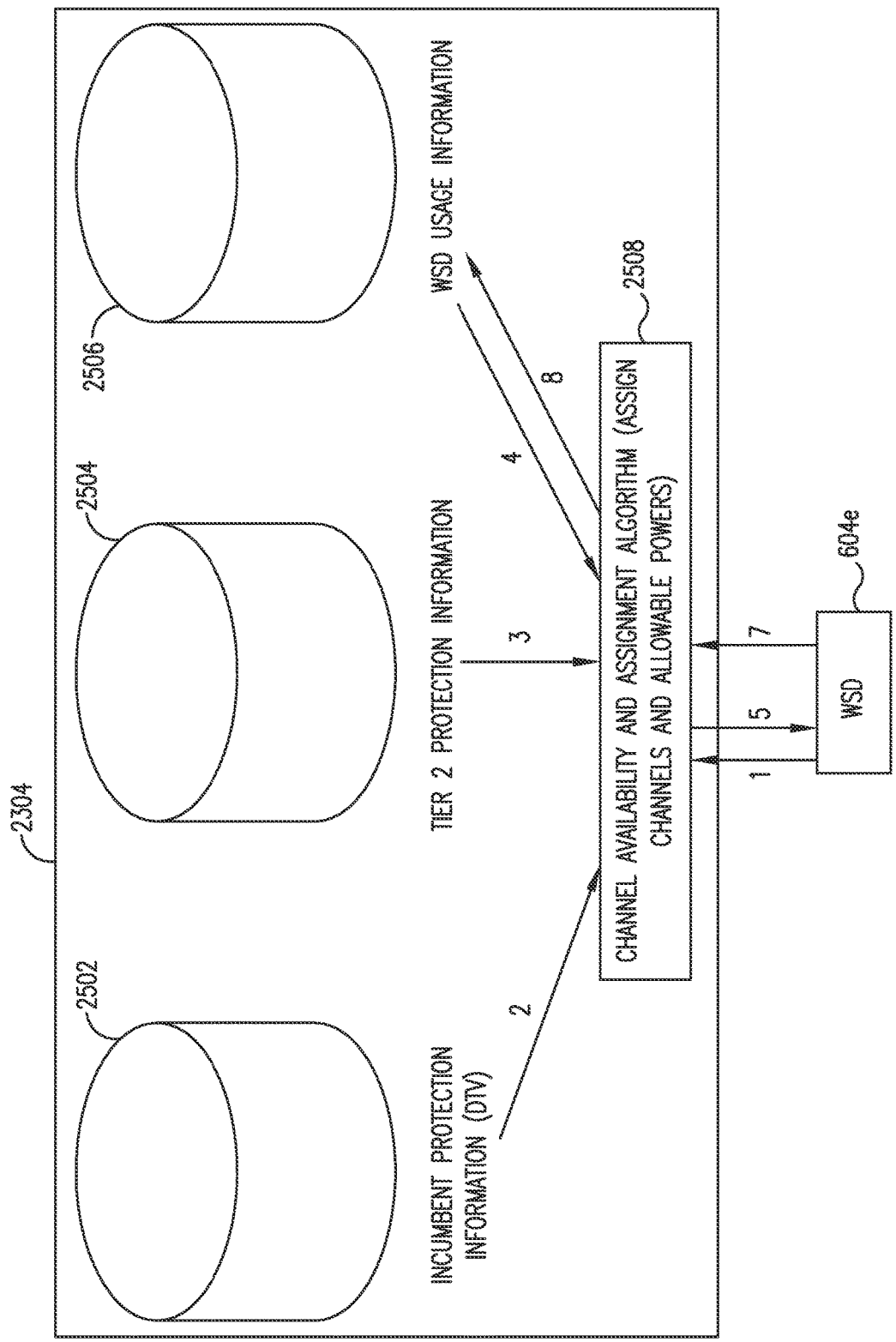
FIG. 25 is a diagram of example enhancements to a TVWS database for protection of Tier 2 spectrum users that are operating in the TVWS and managed by an SSM.

FIG. 25 is a diagram 2500 of example enhancements to a TVWS database for protection of Tier 2 spectrum users that are operating in the TVWS and managed by an SSM. In the example illustrated in FIG. 25, the TVWS database 2304 includes an incumbent protection information (DTV) database 2502, a Tier 2 protection information database 2504, and a WSD usage information database 2506. When a WSD 604e that communicates directly with the TVWS database 2304 requests channels for use in the TVWS, the algorithm 2508 in the TVWS database 2304 may not only consider the incumbent protection information (e.g., maintained in the incumbent protection information database 2502) but also the Tier 2 protection information (e.g., maintained in the Tier 2 protection information database 2504) and the WSD usage information (e.g., maintained in the WSD usage information database 2506) to ensure that the channel assignment options given to the WSD 604e do not violate the protection requirements of the Tier 2 spectrum users that are currently using the spectrum. The SSM 628 may have provided the protection information to the TVWS database 2304 when the SSM 628 made a request for spectrum as a special user, and the protection information may be updated each time the SSM 628 indicates that the use of spectrum by the Tier 2 spectrum user changes. The actual channel usage by the WSD 604e may also be stored in the WSD usage information database 2506 so that future requests may also take this usage into consideration.

The example information flow illustrated in FIG. 24 and alternative embodiments may assume that the TVWS database 2304 has knowledge of the usage of channels by WSDs that do not use the SSM 628 (e.g., WSDs that use the classical TVWS link). This may be provided if the regulation or standards require the devices to provide their spectrum usage to the TVWS database 2304. Protection of Tier 2 spectrum users by the SSM 628 may be provided through the validity time given by the TVWS database 2304. For example, Tier 2 spectrum users may only be allowed to start using the TVWS channels at specific time instances that correspond to when the validity time for TVWS channels given by the TVWS database 2304 to a WSD that does not use the SSM 628 has expired. This lag time in the usage of the TVWS channels by the Tier 2 spectrum user may guarantee that there are no other devices (that have accessed the TVWS database directly) that may compromise the QoS provision of the Tier 2 spectrum users.

For example, a Tier 2 WSD1 may make a request for spectrum, and the SSM 628 may send this request to the TVWS database 2304. The TVWS database 2304 may respond to the SSM 628 with a list of channels and when they will become available. When the SSM 628 determines the potentially available channels, it may indicate the time in which these channels will become free of any devices (such as WSD2) that requested spectrum directly from the TVWS database 2304. This validity time may have been provided by the TVWS database 2304 to the SSM 628 and may depend on the validity time that was provided with the availability information provided to WSD2. When the WSD2 tries to renew its channel usage, it may find out from the TVWS database 2304 that the channel is no longer available. When the validity time(s) expires, the spectrum assigned by the SSM 628 to WSD1 may be used by WSD1. Any future accesses to the TVWS database 2304 by WSD2, on the other hand, may indicate a change in the availability of the channels to indicate the usage by WSD1 (e.g., fewer channels available or more restrictive power limitations).

In another example split, an SSM 628 may behave as a new type of incumbent spectrum user. In this case, the TVWS database 2304 may perform the task of protecting not just the incumbent spectrum users such as DTV incumbents but also the Tier 2 spectrum users that the SSM 628 is managing. In this case, the SSM 628 may behave more as an incumbent to the TVWS database 2304 than a WSD. In addition, the assignment of the actual channel for the Tier 2 spectrum user may be made by the TVWS database 2304 itself, which may decide the technical parameters for the usage of the TVWS by the Tier 2 spectrum user (e.g., maximum transmit power and usage time). In this case, the TVWS database 2304 may be equipped with an additional layer of providing protection to Tier 2 spectrum users from interference from other WSDs (and so a portion of the spectrum management functionality may be integrated into the TVWS database 2304). The SSM 628 may then request spectrum for Tier 3 spectrum users from the TVWS database 2304 as a regular WSD and, in an embodiment, provide additional coexistence or sensing information related to these channels to the Tier 3 spectrum users.

An advantage of this case compared to the case where the SSM behaves as an enhanced WSD with protection rights of a primary system is that the protection of Tier 2 spectrum usage in the TVWS may be ensured only in a single location (e.g., the TVWS database 2304) rather than having this functionality in both the SSM 628 and a stripped down or simplified portion within the TVWS database 2304. A disadvantage may be that the enhancements made to the TVWS database may need to be greater in this specific case.

Figure 26A:
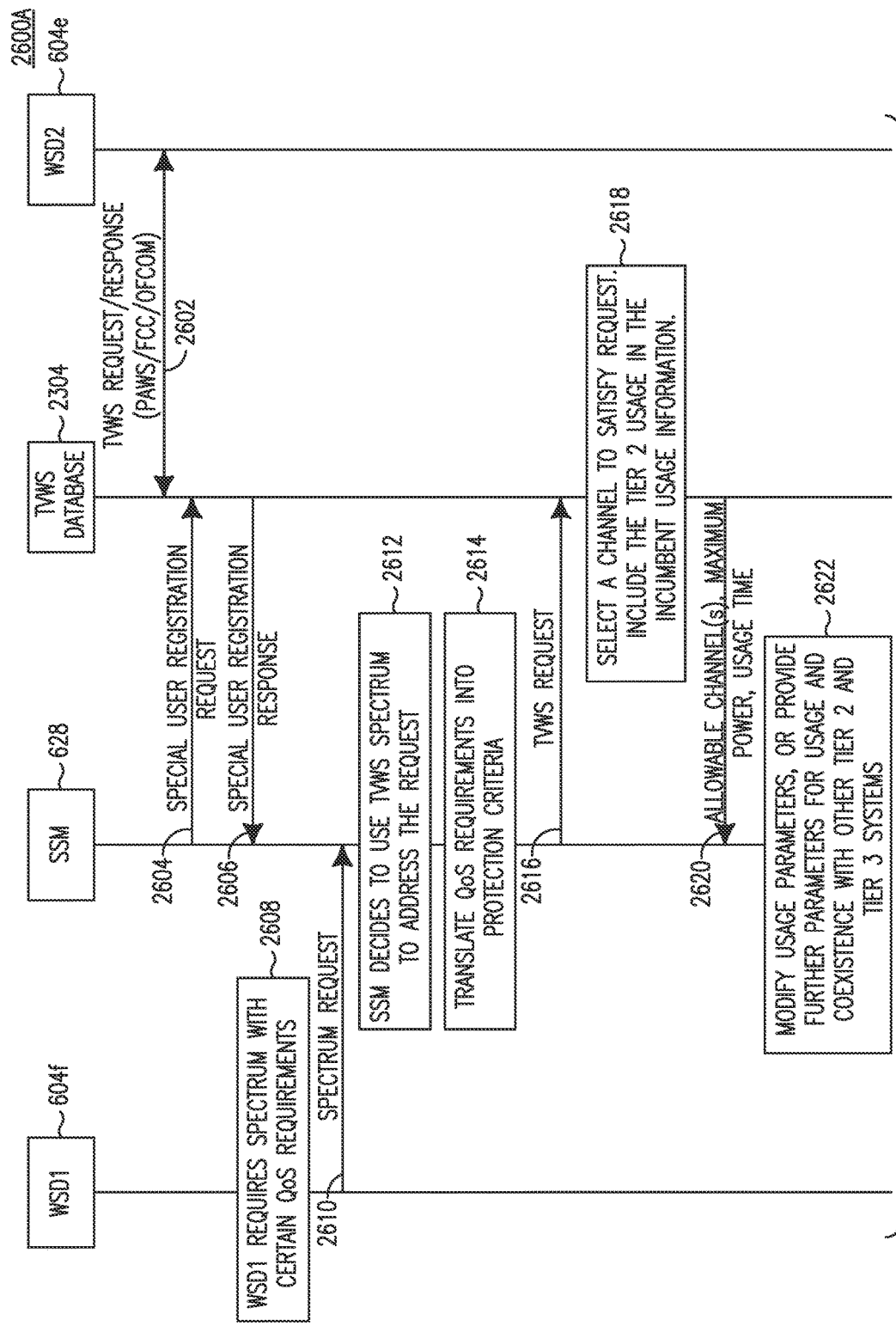
FIGS. 26A and 26B are a flow diagram of an example message exchange for an SSM acting a special user of the TVWS with non-pre-reserved spectrum where the SSM behaves as a new type of incumbent spectrum user with respect to a spectrum request from a WSD that is a Tier 2 spectrum user.
Figure 26B:
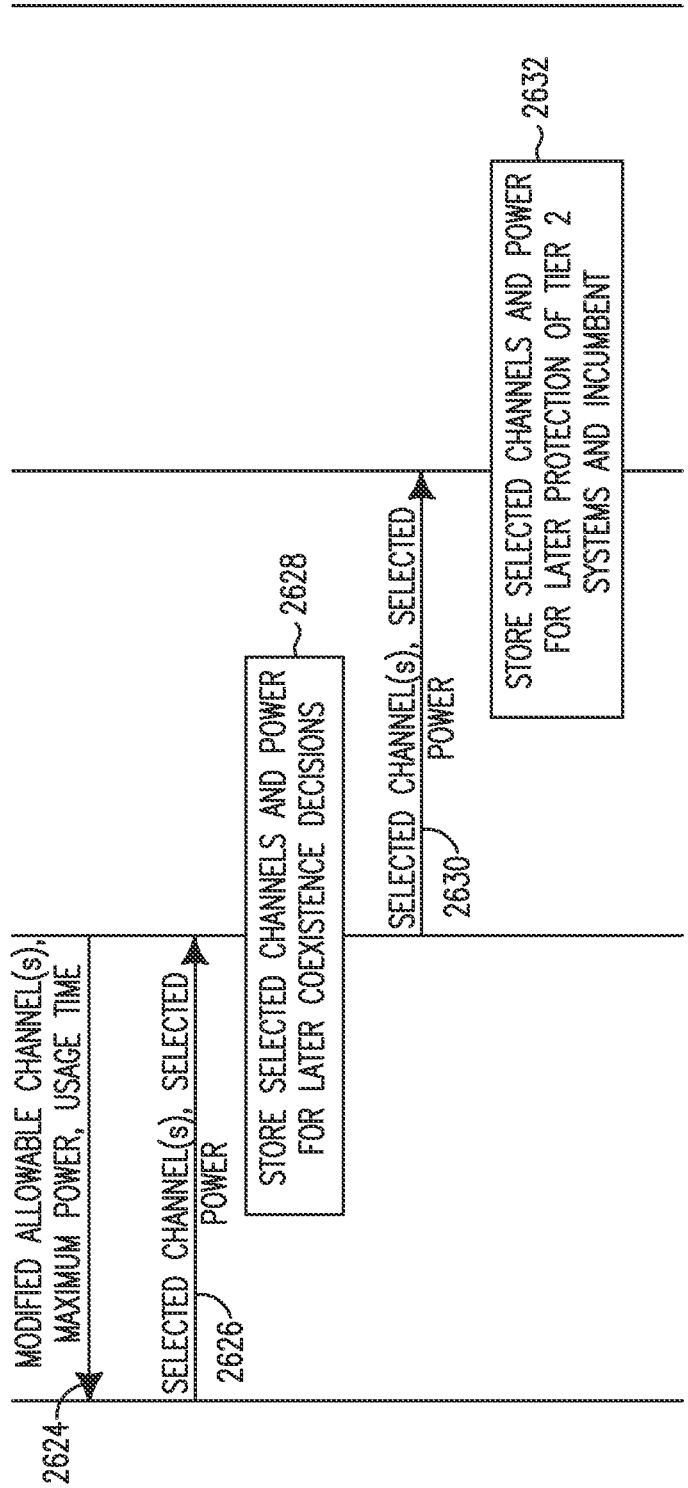

FIGS. 26A and 26B are a flow diagram 2600a/2600b of an example message exchange for an SSM 628 acting a special user of the TVWS with non-pre-reserved spectrum where the SSM behaves as a new type of incumbent spectrum user with respect to a spectrum request from a WSD that is a Tier 2 spectrum user. In the example illustrated in FIGS. 26A and 26B, as with the case where the SSM behaves as an enhanced WSD with protection rights of a primary system, WSD2 604e requests TVWS channels from the TVWS database using one of the existing methods specified either by the FCC, PAWS and/or OFCOM (2602). Further, the SSM 628 may register as a special user of TVWS with the TVWS database 2304 (2604/2606), which may allow the SSM 628 to exchange certain information that may allow the SSM 628 to decide to use TVWS to assign spectrum in specific areas over others. For example, the information may include the service location of the SSM 628 and the relative locations of broadcast stations that may be present in that area. In this way, if the SSM 628 receives a request from WSD1 604f that would make TVWS a good candidate to satisfy this request, the SSM 628 may make this decision appropriately.

In the example illustrated in FIGS. 26A and 26B, WSD1 604f is a Tier 2 spectrum user. When WSD1 604f requires spectrum with certain QoS requirements (2608) and, accordingly, makes a request to the SSM 628 (2610), the SSM 628 may decide to satisfy the request using TVWS (2612). The SSM 628 may translate the QoS requirements into protection criteria (2614) and then hand over the spectrum assignment to the TVWS database 2304 by making a TVWS request (2616). The TVWS request may include, for example, the transmission characteristics of WSD1 604f and the protection criteria that may be derived by the QoS requirements. The transmission characteristics of WSD1 604f may include any information that may allow the TVWS database 2304 to select channels for that requesting WSD1 604f that will ensure protection of the incumbent spectrum user (e.g., DTV or Tier 1 spectrum users). Such transmission characteristics may include, for example, parameters such as the RAT, location of BSs and potentially WTRUs, antenna height, or antenna angle. This information may be similar to the information that may be traditionally sent by a WSD to a TVWS database, except that here, this information may be relayed by the SSM 628 and may include information about a set of transmitting devices rather than only a single device (e.g., a BS and its connected WTRUs or potentially a set of BSs using a single request). In addition to the transmission characteristics, the SSM 628 may also send the protection criteria. The protection criteria may include, for example, information required by the geo-location database to be able to protect the Tier 2 spectrum user 604f when it eventually starts using an available channel in the TVWS. This may include, for example the required availability time of the channel or the time without any interruption that is needed or the maximum interference level allowable in a given area (or at the location of certain receivers such as the BS). Alternatively, the SSM 628 may send all of the QoS requirements, in which case the TVWS database 2304 itself may perform this translation.

The TVWS database 2304 may perform the spectrum assignment for the requesting spectrum user (e.g., WSD1 604f) by taking into account protection criteria for the incumbent spectrum user, the current usage of other WSDs that have communicated directly with the TVWS database, and the protection criteria for other Tier 2 spectrum users that are also using the TVWS (which the SSM may have made requests for) (2618). As a result, a main difference with the previous case is that in this case, the TVWS database 2304 may ensure protection of Tier 2 spectrum users from other Tier 2 spectrum users also operating in the TVWS (which was done by the SSM 628 in the previous case). The TVWS database 2304 may then provide a listing of available channels to the SSM 628 along with other parameters, such as maximum power and/or usage time (2620).

The SSM 628 may modify usage parameters or provide further parameters for usage and coexistence with other Tier 2 and/or Tier 3 spectrum users (2622) and then send the modified allowable channel(s) and other parameters to the WSD1 604f (2624). The modification may involve selection of a subset of the channels proposed by the TVWS database 2304 (e.g., downselecting the channels) or reduction of the maximum power proposed by the TVWS database 2304. However, it may not involve including additional channels in TVWS or increasing the power indicated by the TVWS database.

The WSD1 604f may respond with its selected channels and other criteria (e.g., selected power) (2626), which the SSM 628 may store for use in later coexistence decisions (2628). The SSM 628 may also forward the selected channels and other criteria to the TVWS database 2304 (2630). Depending on whether the SSM 628 is providing a management or information service to the Tier 2 spectrum user in question (e.g., WSD 604f), the final decision for the maximum power and the actual channel usage may be made at the SSM 628 or at the Tier 2 spectrum user, respectively. FIGS. 26A and 26B show the case where the decision is made at the Tier 2 spectrum user 604f, in which case, the allowable channels and maximum transmit powers are relayed to the WSD1 604*f*, and the WSD1 604*f* sends the selected channels and powers to the SSM 628, which stores this information and relays it to the TVWS database 2304. Alternatively, the decision could be made at the SSM 628, and the SSM 628 may provide the selected channels and powers (as well as additional usage information such as the availability time) both to the Tier 2 spectrum user 604*f* as well as to the TVWS database 2304. The TVWS database may then store this information as the actual usage of the Tier 2 system. Combined with the protection criteria, this may ensure the protection of the Tier 2 spectrum user from other WSDs that may contact the TVWS database 2304 directly (e.g., without the SSM 628).

In the example illustrated in FIGS. 26A and 26B, the TVWS database 2304 may store the usage of the Tier 2 spectrum users (channels, etc.) at the time in which the TVWS request is made (the assumption being that the TVWS response or allowable channels and maximum powers will reflect the actual usage of the Tier 2 spectrum users) (not shown). Alternatively, the TVWS database 2304 may store this information when it receives the actual usage parameters that the Tier 2 spectrum user will use (2632).

The Tier 2 protection criteria may be maintained by the TVWS database 2304 in a way that is similar to the incumbent (e.g., DTV) protection criteria, and so the Tier 2 spectrum users may simply become a new type of incumbent. This may include the location of the Tier 2 spectrum user transmitter and receivers, their technology, the maximum allowable level of interference that may be accepted by the Tier 2 spectrum user to allow its QoS to be met, etc. As a result, the Tier 2 spectrum users may in fact look like incumbents from the point of view of the TVWS database 2304, except for the fact that Tier 2 spectrum users may need to leave the spectrum when the incumbent spectrum user (e.g., DTV) may request access to the system again. As a result, in this case, Tier 2 spectrum users may be handled by having the SSM 628 enter them into the TVWS database 2304 as information similar to incumbent information.

FIG. 27 is a flow diagram 2700 of an example message exchange for an SSM 628 acting a special user of the TVWS with non-pre-reserved spectrum where the SSM 628 behaves as a new type of incumbent spectrum user with respect to a spectrum request from a WSD 604*h* that is a Tier 3 spectrum user. In the example illustrated in FIG. 27, WSD1 604*h* decides that it requires spectrum with no protection criteria (2702) and, accordingly, sends a spectrum request to the SSM 628 including any transmit characteristics (2704).

Since there may be no protection criteria for Tier 3 spectrum users, the SSM 628 may behave like a WSD that accesses the TVWS database 2304 directly. Since the TVWS database 2304 may have the full responsibility for ensuring protection of Tier 2 spectrum users in this case, the messaging and operation for a Tier 3 spectrum user is almost identical to that of a WSD contacting the TVWS database 2304 directly. The SSM 628 may decide to use TVWS spectrum to address the spectrum request from WSD1 604*h* (2706). Then, on behalf of the WSD1 604*h*, the SSM 628 may send a spectrum request to the TVWS database 2304 (2708), including, for example, RAT and device parameters for WSD1 604*h*. The TVWS database 2304 may determine the allowable channels and transmission powers from both the incumbent protection criteria and the Tier 2 spectrum user protection criteria (2710) since the SSM 628 may have access to all of these. The example illustrated in FIG. 27 shows the case of the SSM 628 acting through the management service since the SSM 628 decides on the device usage parameters (channels and transmit power) to be used by the Tier 3 spectrum user (2714) based on allowable channels and maximum power information provided by the TVWS database 2304 (2712). The information service may be extended similarly to the previous information flow where the decision may be made at the WSD itself. In the example illustrated in FIG. 27, the SSM 628 sends the selected channels and transmit powers to the TVWS database 2304 (2716).

When making the spectrum request, the SSM 628 may send only the WSD1 network usage information to the TVWS database 2304 since, in this case, the TVWS database 2304 is not being asked to protect the Tier 3 spectrum user from other WSDs (such as those that request spectrum directly from the TVWS database without the SSM 628).

Where the SSM 628 acts as a special user with pre-reserved spectrum, the SSM 628 may be assigned a set of channels in a given geographical location by the TVWS database 2304. The TVWS database 2304 may then allow the SSM 628 to manage these channels independently for the period of time where the channels are known to be free of an incumbent spectrum user (e.g., a DTV). In addition, the TVWS database 2304 may continue to be used by the SSM 628 to determine the time availability of the channels. In other words, the SSM 628 may consult with the TVWS database 2304 at the expiry of the availability time or database check time to determine whether the channels may continue to be used by the SSM 628.

The channels to be reserved for the SSM 628 may be decided statically at the time in which the SSM 628 registers with the TVWS database 2304 as a special user. For example, the SSM 628 may be statically assigned a set of x contiguous channels in the TVWS that may be used for Tier 2 or Tier 3 spectrum users managed by the SSM 628. The decision for the allocation of these channels may not necessarily be based on availability (from the point of view of which channels are reserved for incumbent spectrum users and which are not) but may be arbitrarily chosen by the TVWS database 2304. Alternatively, the TVWS database 2304 may make this reservation based on the approximate location to be serviced by the SSM 628 and, in an embodiment, the technical characteristics of the eventual Tier 2 spectrum users using the channel. In order to use the concept of reserved channels while ensuring protection to Tier 2 spectrum users, some guaranteed protection criteria may be assumed, and this protection criteria may be respected by the TVWS database 2304 following the reservation of the channels. For example, a set of channels may become unusable by any WSD that requests channels from the TVWS database 2304 directly, and, also, some minimum requirements on adjacent channel interference may be guaranteed by the TVWS database 2304 on channels reserved to the SSM 628. Such protection criteria may be negotiated and/or agreed upon between the SSM 628 and the TVWS database 2304 prior to reservation of the channels. The SSM may then assign channels to Tier 2 and Tier 3 spectrum users based on the minimum guaranteed protection criteria that are provided by the TVWS database 2304.

In addition, the channels may only become usable at some lag time following the actual registration by the SSM 628 in order to ensure that no other spectrum users are using the same channels. This lag time may be related to the validity time that was provided by the TVWS database 2304 to WSDs that are not serviced by the SSM 628.

To ensure protection of incumbent spectrum users when Tier 2 spectrum users use channels managed by the SSM 628, the SSM 628 may only manage its channels independently for a period of time specified by the TVWS database 2304. This time may include the expected usage time of a channel by an incumbent (which may be known by the TVWS database 2304). When that time expires, the SSM 628 may need to re-synchronize its information with the TVWS database 2304. In addition, when the TVWS database 2304 reserves certain channels for the SSM 628, the SSM 628 must respect the usage characteristics of these channels (e.g., maximum transmit power, and/or allowable location) for the entire period until the next re-synchronization of information between the TVWS database 2304 and the SSM 628 (in which case the reserved channels themselves or the restrictions on the reserved channels may change).

To ensure protection of the Tier 2 spectrum users, the TVWS database 2304 must adhere to protection criteria on the channels adjacent to the reserved channels. For example, the TVWS database 2304 must assign channels to WSDs in such a way that the interference to a reserved channel at a specific location (coming from adjacent channel usage by WSDs) is limited to some maximum value.

One of the main differences with respect to the case where the SSM acts as a special user of the TVWS database 2304 without pre-reserved spectrum is that here, the TVWS database 2304 may set aside a set of channels to be used by the SSM 628 at registration. This set of channels may then be managed entirely by the SSM 628 (with some minimal help by the TVWS database 2304) until the SSM 628 de-registers or gives back the channels to the TVWS database 2304. Certain channels may become unusable by WSDs that access the TVWS database 2304 directly as long as the SSM 628 is registered to the TVWS database 2304. The reservation of these channels by the SSM 628, however, may be subject to the following restrictions: if a primary spectrum user (e.g., a DTV) needs to use a channel reserved for use by the SSM 628, the SSM 628 may not use that channel in the area of the primary spectrum user transmission or reception (or area where no WSDs are allowed); and any transmit powers used on those channels and adjacent channels that are required to protect nearby DTV broadcast spectrum users need to be respected by allocations made by the SSM 628.

In an embodiment for the case where TVWS spectrum is reserved by the SSM 628, the SSM 628 may register with the TVWS database 2304 as a special user. During the registration process, the SSM 628 may indicate the preferred zone or general area that it would like to service. This general area may be based on pending requests from Tier 2 or Tier 3 spectrum users that the SSM 628 may have. It may also be based on recent history of spectrum usage by Tier 2 and Tier 3 spectrum users at that location or some long term contracts that a Tier 2 spectrum user has set up with the SSM 628.

Based on information about the general area to be serviced and some potential knowledge of active broadcasting stations, the TVWS database 2304 may reserve a set of channels for the SSM 628 for its own usage of spectrum later on. These channels may potentially be reserved by the SSM 628, for example, until it later de-registers. The TVWS database 2304 may indicate the channels reserved for the SSM 628 and any power restrictions for the usage of these channels per pixel (e.g., adjacent channel leakage, maximum transmit power on each channel or on the collection of channels), and the allowable usage time for each of the available channels. Channels that are unavailable at the time of registration or static assignment by the TVWS database 2304 may be indicated as such by the TVWS database 2304 to the SSM 628.

The SSM 628 may use the available channels as needed to try to satisfy the needs of the Tier 2 and Tier 3 spectrum users that request spectrum from the SSM 628. In that case, certain channels may be assigned to Tier 2 spectrum users while other channels may be assigned to Tier 3 spectrum users. The assignment to Tier 2 and Tier 3 spectrum users may be made for a maximum of time of the availability of the channels as specified by the TVWS database 2304. The assignments use conditions and protection criteria may be communicated to the TVWS database 2304, which may then take care of the protection of the newly assigned Tier 2 use.

Periodically, the SSM 628 may check with the TVWS database 2304 to determine whether any of the occupied channels become available. If, at any given time during the periodic checks of the unavailable channels, the TVWS database 2304 indicates to the SSM 628 that one or more channels has become available, the SSM 628 may then start to use the channel to satisfy bandwidth needs of Tier 2 or Tier 3 spectrum users as needed.

For a given TVWS channel that is being used by the SSM 628 for allocation to Tier 2 or Tier 3 spectrum users, when the availability time of that channel as indicated by the TVWS database 2304 is expired, the SSM 628 may again check the availability of the channel from the TVWS database 2304. The TVWS database 2304 may indicate whether that channel is used or available, and in the case it is available, indicate to the SSM 628 the usage restrictions for the channel. The use of the channel by the SSM 628 may then be continued. If the channel is unavailable, the SSM 628 may periodically check the availability of the channel.

Figure 28:
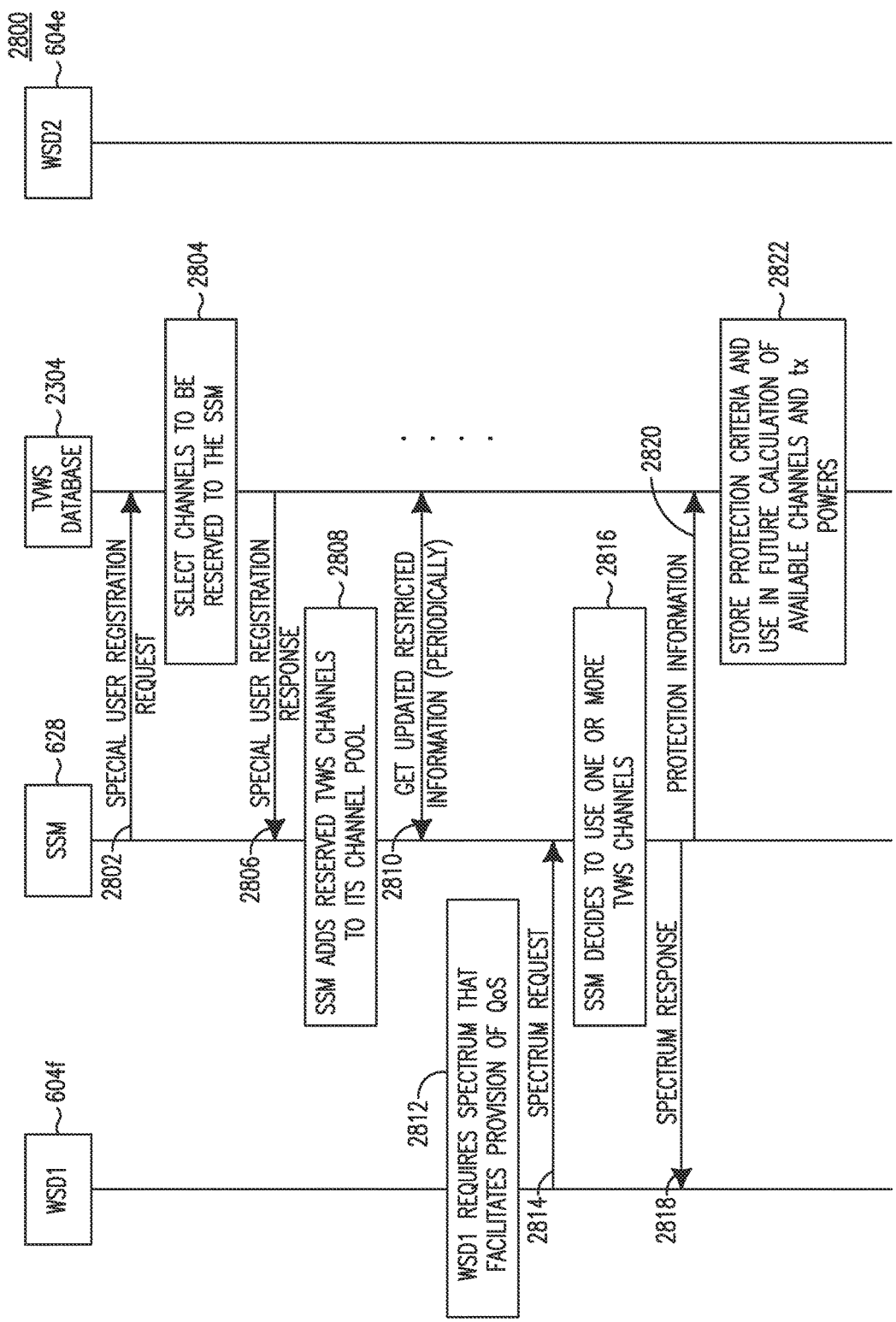
FIG. 28 is a flow diagram of an example information exchange where the SSM acts as a special user of the TVWS database with pre-reserved spectrum.

FIG. 28 is a flow diagram 2800 of an example information exchange where the SSM 628 acts as a special user of the TVWS database 2304 with pre-reserved spectrum. In the example illustrated in FIG. 28, the SSM 628 may send a special user registration request to the TVWS database 2304 (2802). This message may include, for example, the area of interest that is being served by the SSM 628 as well as any possible information about the technologies that may be used in this area. The TVWS database 2304 may select the channels that will be reserved for the SSM 628 (2804) and send a special user registration response message to the SSM 628 (2806). This response may include information about the channels that are reserved for use by the SSM 628. For these channels, it may also include specific information about the use of these channels in order to protect the incumbent spectrum user. For example, the information associated with each channel may include the geographical area where transmission is allowed, the allowable transmit power at each of these locations, and, in an embodiment, any out of band restrictions on these channels/locations. Alternatively, the information may be in the form of the location of the incumbent spectrum users (e.g., DTV transmit stations), their current activity (using the channel or not) and their required protection criteria. In the latter case, it may be assumed that the SSM 628 will perform a similar calculation to that performed by the TVWS database 2304 in order to determine the availability of channels in TVWS and the allowable transmit powers based on the incumbent spectrum user locations and activity.

Following registration, the SSM 628 may add the set of channels obtained from the TVWS database 2304 to the channels in its spectrum pool (e.g., for later assignment to potential WSDs or Tier 2/3 spectrum users that may request it) (2808). In addition, the SSM 628 may periodically query the TVWS database 2304 in order to obtain updated information associated with each of these channels (2810). For example, in the case where the information provided by the TVWS database 2304 to the SSM 628 is in the form of available channels and allowable transmit power, the SSM 628 may need to update this information at the expiry of each channel validity timer. On the other hand, if the information is in the form of incumbent user location and activity, the information may be updated much less frequently.

When WSD1 (e.g., 604f) requires spectrum with a certain level of protection (2812), it may send a request to the SSM 628 (2814), which may make use of the available TVWS channels in order to satisfy this request (2816). When an assignment is made to a user or WSD that requires maintaining certain QoS via a spectrum response message (2818), the SSM 628 may need to send protection information to the TVWS database 2304 to inform it of the restrictions of transmission by other WSDs (e.g. WSD2 604e, which may get its operating parameters directly from the TVWS database) (2820). The TVWS database 2304 may store this protection criteria and use it in the future calculations of available channels and allowable transmit powers for the WSDs (2822).

Alternatively, the need for sending the protection information from the SSM 628 to the TVWS database 2304 each time an assignment is made by the SSM 628 may be avoided by having the TVWS database 2304 assume (at the onset of registration) that all channels assigned to the SSM 628 are in use with some assumed or worst case technical characteristics. As a result, the requirements of the TVWS database 2304 calculation may be set immediately, for example, based on the negotiated or exchanged information during the registration. This option may be overly restrictive in terms of spectrum efficiency, as it assumes the worst case usage of channels by systems managed by the SSM 628; however, it may avoid the signalling of new protection information each time the SSM 628 changes the assignment of channels in in its spectrum pool.

In an embodiment, the option where the SSM 628 acts as a special user of the TVWS database 2304 with pre-reserved spectrum may also be realized using an SSM behaving as an enhanced WSD with protection rights of a primary system or an SSM behaving as a new type of incumbent (as described above) in terms of the functional split between the TVWS database 2304 and the SSM 628. The details applicable for this option may be easily derived by a person skilled in the art.

In an embodiment, an SSM 628 may determine the presence of devices that access the geo-location database directly through sensing/measurements. Here, the SSM 628 may not communicate any protection criteria of Tier 2 spectrum users to the geo-location database. In order to ensure protection of Tier 2 WSDs from WSDs accessing the geo-location database directly, the SSM may use sensing/measurements to detect the presence of WSDs accessing the geo-location database directly.

FIG. 29 is a diagram 2900 of an example system in which the SSM determines the presence of devices that access the geo-location device directly through sensing/measurements. The example system illustrated in FIG. 29 includes a WSD1 604f that is in direct communication with a geo-location database 2902 and a WSD2 604e that may communicate with the geo-location database 2902 via the SSM 628.

With reference to FIG. 29, WSD1 604f and WSD2 604e may cause some conflict in coexistence if they use the same channel (or the protection criteria of WSD2 604e may be violated if WSD1 604f operates on the same channel). WSD1 604f may request TVWS spectrum from the geo-location database 2902 and receive channel x (or may be given a list of potential channels from which it chooses channel x). WSD1 604f may then start to use channel x. WSD2 604e may then request a set of channels from the SSM 628 with certain protection criteria. The SSM 628 may request the channels to be used from the geo-location database 2902, and the geo-location database 2902 may provide a list of available channels of which x is one of the channels. Prior to making a decision on the channel to be assigned to WSD2 604e, the SSM 628 may make use of stored sensing or measurement information. Such information may be obtained from the collection of WSDs that are using the services of the SSM 628 or the set of WSDs that are registered to the SSM 628. It may also be obtained by immediately instructing WSD2 604e (or some other WSDs that are registered to the SSM 628) to perform sensing to determine the presence of WSD1 604f on that channel. Sensing in each of the previous cases may include energy measurements on a specific channel (e.g., to quantify the amount of interference) or more sophisticated signature detection algorithms or correlation-based algorithms. It may also include RAT-specific information, such as inter-frequency measurements in LTE for detection of a sync channel or beacon or the result of performance of CSMA algorithm in the case of WiFi.

In this scenario, it may be possible that the interface between the SSM 628 and the geo-location database 2902 is the same as the interface between WSD1 604f and the geo-location database 2902. In other words, the SSM 628 may communicate with the geo-location database 2902 as follows. WSD2 604e may request spectrum from the SSM 628 and provide its operation characteristics. Alternatively, its operation characteristics may be known by the SSM 628 through some pre-registration performed by WSD2 604e. The SSM 628 may request spectrum from the geo-location database 2902 for WSD2 604e and provide the operating characteristics of WSD2 604e. The geo-location database 2902 may provide a list of channels and maximum transmit powers allowable for WSD2 604e to the SSM 628. The SSM 628 may use measurements or sensing information to further reduce the allowable channels provided by the geo-location database by ruling out any channels that may be occupied by WSD1 604f (which may communicate directly with the geo-location database 2902).

The SSM 628 may provide the list of reduced allowable channels to WSD2 604e, which may respond with the actual selected channels and their actual operating parameters (e.g., power). Alternatively, the SSM 628 may make the selection of the channels to operate on and the operation parameters on behalf of the WSD2 604e, where such operation parameters may be selected based on information that may be provided by the request by WSD2 604e. The SSM 628 may indicate the selected channel(s) and operating parameters to the geo-location database 2902. This signalling may be extended by a person skilled in the art to further include any potential slave devices that are under the control of the master device.

In addition, when spectrum is assigned to WSD2 604e (e.g., as Tier 2 spectrum or under the assumption of some protection criteria), the SSM 628 may continually monitor measurements or sensing to determine whether the assigned spectrum is potentially being occupied by a WSD that the SSM 628 is not aware of (e.g., the case where WSD1 604f requests a channel from the geo-location database 2902 and selects a channel that causes coexistence issues or that violates WSD2's protection requirements). In this case, such measurements may be obtained directly from WSD2 604e since it is currently utilizing the same spectrum that needs to be sensed. In the case where the SSM 628 detects the presence of WSD1 604f, it may take one of the following actions. The SSM 628 may inform WSD2 604e of the fact that its protection requirements may no longer be met on the assigned channel. WSD2 604e may then decide to not use the TVWS (or to not use the SSM's services) and may use other spectrum it may obtain (e.g., from another SSM or if it has licensed spectrum available to it). The WSD2 604e may also agree to use the spectrum at the same time as WSD1 604f (e.g., it may no longer assume any protection criteria is respected). Alternatively, the SSM 628 may try repeating the procedure described above to find an alternative channel for WSD2 604e to use. In this case, the procedure may also include additional sensing or measurements collected by the SSM 628 on channels that were already requested in the past by the SSM 628 and indicated as available by the TVWS database 2304. The SSM 628 may remember such available channels from the first request by WSD2 604e, and, when WSD1 604f starts to use the channel that causes a conflict with WSD2 604e, the SSM 628 may already have some sensing information available to select the alternate channel.

FIG. 30 is a block diagram 3000 of an example architecture for an SSM 628 receiving all spectrum requests from all WSDs. In the example illustrated in FIG. 30, queries from uncoordinated WSDs (e.g., WSD 604e) to the TVWS database 2304 are all made through an information processing and modification unit 3002 of the SSM 628 and forwarded (if need be) directly to the TVWS database 2304. On the other hand, requests to the SSM 628 that are made by Tier 2 and Tier 3 spectrum users (e.g., Tier 2 spectrum user 604f and Tier 3 spectrum user 604g) may first be processed by the SSM 628 and then, in an embodiment, sent to the TVWS database 2304. The requests may be sent in the same form, or they may be sent in a modified or processed form, depending on the embodiment being considered. In the architecture illustrated in FIG. 30, the SSM 628 may be assumed to be an entity separate and independent of the TVWS database 2304. Alternatively, the SSM 628 may be a management layer that may be incorporated within the TVWS database 2304 itself or may be a separate entity that may be, however, tightly coupled with the TVWS database 2304 (e.g., both may be implemented or managed by the regulator). For example, one very simplified implementation of the architecture illustrated in FIG. 30 may be where the SSM 628 is integrated into the current TVWS database 2304 itself. For the purposes of generality in the description that follows, it may be assumed that the SSM 628 is a separate entity from the TVWS database 2304. However, these embodiments may also be applicable to the aforementioned case where the SSM 628 is implemented within the TVWS database 2304 itself.

The architecture illustrated in FIG. 30 assumes three different types of connections between users and the SSM 628 (Type 1, 2, and 3). Here, a spectrum user may be a master WSD (such as an AP or base station) or it may be an operator that manages multiple WSDs. Each type of connection may include an actual physical link and a logical link. For each of the three types of connections, the physical link may include a component between the WSD or Tier 2/3 spectrum user and the SSM 628 and another component between the SSM 628 and the TVWS database 2304. Each connection may have a physical link, which may be modified by the SSM 628 through some processing and modification functionality. The actual modifications of the information may be specific to the type of connection. In addition, the logical link in the case of the three types of connections may also be different. In Type 1, the WSD 604e may directly access the information in the TVWS database 2304 and, therefore, may have a logical link directly with the TVWS database 2304. On the other hand, Tier 2 and tier 3 spectrum users 604f and 604h may actually be using the services of the SSM 628, and, therefore, their logical link may be directly with the SSM 628. The SSM 628 may then use the TVWS database 2304 to provide the services to the spectrum user that has logically linked to it.

The SSM 628, by servicing Tier 2 and Tier 3 spectrum users 604f and 604h, and by receiving TVWS requests from WSDs (e.g., 604e), may handle all three interfaces (which may differ significantly in the type of information carried and the expected response). In particular, the SSM 628 may be able to handle spectrum requests and also accesses by WSDs that intend to query the TVWS database 2304 directly. Each link type is further described in detail below to fully elaborate how the SSM 628, and the TVWS database 2304 may operate in this particular architecture.

Connection type 1 may consist of the connection by a WSD 604e that requests use of the TVWS on a non-interfering, non-protecting basis. Because the WSD 604e is unaware of the presence of the SSM 628, it may be considered that the logical link for this connection is directly with the TVWS database 2304. For this connection type, the WSD 604e may use a protocol to access the TVWS database (e.g., FCC or OFCOM as applicable). In other words, the WSD 604e may provide its geo-location and other parameters such as antenna height, technology, unique identifier, etc, and would expect a list of available channels from the TVWS database 2304. This information may be provided to the SSM 628, which may then forward it to the TVWS database 2304.

In the OFCOM/PAWS interface, communication may occur via a TVWS channel request, a TVWS channel response and selected TVWS channel and transmit power. With respect to the TVWS channel request, a WSD may make a request to the TVWS database 2304 for a list of available channels by providing its device characteristics (e.g., location and/or transmitter characteristics). With respect to the TVWS channel response, the geo-location database may respond to the WSD by indicating the available channels and the maximum transmit power that may be used on each channel. With respect to selected TVWS channel and transmit power, after selecting one or more channels and an associated transmit power that may respect the limits specified by the TVWS channel response, the WSD may send this information to the geo-location database 2902.

In an embodiment where the SSM 628 is implemented within the TVWS database 2304 itself as a management layer within the database, it may be assumed that the requests by the WSD are always being made to the SSM 628 since this management layer may be made to receive all requests. In an embodiment where the SSM 628 is a separate physical entity from the geo-location database 2902, a method may be needed to ensure that the SSM 628 receives all requests from the WSDs.

In order to have the SSM 628 behave as a catch all entity that receives messages from the WSD 604e, the WSD 604e may be given the coordinates or information about the SSM 628 as the approved database for this location. For example, prior to accessing the TVWS database 2304, the WSD 604e may need to access a list of approved databases in the area.

The list of approved databases may be altered by the regulator or the TVWS database provider for areas that are served by an SSM 628 to include the contact information/ coordinates/access mechanism of the SSM 628 that services that area (rather than the TVWS database 2304). For example, the regulator of the TVWS database provider may have an agreement with an SSM 628 that requests to serve a specific area and may, therefore, ensure that TVWS database requests are sent to this specific SSM in that area. As a result, all accesses made by a WSD 604e intended for the TVWS database 2304 may be sent directly to the SSM 628 instead.

In an embodiment where there are multiple approved geo-location databases 2902 for the area, a single SSM 628 may handle the attempts to access all of these databases. In an embodiment where multiple SSMs 628 may be present to provide services in the same area, the SSMs 628 may communicate with each other to ensure protection of Tier 2 spectrum users under their respective management. The WSD 604e may or may not be aware of the fact that the request is being sent to the SSM 628 instead of directly to the geo-location database 2902. Also, if there is no SSM 628 servicing a specific area, the information/coordinates of the TVWS database 2304 itself may be provided, and the messages may be sent directly to the TVWS database 2304. In an embodiment where SSMs may service only specific areas (or a subset of the geography that is handled by the TVWS database), there may need to be a mechanism for the SSM 628 and the TVWS database 2304 to synchronize their information in order to ensure protection of Tier 2 spectrum users.

Figure 31:
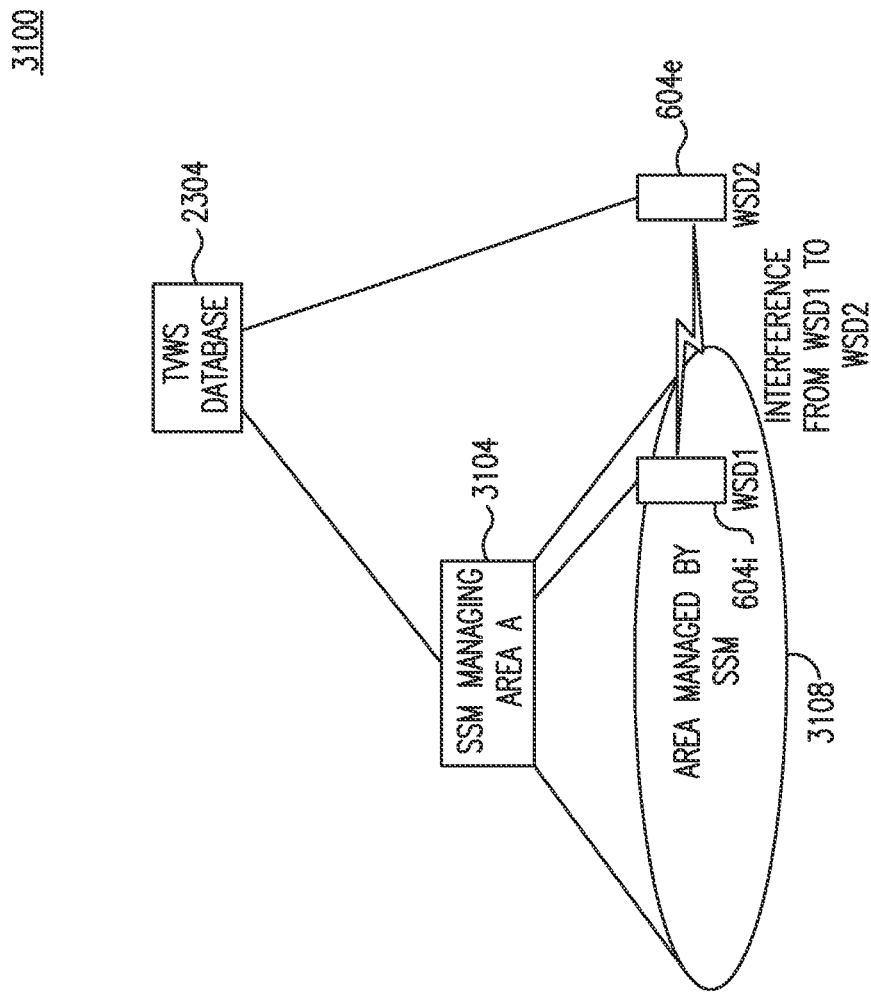
FIG. 31 is a block diagram of an SSM TVWS database synchronization when the SSM manages a subset area.

FIG. 31 is a block diagram 3100 of an SSM TVWS database synchronization when the SSM manages a subset area. In the example illustrated in FIG. 31, the SSM 628 manages the area 3108, and the WSD2 604e may adversely affect the operation of WSD1 604i, which may be a Tier 2 spectrum user.

In an embodiment, the area 3108 managed by the SSM 628 may have a built-in protection zone. WSDs that reside within the protection zone but close to the border may not be offered Tier 2 services since they reside too close to the border of the managed area 3108 and may, therefore, be subject to interference from WSDs that connect directly to the TVWS database 2304.

In an embodiment, a second area B may be defined around the SSM managing area A 3104 that is managed by the SSM. In the second area B, the TVWS database 2304 may not be allowed to assign spectrum to a WSD, or the assignment to WSDs located in the area B may need to be made with certain restrictions (e.g., significantly lower power). In this case, the TVWS database 2304 may be aware of the area managed by the SSM 628 and may define the second area B according to information provided by the SSM 628 (e.g., maximum EIRP leakage into area A). The information may be provided statically when the SSM 628 is first provisioned, or it may be provided and changed dynamically (e.g., through messaging) by the SSM 628 as it learns of new Tier 2 WSDs that join the area A.

For connection type 1, the SSM 628 may forward an initial channel query message by the WSD directly to the TVWS database 2304 without modification. However, the response that includes the allowable channels and potentially their maximum transmit power may either be sent by the SSM 628 directly to the WSD or may be modified by the SSM 628 prior to sending it to the WSD.

Figure 32:
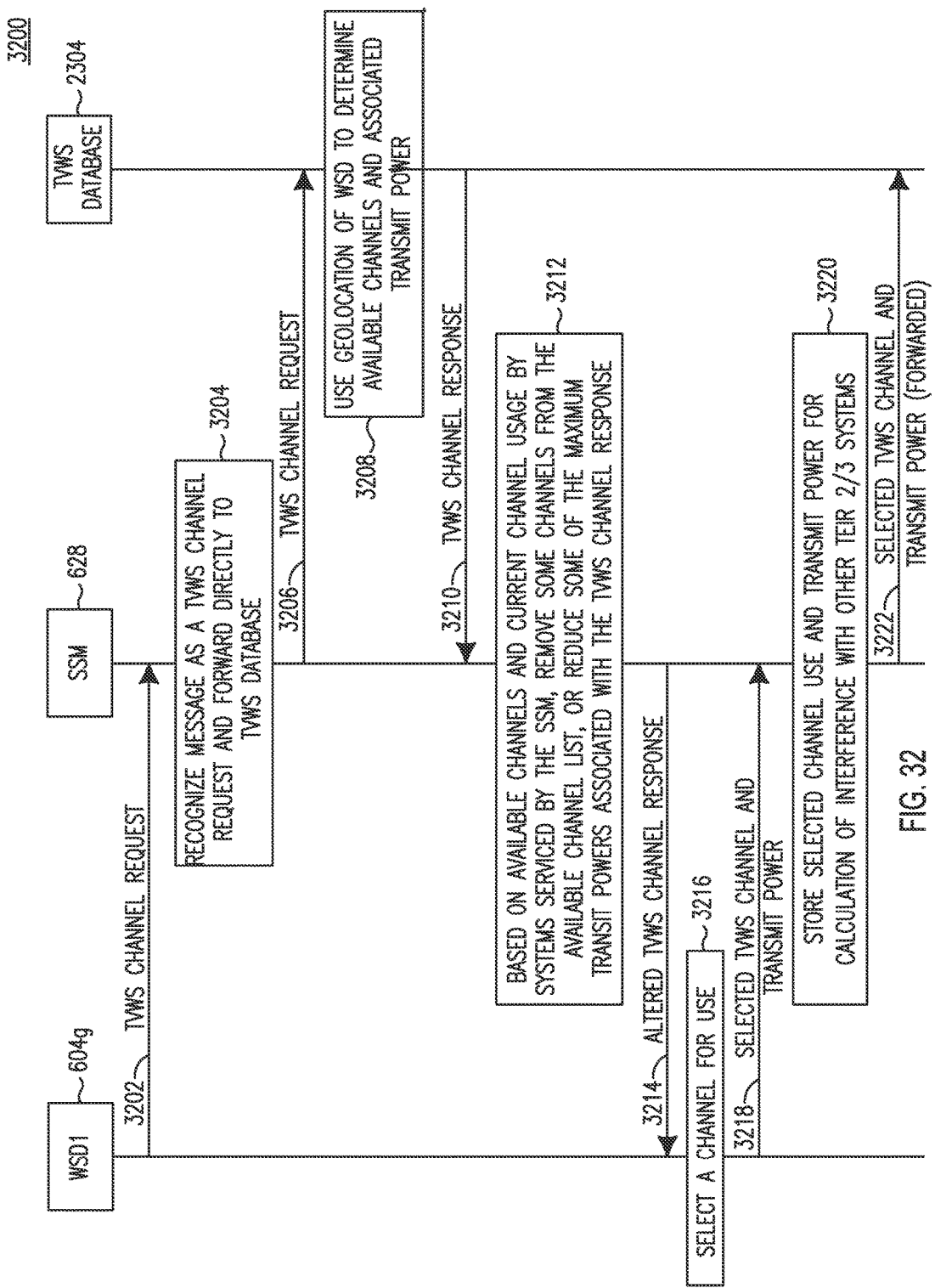
FIG. 32 is a flow diagram of an information exchange for connection type 1 where a WSD accesses the TVWS database through an SSM.

FIG. 32 is a flow diagram 3200 of an information exchange for connection type 1 where a WSD accesses the TVWS database through an SSM. In the example illustrated in FIG. 32, the WSD 604g sends a TVWS channel request intended for the TVWS database 2304 but that is received by the SSM 628 (3202). The channel request may include the information required in the current TVWS rules for the associated regulatory framework (e.g., FCC and Europe). The SSM 628 may receive the TVWS channel request message 3202 and, in recognizing it to be a message of connection type 1 (3204), forward it to the TVWS database 2304 unchanged (3206). The TVWS database 2304 may use the geo-location information of the WSD 604g to determine the available channels and maximum transmit power for each of the channels (3208). This information may be returned to the SSM 628 through a TVWS channel response (3210) (the contents and format of which may be the same as the current requirements for a given regulatory domain).

The SSM 628 may then modify the information in the TVWS channel response (3212) prior to forwarding the response to the WSD 604g (3214) with the intention of protecting a Tier 2 spectrum user that the SSM 628 is currently managing but that that the TVWS database 2304 is unaware of. In modifying the information in the TVWS channel response, the SSM 628 may remove certain channels from the list of available channels based on the geo-location of the WSD 604g that is requesting access. For example, if the SSM 628 determines that the WSD may harm a nearby Tier 2 spectrum user or that a Tier 2 spectrum user is already employing one of the channels in the response, then the SSM 628 may remove the channel from the list of available channels in the TVWS channel response. Alternatively (and also to protect potential Tier 2 spectrum users in the nearby area), the SSM 628 may decrease the maximum allowable transmit power associated with one or more of the channels in the TVWS channel response. The validity time provided by the TVWS database 2304 may also be shortened by the SSM 628 prior to transmission of the response to allow for more granularity for the access time by Tier 2 spectrum users later on. For example, if regular WSDs are not required to provide their selected TVWS channels and transmit power, the SSM 628 may depend on the validity time that is provided to the WSDs to ensure that Tier 2 spectrum users are not interfered with by regular WSDs (which may not be Tier 2 or Tier 3). In this case, access by the Tier 2 spectrum user may be in accordance with the validity time provided to WSDs that are competing for the same channels in the same area.

The SSM 628 may then send the altered TVWS channel response to the WSD 604g (3214), which may select one or more channels to use (3216). In an embodiment (which may depend on the regulation), the WSD 604g may respond with the actual usage of the channel(s) and transmit power (3218). In this case, the SSM 628 may store this information (3220) for use in assigning channels in the future to Tier 2 spectrum users. For example, a channel may be assigned in the future to a Tier 2 spectrum user depending on whether there are WSDs in the area using a transmit power that is not expected to cause a degradation of the QoS to these spectrum users. As a result, the decision by the SSM 628 to assign TVWS channels to Tier 2 spectrum users may depend on the QoS requirements of that Tier 2 spectrum user as well as specific knowledge of WSDs that may be using the same or adjacent channels in the same area (where this knowledge was stored from the Type 1 connection messaging). The SSM 628 may also forward the selected TVWS channel and transmit power information to the TVWS database 2304.

In order to avoid scenarios where the SSM 628 may monopolize the TVWS to service only Tier 2 spectrum users (for example, by removing most or all of the available channels in the TVWS channel response from the TVWS database in the example illustrated in FIG. 32), some fairness policies or regulations may be enforced by the NRA in the decision algorithm of the SSM 628. For example, the SSM 628 may only be able to reduce the number of available channels or the maximum transmit power by a certain amount determined by regulation, thus ensuring that unlicensed spectrum users that do not use the services of the SSM 628 may still obtain TVWS resources. The SSM 628 may then determine, based on the number of requests for Tier 2 spectrum and the amount of available TVWS resources, whether to use TVWS spectrum or potentially other spectrum for its Tier 2 spectrum users.

Connection type 2 consists of a Tier 2 spectrum user requesting spectrum from the SSM 628 and the SSM 628 potentially fulfilling the request using spectrum from the TVWS band. Connection type 2 may be implemented differently depending on the assumptions made regarding the interface between the SSM 628 and the TVWS database 2304.

Figure 33:
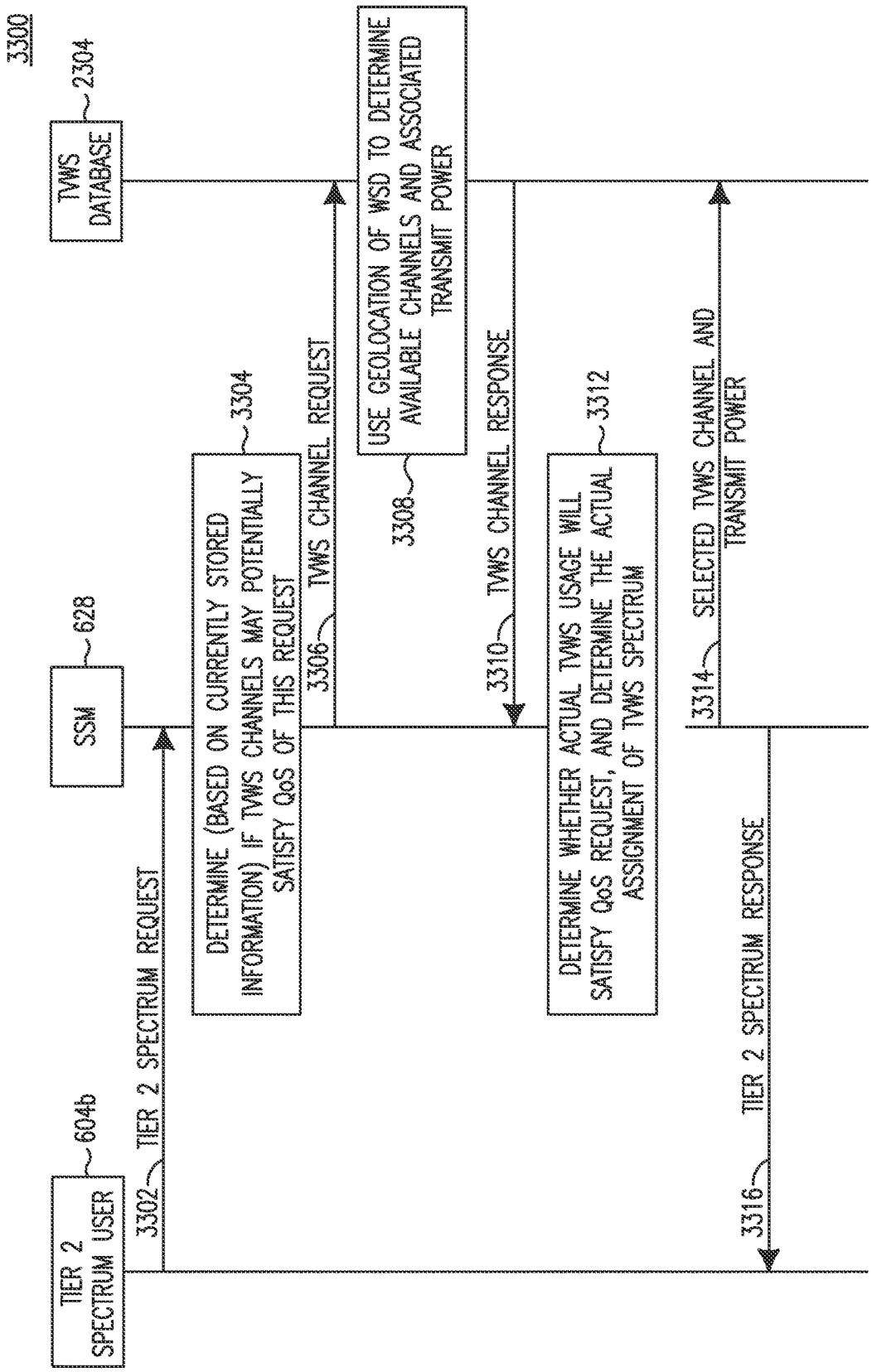
FIG. 33 is a flow diagram of an information flow for connection type 2 where a Tier 2 spectrum user is accessing SSM services.

FIG. 33 is a flow diagram 3300 of an information flow for connection type 2 where a Tier 2 spectrum user is accessing SSM services. In the example illustrated in FIG. 33, a Tier 2 spectrum user 604b may send a Tier 2 spectrum request to the SSM 628 (3302), and the SSM 628 may determine (e.g., based on information is has stored) if TVWS channels may potentially satisfy QoS of the request (3304). The SSM 628 may then communicate with the TVWS database 2304 using an interface such as PAWS.

Using an interface such as PAWS, the SSM 628 may send a TVWS channel request to the TVWS database for a list of available channels and provide device characteristics of the requesting Tier 2 spectrum user (e.g., location or transmitter characteristics) (3306). The TVWS database 2304 may use geo-location information of the Tier 2 spectrum user 604b to determine available channels and associated transmit powers (3308). The TVWS database 2304 may respond to the TVWS channel request by indicating the available channels and the maximum transmit power that may be used on each channel (3310). The SSM 628 may then determine whether actual TVWS usage may satisfy the QoS request from the Tier 2 spectrum user 604b and, if so, determine the actual assignment of TVWS spectrum for the requesting Tier 2 spectrum user 604b (3312). After selecting one or more channels and an associated transmit power, the SSM 628 may send the selected TVWS channel and transmit power to the TVWS database 2304 (3314). The SSM 628 may also send that information to the Tier 2 spectrum user 604b via a Tier 2 spectrum response message (3316).

In the embodiment illustrated in FIG. 33, requests from a Tier 2 spectrum user to the SSM 628 need to be repackaged prior to forwarding to the geolocation database so that they meet the information flow and include the required information. In this case, from the point of view of the geo-location database, the SSM 628 may appear as an actual WSD. Upon reception of the spectrum request from the Tier 2 spectrum user, the SSM 628 may determine whether TVWS is an appropriate frequency band to obtain spectrum from. This decision may be based on the QoS requirements of the Tier 2 spectrum user and the location of the Tier 2 spectrum user in relation to other WSDs that the SSM 628 is aware of (e.g., through knowledge obtained from the messaging of connection type 1 and connection type 3). Since all messaging related to connection type 1 may be received by the SSM 628, the SSM 628 may store the usage of the WSDs that are not employing the services of the SSM.

In addition, the SSM may be aware of the available TVWS channels in a given area based on the history of requests made by WSDs. As a result, the currently stored information may include one or a more of a list of available channels for a sample of locations based on requests from WSDs not using the SSM's services and TVWS database responses (along with the timing of their availability), a rough spectrum mask of the channel availability or the incumbent location based on information built over time from requests and responses, or a list of WSDs that are currently using the available TVWS channels as well as their maximum transmit power and device characteristics (e.g., spectrum masks). This information may be obtained from storing the information from the selected TVWS channel and transmit power message, for example, the assumed PAWS interface.

If TVWS may present itself as an alternative to satisfy the spectrum request, the SSM 628 may create a TVWS spectrum request message (with the existing regulatory format) using the information from the Tier 2 spectrum user. The response from the TVWS database may then be examined to confirm whether the available channels in TVWS may be utilized to satisfy the spectrum request. If so, the SSM 628 may complete the spectrum assignment and send the selected channels and powers to the Tier 2 spectrum user as well as to the TVWS database 2304. The final spectrum assignment to the Tier 2 spectrum user may be sent in the Tier 2 spectrum response 3316. Depending on whether the SSM 628 is aware of the exact usage of TVWS spectrum from regular WSDs, the Tier 2 spectrum response may also include the start time when the Tier 2 spectrum user may start to use the system without risk of harmful interference or degradation of QoS as well as the validity time of the spectrum assignment.

Connection type 3 may be used by Tier 3 spectrum users that request access from the SSM 628. Here, the SSM 628 may decide to use the TVWS as a source of Tier 3 spectrum.

Figure 34:
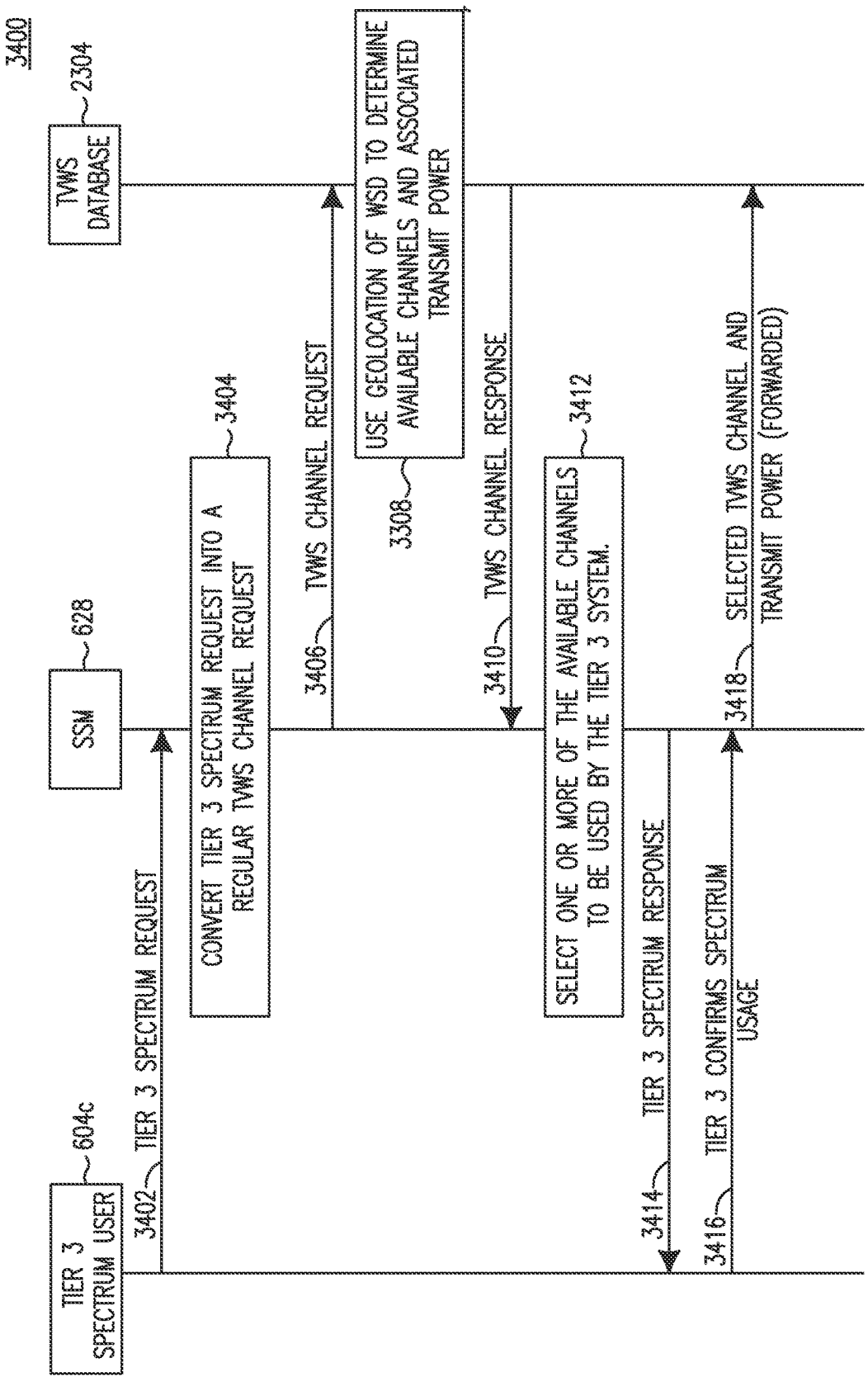
FIG. 34 is a flow diagram of an information flow for connection type 3 for a Tier 3 spectrum user accessing SSM services.

FIG. 34 is a flow diagram 3400 of an information flow for connection type 3 for a Tier 3 spectrum user accessing SSM services. In the example illustrated in FIG. 34, a Tier 3 spectrum user 604c may send a Tier 3 spectrum request to the SSM 628 (3402). The SSM 628 may simply translate a Tier 3 spectrum request 3402 into a TVWS channel request (3404) and assign its Tier 3 spectrum users onto TVWS. In order to do this, the SSM 628 may send a TVWS channel request to the TVWS database 2304 (3406), which may use geo-location information of the Tier 3 spectrum user 604c to determine available channels and associated transmit power (3408). The TVWS database 2304 may then respond to the TVWS channel request with a TVWS channel response (3410). Since the SSM 628 may want to specifically select the TVWS channels on which its Tier 3 spectrum users operate, the TVWS channel response from the TVWS database 2304 may be further altered so that the SSM 628 has control over which channels its Tier 3 spectrum users utilize.

The SSM 628 may select one or more of the available channels indicated in the TVWS channel response to be used by the Tier 3 spectrum user 604c (3412) and send the information corresponding to the selected channels to the Tier 3 spectrum user 604c (3414). The Tier 3 spectrum user 604c may confirm the spectrum usage with the SSM 628 (3416), and the SSM 628 may forward the selected TVWS channel and transmit power to the TVWS database 2304 (3418). The implementations for the interface between the SSM and the geo-location database are similar to the options described with respect to the type 2 connection and are not repeated here.

The SSM 628 may manage the channels obtained from the geo-location database in terms of Tier 2 or Tier 3 spectrum. For Tier 2 spectrum, the spectrum may be assigned to users that have some guarantee of protection or allow for some predictability of the QoS for these users. Tier 3 spectrum may be entirely un-protected (e.g., the SSM 628 does not provide any additional services than what is provided by the geo-location database for incumbent protection). The SSM 628 may, therefore, provide two types of services, whereby these services may be provided from the TVWS spectrum (or potentially other spectrum outside of TVWS that the SSM 628 is managing). The two types of services may include a coexistence service via an interface with the WSD or system that requests this service and a priority service where the SSM 628 may assign spectrum in response to specific QoS requirements or protection criteria that is requested by a spectrum user.

A coexistence service may be an information service or a management service (e.g., as defined in Institute of Electrical and Electronics Engineers (IEEE) 802.19). In an information service, the SSM 628 may provide a list of channels and operational parameters as well as additional information that may help the WSD coexist with other WSDs. In a management service, the SSM 628 may itself select the channel to be used. In the case of both the management and information service, coexistence may assume that the WSD is only guaranteed that there are no conflicts that may severely impact its ability to operate, but there may be no attempt to satisfy any requirements or operation requests made by the WSD. The coexistence service may be provided for Tier 3 users of the SSM 628. A priority service may be provided for Tier 2 users of the SSM 628.

These different services may also cause differentiation of the interface between Tier 2 and Tier 3 spectrum users. For example, a Tier 2 WSD may attach certain characteristics or requirements that the spectrum should ensure (e.g., maximum guaranteed interference level or minimum guaranteed availability time), and the SSM must adhere to these requirements when it satisfies the spectrum request. A Tier 3 WSD (which may receive only the coexistence service) may request spectrum with only the guarantee that it be able to operate without harmful interference from other spectrum users. The SSM 628 may provide information about neighboring systems or channel quality and leave it to the Tier 3 WSD to decide the channel to be used. In addition, the Tier 3 spectrum user obtaining the coexistence service may not be guaranteed priority usage of the spectrum in the case where there is a shortage of spectrum.

Figure 35:
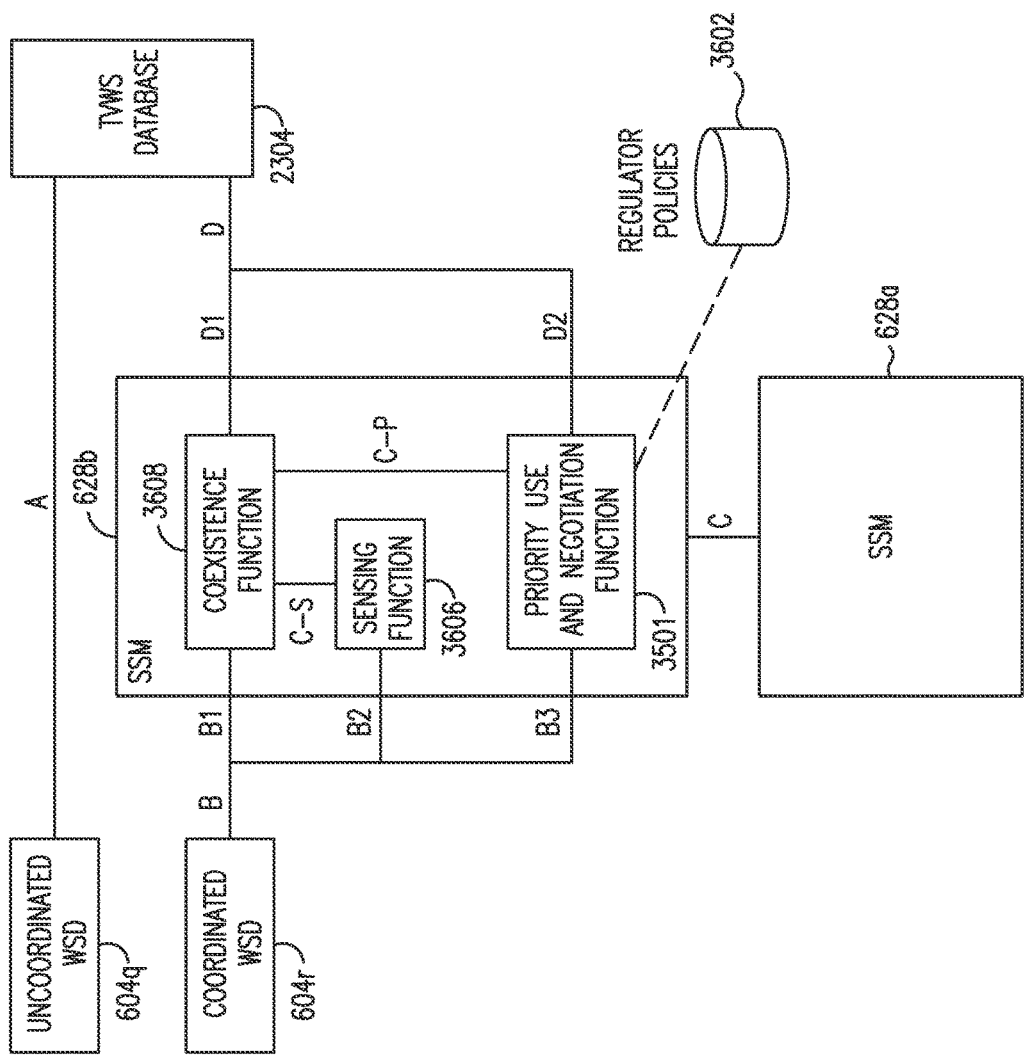
FIG. 35 is a block diagram of a logical SSM architecture derived from the example architecture illustrated in FIGS. 6A and 6B.

FIG. 35 is a block diagram 3500 of a logical SSM architecture derived from the example architecture illustrated in FIGS. 6A and 6B. In the example architecture illustrated in FIG. 35, the interface A corresponds to the classical TVWS link in FIGS. 6A and 6B. The interface D illustrated in FIG. 35 corresponds to the TVWS managerial link illustrated in FIGS. 6A and 6B. Further, the interface B illustrated in FIG. 35 corresponds to the link between WSDs and the SSM illustrated in FIGS. 6A and 6B, and the interface C is included in the architecture of FIG. 35 to account for potential communication links between different SSMs that may operate in a specific area.

The architecture illustrated in FIG. 35 includes multiple SSMs 628*a* and 628*b*. The illustrated SSM 628*b* includes a coexistence function 3608, a sensing function 3606 and a priority use and negotiation function 3501. Each of the coexistence function 3608, the sensing function 3606 and the priority use and negotiation function 3501 is in communication with a coordinated WSD 604*r* via a B interface. The coexistence function is further in communication with a TVWS database 2304 via a D interface, with the sensing function 3606 via a C-S interface and with the priority use and negotiation function via a C-P interface. The priority use and negotiation function 3501 is also in communication with the TVWS database 2304 via a D interface and may also be in communication with a regulator policies database 3602. The TVWS database 2304 is also in communication with an uncoordinated WSD 604*q*. The SSMs 628*a* and 628*b* are in communication with each other via a C interface.

The uncoordinated WSD 604*q* may be a WSD as defined in FCC/PAWS/OFCOM (e.g., a master WSD that may contact the TVWS database 2304). The coordinated WSD 604*r* may be an enhanced WSD that is able to communicate with the SSM 628 through the interface B. In an embodiment, the WSD 604*r* may communicate with the SSM 628 to obtain white space resources from the SSM 628 that are provided by the GLDB via the interface B. The WSD 604*r* may also communicate with the SSM 628 via the interface B to obtain from the GLDB guaranteed protection for the WSD from other WTRUs that obtain white space resources directly from the GLDB.

Depending on the physical implementation and physical location of the SSM 628, the coordinated WSD 604*r* may may simply correspond to a WSD (e.g., an AP), the RRM portion of a WSD (which may contact the SSM that may be co-located with the spectrum user), or an operator's OA&M (e.g., in the case of an operator using the SSM 628 to make use of TVWS where the SSM 628 may be within the operator's network or outside of the operator's network). In an embodiment, a WSD or other spectrum user may be operable as a coordinated and an uncoordinated WSD or spectrum user in different modes (e.g., a coordinated mode and an uncoordinated mode, respectively. Such a WSD may have circuitry configured to establish both the A interface (or link) and the B interface (or link).

In the example illustrated in FIG. 35, the SSM 628 includes three logical functions: the coexistence function 3608, the sensing function 3606 and the priority use and negotiation function 3501. The coexistence function 3608 may be the main engine that assures proper operation between different WSDs that use the TVWS. To do so, it may use the best-case operation parameters obtained from the TVWS database 2304 (e.g., available channels and maximum power) and modify these parameters to further allow different WSDs connected to the SSM 628 to operate properly (e.g., either on the same channel or adjacent channels). The coexistence function 3608 may provide an information service (e.g., where the WSD is given a list of available channels and information about other WSDs operating in the area) and a management service.

The sensing function 3606 may be responsible for configuring sensing and/or measurements in the coordinated WSD 604*r* and collecting and processing these measurements. The measurements may be used by the coexistence function 3608 to further define the allowable channels to be used by the coordinated WSD 604*r*. Such measurements may be used for determining the presence of other WSDs (which may or may not be managed by the SSM 628) or interference from Tier 1 spectrum users such as DTV.

The priority usage and negotiation function 3501 may allow a coordinated WSD 604*r* to reserve channels for priority (Tier 2) access and provide all functionality related to negotiation between different WSDs that may request priority access for periods of time. Such negotiation may include auctions managed by the SSM 628 for TVWS channels, pricing set through administration, or assignment of priority use channels by specific WSDs that may also be allowed to do so based on regulator policies. The priority usage and negotiation function 3501 may, therefore, have inputs from regulator policies, as shown. Although not shown in FIG. 35, the priority usage and negotiation function may also be part of the coexistence function 3608.

The B1 interface may be used by the WSD 604*r* to request operating channels on the TVWS. The WSD 604*r* may provide its device parameters (e.g., RAT, operating range, or antenna height) through this interface. It may also provide supplemental information related to the RAT (e.g., BS cell ID, scrambling code, or AP channel) that allows the SSM 628 to ensure coexistence between different WSDs. The WSD 604*r* may then be provided with a potential set of channels and coexistence information (e.g., information about neighboring systems that may result in coexistence issues) in the case of the information service or a specific selection for the channel and operating parameters to use in the case of the management service. This may allow the WSD 604*r* to be properly configured/reconfigured by the SSM 628 in order to operate in such a way so as to coexist with other users.

The B2 interface may be used by the sensing function 3606 in the SSM 628*b* to configure appropriate sensing to detect the presence of other WSDs or DTV systems and their operating power levels. Such information may be used by the coexistence function 3608 to provide further coexistence functionality (e.g., avoidance of interference from a DTV).

The B3 interface may be used by the WSD 604*r* to obtain priority usage channels from the SSM 628*b* and to interact with the priority usage and negotiation function 3501 to perform all signaling related to auctions, pricing, authentication of users that are allowed to apply for priority usage, etc.

The D1 interface may be used by the coexistence function 3608 to obtain the available TVWS channels and allowable transmit power for a spectrum user from the TVWS database 2304. This interface may be similar or identical to interface A. The D2 interface may be used to provide the protection criteria of spectrum users using priority usage channels (e.g., the Tier 2 spectrum users) to the TVWS database 2304 so that the TVWS database 2304 may ensure protection of such spectrum users from devices that access the TVWS through the interface A.

The C interface may be used to allow communication between different SSMs (e.g., SSMs 628A and 628B) that may be managing the TVWS in the same or neighboring areas. A related interface between the functions may also exist across this interface. In other words, the coexistence functions in neighboring SSMs may exchange coexistence information to ensure that WSDs managed by one SSM do not create coexistence problems with WSDs managed by the other SSM. The sensing functions may also exchange information to obtain knowledge of interference obtained through sensing devices that are registered to another SSM. The priority usage and negotiation functions may exchange information to coordinate or agree on the channels that may be reserved by each neighboring SSM as priority usage channels for WSDs under the control of each SSM.

The C-S interface may be used by the coexistence function 3608 to obtain additional information through sensing that may help the coexistence function in making decisions for the channels to be assigned or provided to the different WSDs. Based on the current usage of channels by the different WSDs, the coexistence function 3608 may request additional information to be obtained via sensing from the sensing function 3606.

The C-P interface may be used by the coexistence function 3608 to ensure that WSDs that operate using the SSM 638*b* without the use of priority channels respect the protection criteria of the Tier 2 spectrum users. In the case where such protection is offered simply by interface D2, this interface may have reduced functionality or may not exist at all. Alternatively, the priority usage and negotiation function 3501 may reside within the coexistence function 3608 itself.

The logical architecture illustrated in FIG. 35 may be used to define a physical architecture tailored to different applications, depending on the location of each of the functions. For example, in the case of a deployment such as LSA or similar, where an operator wishes to reserve spectrum for its network, the priority use and negotiation function 3501 may be physically located at the TVWS database 2304 and may be responsible for reserving a set of channels for each operator. Each operator may then have its own coexistence function 3608 and sensing function 3606 that may be co-located with the logical coordinated WSD 604*r* (which, in an embodiment, may be located at a BS or at the OA&M) to provide coexistence within each operator's network. Depending on how the spectrum was split between the operators by the priority usage and negotiation function 3501, the interface C may not be used in this scenario. Alternatively, the entire SSM 628 may be co-located with the operator OA&M, in which case the interface C may be used to exchange coexistence information between the operator OA&Ms as well as to allow negotiation between the operators that may have access to priority usage channels.

In embodiments described herein, the SSM 628 is a central entity responsible for spectrum coordination among multiple cognitive radio systems (CRSs) using multi-tiered shared spectrum in a neighborhood. These CRSs may be operated by a single operator or by multiple operators. The SSM 628 may interface directly with a Tier 1 spectrum user database to access information such as channels that are occupied by the incumbent spectrum users, channels that are available for Tier 2 and Tier 3 use and any regulatory restrictions that may apply. In an embodiment, the Tier 1 database may be the TVWS database 2304 or any other database that may store usage and protection information regarding a primary spectrum user that has priority access to the spectrum. The SSM 628 may also directly interface with the CRSs (e.g., master WSDs within the CRSs) to receive requests regarding channels available for use, respond to the CRS with a list of available channels, receive sensing related measurements on channels from CRSs that support sensing, etc. Each CRS may be a WiFi AP, a cellular eNb, or an operator's OA&M. The SSM 628 may be an independent entity residing outside the geo-location database or may reside inside the geo-location database.

The SSM 628 may provide one or more of the following services to a CRS: a coexistence management service, a coexistence information service, a priority use service, a spectrum brokerage service or no service (e.g., just incumbent protection).

Figure 36:
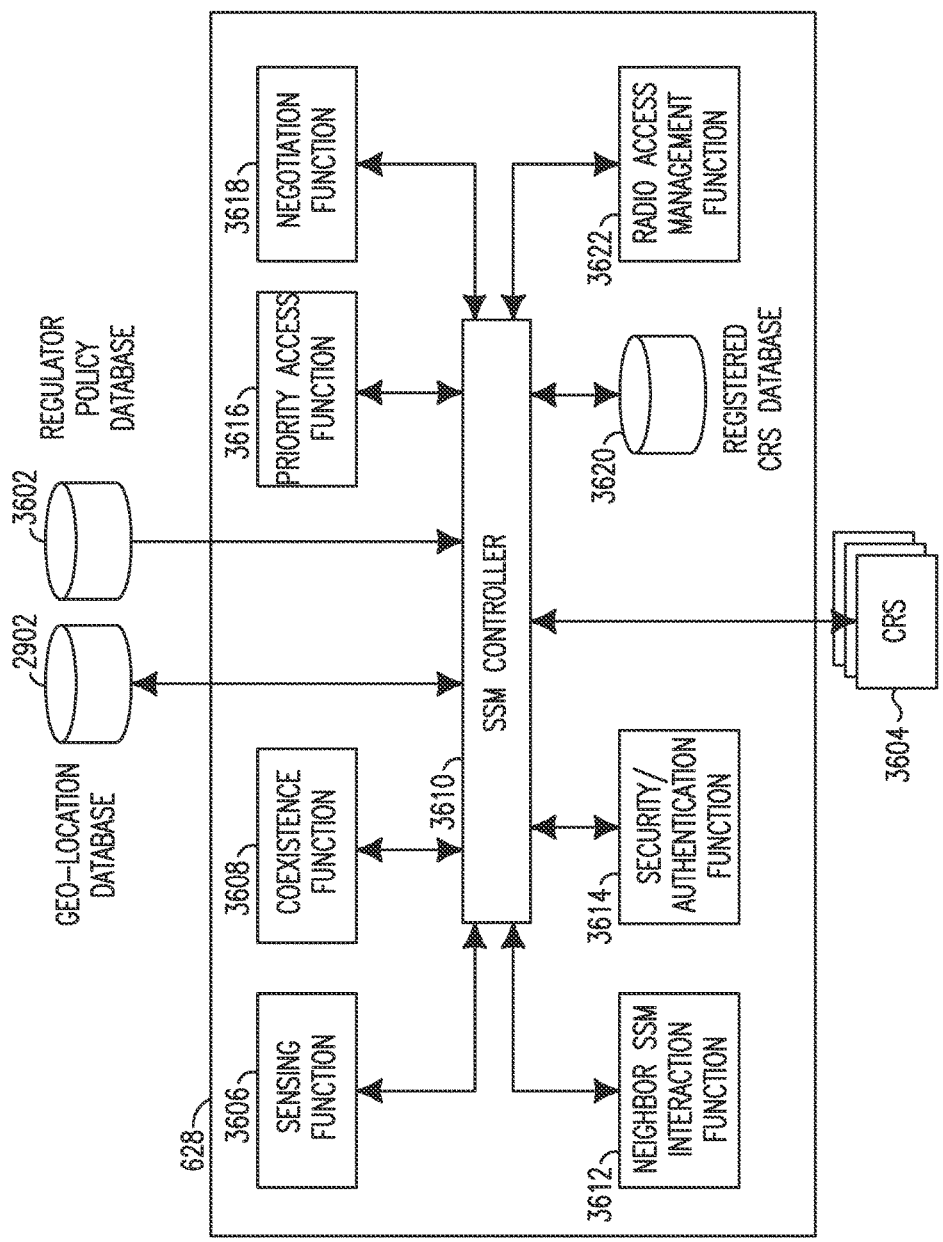
FIG. 36 is a block diagram of an example SSM architecture.

FIG. 36 is a block diagram 3600 of an example SSM architecture. In the example illustrated in FIG. 36, the SSM 628 includes an SSM controller 3610 that may act as the controlling function for the SSM 628. A responsibility of the SSM controller 3610 may be to externally interface with the CRSs (e.g., one or more CRSs 3604), the geo-location database 2902 and the regulator's policy database 3602 and internally interface with the different functions within the SSM 628, such as the sensing function 3606, the coexistence function 3608, the priority access function 3616, the negotiation function 3618, the neighbor SSM interaction function 3612, the security/authentication function 3614, and radio access management function 3622. In an embodiment, the regulator's policy database 3602 may reside within the SSM 628 and include information about the regulator's policies.

The coexistence function 3608 may be responsible for ensuring coexistence among CRSs 3604 using the same channel and adjacent channels. In other words, the coexistence function 3608 may ensure coexistence among Tier 2 and Tier 3 CRSs 3604 by minimizing or avoiding co-channel and adjacent channel interference. It may ensure that each CRS 3604 cooperates with its neighbours and causes minimum or no interference to the others in the neighborhood. The coexistence function 3608 may determine the availability of the channels using information obtained from the geo-location database 2902 and supplemental information obtained from the sensing function 3606 or collected from the spectrum users (e.g., measurements from master WSDs, interdependencies of nodes such as APs, expected or measured interference between nodes, or RATs used). An example of coexistence among CRSs 3604 in a neighborhood using the same channel may be time multiplexing the usage of channels by the CRSs 3604. In such a case, the coexistence function 3608 may provide the time schedule of operation to each CRS 3604 to avoid co-channel interference.

The priority access function 3616 may be responsible for reserving a set of channels in a shared spectrum band for exclusive or priority use by a CRS 3604. The assignment of each channel for priority use may be done on a short-term basis, such as a few seconds/minutes in a day, or on a medium-term basis, such as a few days or hours in a week, where a continuous block of time of a specified duration is reserved for exclusive access by a specific CRS 3604. When any channel is assigned for priority use to a CRS 3604, that CRS 3604 may expect a clean, interference-free channel that may be as good as having a licensed channel. The priority access function 3616 may need to know the QoS requirements of the CRS 3604 that requests priority access.

The negotiation function 3618 may be responsible for negotiating between the SSM 628 and any CRS 3604. The master WSD may be expected to negotiate on behalf of the CRS 3604, but slave WSDs may also be negotiators where each slave WSD negotiates with the SSM 628 to acquire channel(s) for itself. As an example, the negotiation function in the SSM 628 may auction a specific channel reserved for priority/exclusive access to CRSs 3604 in a neighborhood. Multiple CRSs 3604 in the neighborhood may simultaneously negotiate with the SSM 628 for a specific channel reserved for priority/exclusive access.

The neighbor SSM interaction function 3612 may be responsible for interacting with other third party SSMs 628 responsible for spectrum coordination within a CRS neighborhood in order to ensure coexistence. This may be especially useful when certain channels are allocated for priority use by one SSM 628 in a neighborhood while those channels are not allocated for priority use by the neighbor SSM 628 in the same CRS neighborhood.

The sensing function 3606 may control the sensing operation to be performed by spectrum users under the control of the SSM 628 and may collect this information from each of the spectrum users. This information may include relevant information related to the primary spectrum user(s) and/or other secondary CRSs detected by sensing or measurements in each shared spectrum band, its operating channels/frequencies, operating bandwidths, time and duration when the incumbent/other secondary CRS is ON (or OFF), maximum transmit power limit for any CRS operating on a secondary basis in this band, minimum sensitivity requirement for sensing only devices, evacuation time for CRSs when the incumbent/secondary CRS comes back to access the channel, etc. Information from the sensing function 3606 may be used by the coexistence function 3608 to further select channels for operation by WSDs.

The security/authentication function 3614 may be responsible for performing the security and authentication procedures between the SSM 628 and each CRS 3604 when a new CRS 3604 registers with the SSM 628 and stores all security keys/passwords specific to the CRS 3604. It may also perform security/authentication procedures when a CRS 3604 that is already registered with the SSM 628 returns to use services of the SSM 628. In such a case, the security/authentication function 3614 may access the stored keys/passwords associated with that CRS's ID and perform an authentication procedure before authorizing access to SSM 628.

The radio access management function 3622 may be responsible for managing radio access types used by the CRS 3604 (e.g., LTE, WiFi, or HSPA). It may also be responsible for allocating direction of communication between master and slave WSDs (e.g., uplink only, downlink only, TDD, or FDD).

The registered CRS database 3620 may store the information regarding all CRSs 3604 that are registered with the SSM 628. The information stored in the registered CRS database 3620 may be the device ID of the master WSD only, device IDs of all WSDs (master or slave), or the CRS ID (which may in turn identify all WSDs within the CRS 3604). The registered CRS database 3620 may also store device capabilities (e.g., RF capability, number of antennas, or RAT capability).

Figure 37A:
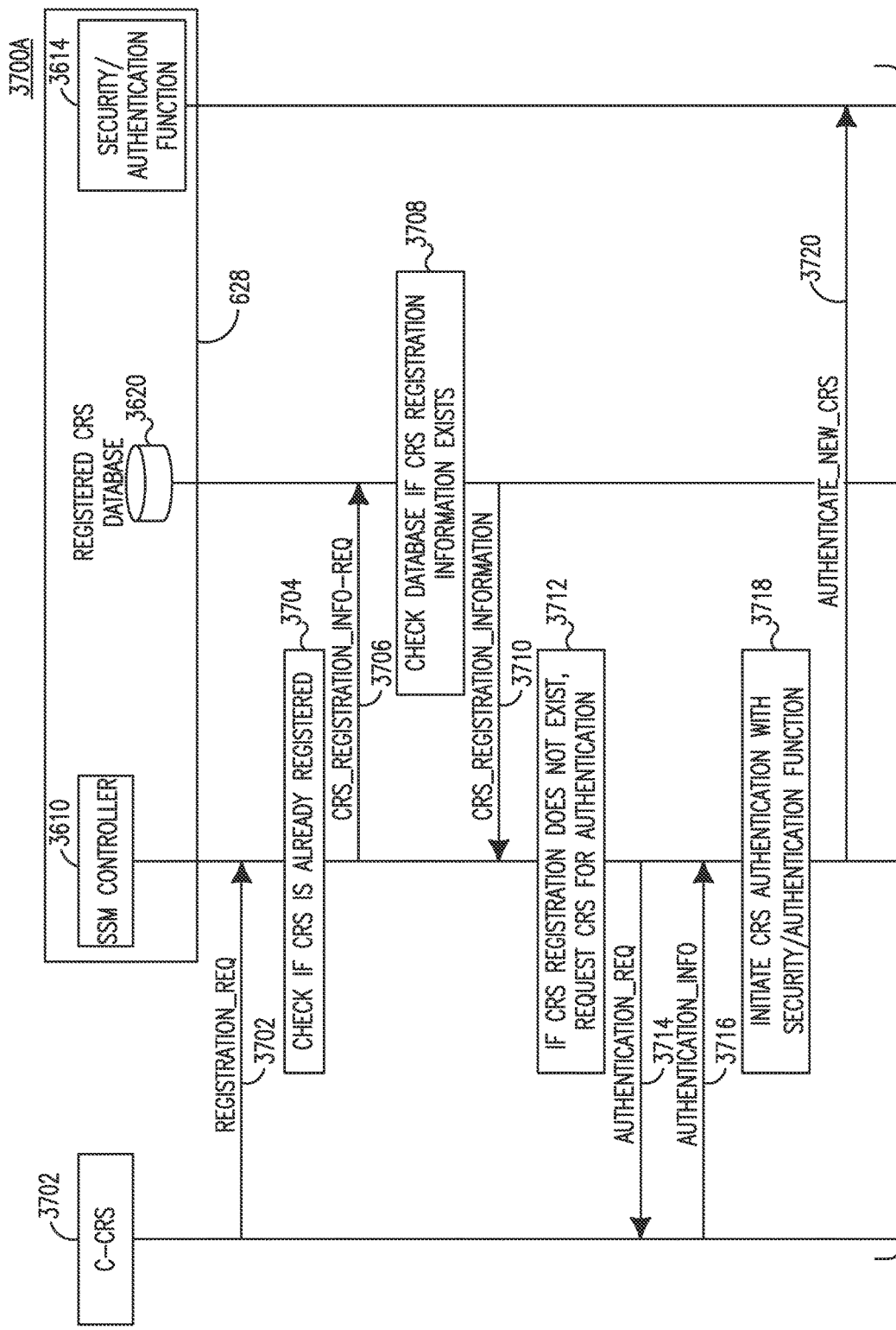
FIGS. 37A and 37B are a flow diagram of a new CRS registration procedure.
Figure 37B:
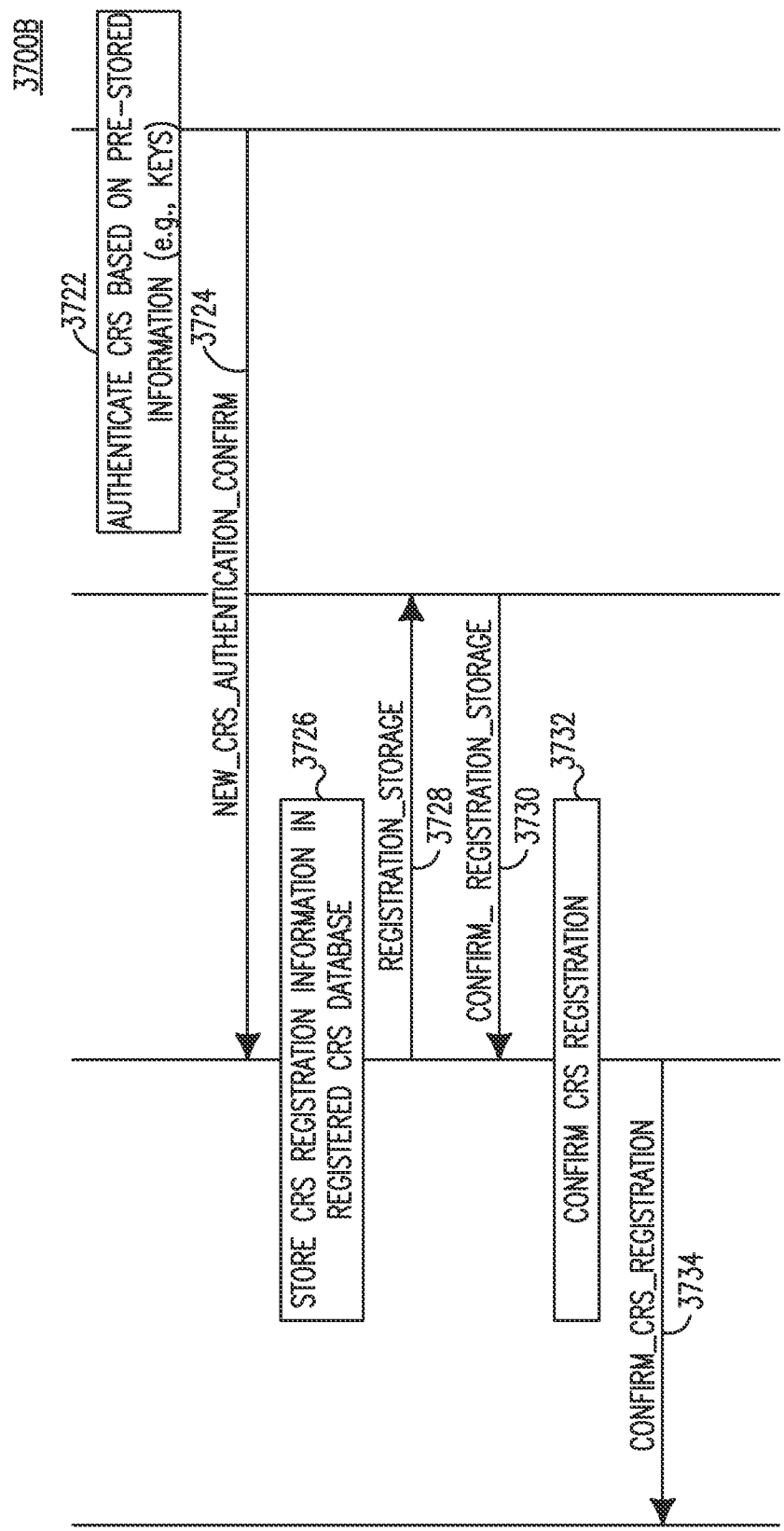

FIGS. 37A and B are a flow diagram 3700a/3700b of a new CRS registration procedure. In the example illustrated in FIGS. 37A and 37B, a new coordinated CRS (C-CRS) 3702 (e.g., a CRS or WSD that uses the services of the SSM 628 when operating in the TVWS) wants to register with an SSM 628 and initiates a Registration_Req signal to the SSM 628 to request registration (3702). The Registration_Req signal may include information such as a C-CRS ID (in some cases, this may be the same as the master WSD ID), geo-location information and capabilities information (e.g., spectrum bands supported or number of antennas, RATs supported).

The SSM controller 3610 within the SSM 628 may act as the interface between any external entity and the entities within SSM 628. The SSM controller 3610 may receive the Registration_Req signal 3702 and check to see if the requesting C-CRS 3702 is already registered with the SSM 628 (3704). To do so, it may send a CRS_Registration_Info_Req signal to a registered CRS database 3620 within SSM 628 to request existing registration information about the C-CRS 3702 (3706). The CRS_Registration_Info_Req signal may include, at a minimum, the C-CRS ID and may also include some or all of the information included in the Registration_Req signal.

The registered CRS database 3620 may check to determine if CRS registration information exists for the requesting C-CRS 3702 (3708) and send a CRS_Registration_Information signal to the SSM controller 3610 informing it of its determination (3710).

If a registration for the C-CRS 3702 does not exist in the registered CRS database 3620, the SSM controller 3610 may initiate authentication with the CRS 3702 (3712) by sending an Authentication_Req signal to the C-CRS 3702 (3714).

The C-CRS 3702 may respond with an Authentication_Info signal including the information required to authenticate itself, such as public/private keys (3716). The SSM controller 3610 may then initiate CRS authentication with the security/authentication function 3614 within the SSM 628 (3718) by forwarding this information to the security/authentication function 3614 using the Authenticate_New_CRS signal (3720). The security/authentication function 3614 may perform the necessary procedures to authenticate the C-CRS 3702 using any pre-stored information (e.g., keys) that it may have to authenticate the C-CRS 3702 (3722) and respond to the SSM controller 3610 using the New_CRS_Authentication_Confirm signal (3724). If the CRS authentication is confirmed, the SSM controller 3610 may store the registration information of the new CRS in the registered CRS database 3620 (3726) using the Registration_Storage signal (3728). After the registered CRS database 3620 confirms storage of the information using Confirm_Registration_Storage signal (3730), the SSM controller 3610 may confirm registration of the new CRS (3732) by forwarding the registration confirmation to the C-CRS 3702 using the Confirm_CRS_Registration_signal (3734).

Figure 38A:
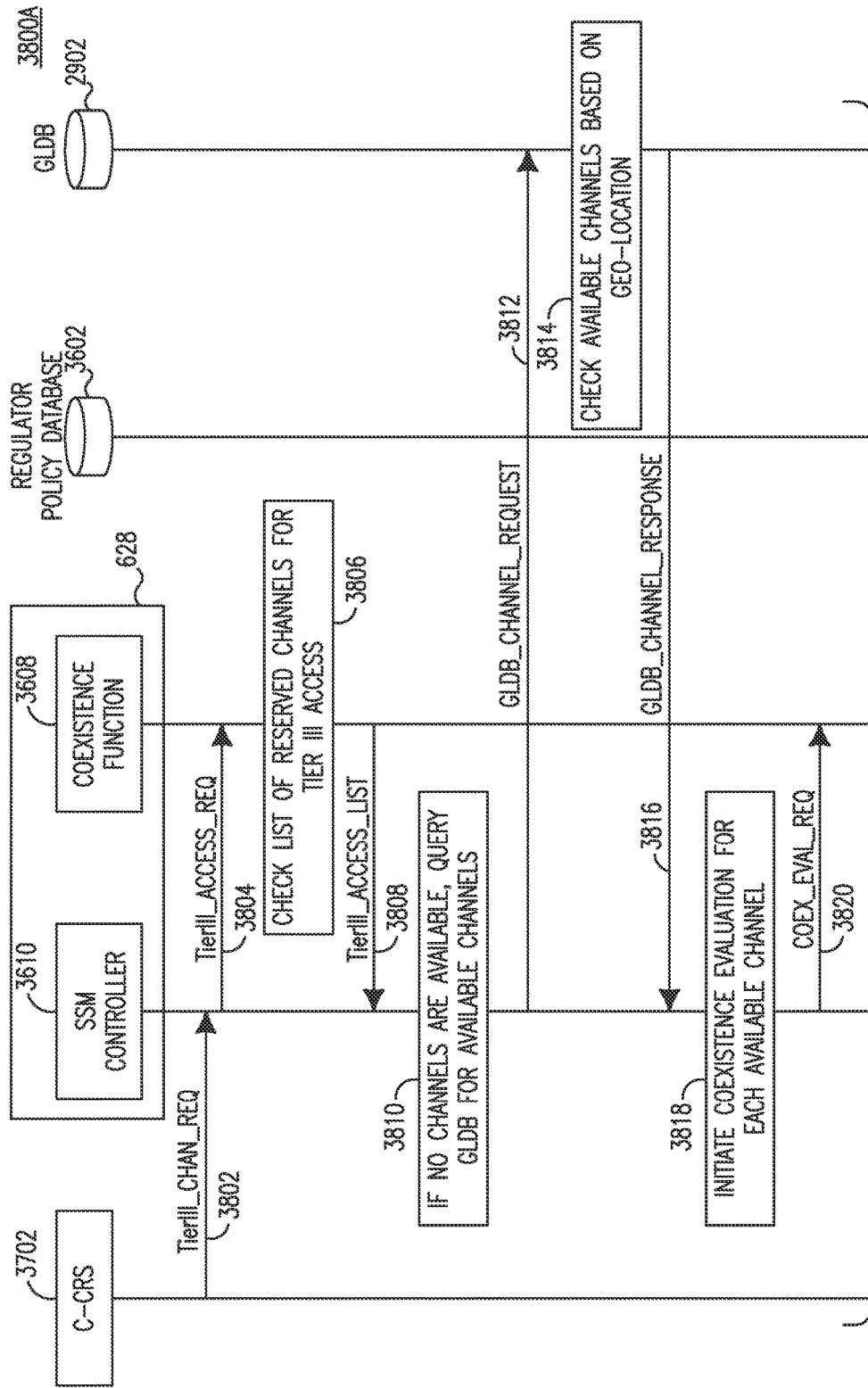
FIGS. 38A and 38B are a flow diagram of an example coexistence procedure.
Figure 38B:
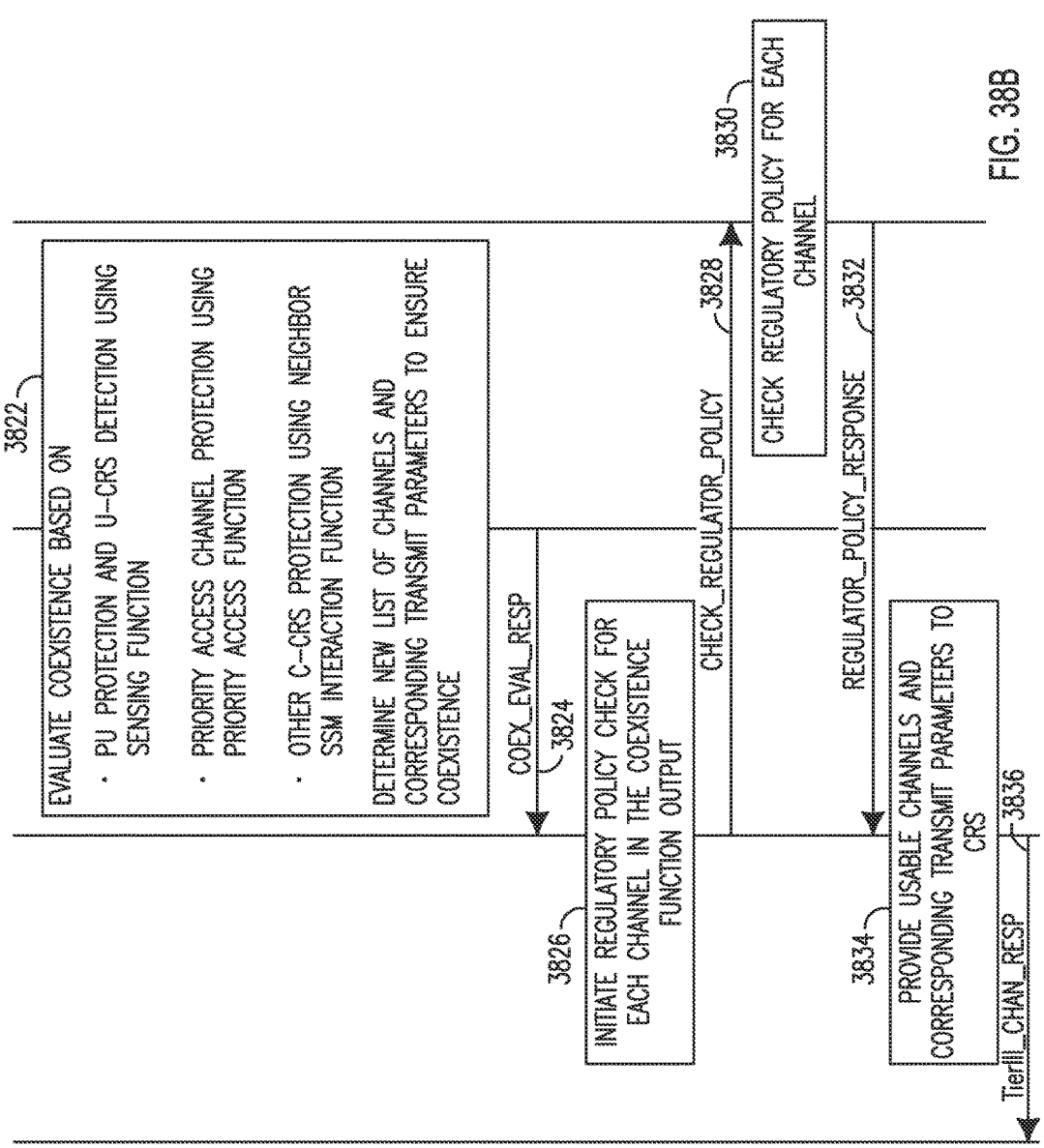

FIGS. 38A and 38B are a flow diagram 3800*a*/3800*b* of an example coexistence procedure. In the example illustrated in FIGS. 38A and 38B, a C-CRS 3702 requests a Tier 3 channel from the SSM 628 using a TierIII_Chan_Req signal (3802). In response to receiving the TierII_Chan_Req signal, the SSM controller 3610 in the SSM 628 may query the coexistence function 3608 in the SSM 628 for channels reserved for Tier 3 spectrum users using a TierIII_Access_Req signal (3804). The coexistence function 3608 may check to see if it has any channels reserved for Tier 3 access (3806) and respond to the SSM controller 3610 with a list of such channels using the TierIII_Channel_List signal or report that no channels are available (3808).

If the coexistence function 3608 reports that no channels are available, the SSM controller 3610 may query the geo-location database (GLDB) 2902 for available channels based on the CRS's geo-location (3810) using a GLDB_Channel_Request signal (3812). The GLDB may check available channels for the CRS (3814) and report a list of available channels to the SSM controller 3610 using a GLDB_Channel_Response signal (3816). The channels reported by the GLDB 2902 may be channels that are available for secondary use with no primary spectrum user occupying it at any time (e.g., secondary usage channels) or may be channels occupied by a primary spectrum user but available for secondary use when a primary spectrum user is not operating (e.g., primary user assigned channels). The channels may be expected to be identified by a binary tag to indicate which of the two categories it corresponds to.

The SSM controller 3610 may then initiate a coexistence evaluation for each available channel (e.g., provided by the GLDB) (3818) by contacting the coexistence function 3608 using a Coex_Eval_Req signal (3820). The coexistence function 3608 may evaluate each channel based on primary spectrum user protection and uncoordinated CRS (U-CRS) detection using a sensing function, priority access channel protection using a priority access function, and/or other C-CRS protection using a neighbor SSM interaction function (3822). It may then determine a new list of channels and corresponding transmit parameters to ensure coexistence among CRSs in the requesting CRS's neighborhood (3822) and report it back to the SSM controller 3610 using a Coex_Eval_Resp signal (3824).

The SSM controller 3610 may query the regulatory policy database 3602 to check polices for each channel (3826) using a Check_Regulatory_Policy signal (3828). The policy may be, for example, regarding a transmit power limit or an adjacent channel leakage. The regulatory policy database 3602 may check the regulatory policy for each channel (3830) and respond to the SSM controller 3610 with policies for each channel using a Regulatory_Policy_Response signal (3832). The SSM controller 3610 may then provide a list of usable channels and their corresponding transmit parameters to the C-CRS 3702 (3834) to ensure coexistence and regulatory policy adherence using a TierIII_Chan_Resp signal (3836).

The secondary usage channels reported by the GLDB 2902 may be channels that are shared with other CRSs. The sensing function may be expected to provide information regarding the usage pattern of other CRSs using the channel. Similarly, primary spectrum user assigned channels may be channels shared with incumbent users, and the sensing function may be expected to provide a usage pattern of the incumbent on the channel. The primary user assigned channels may or may not be shared with other CRSs.

Figure 39A:
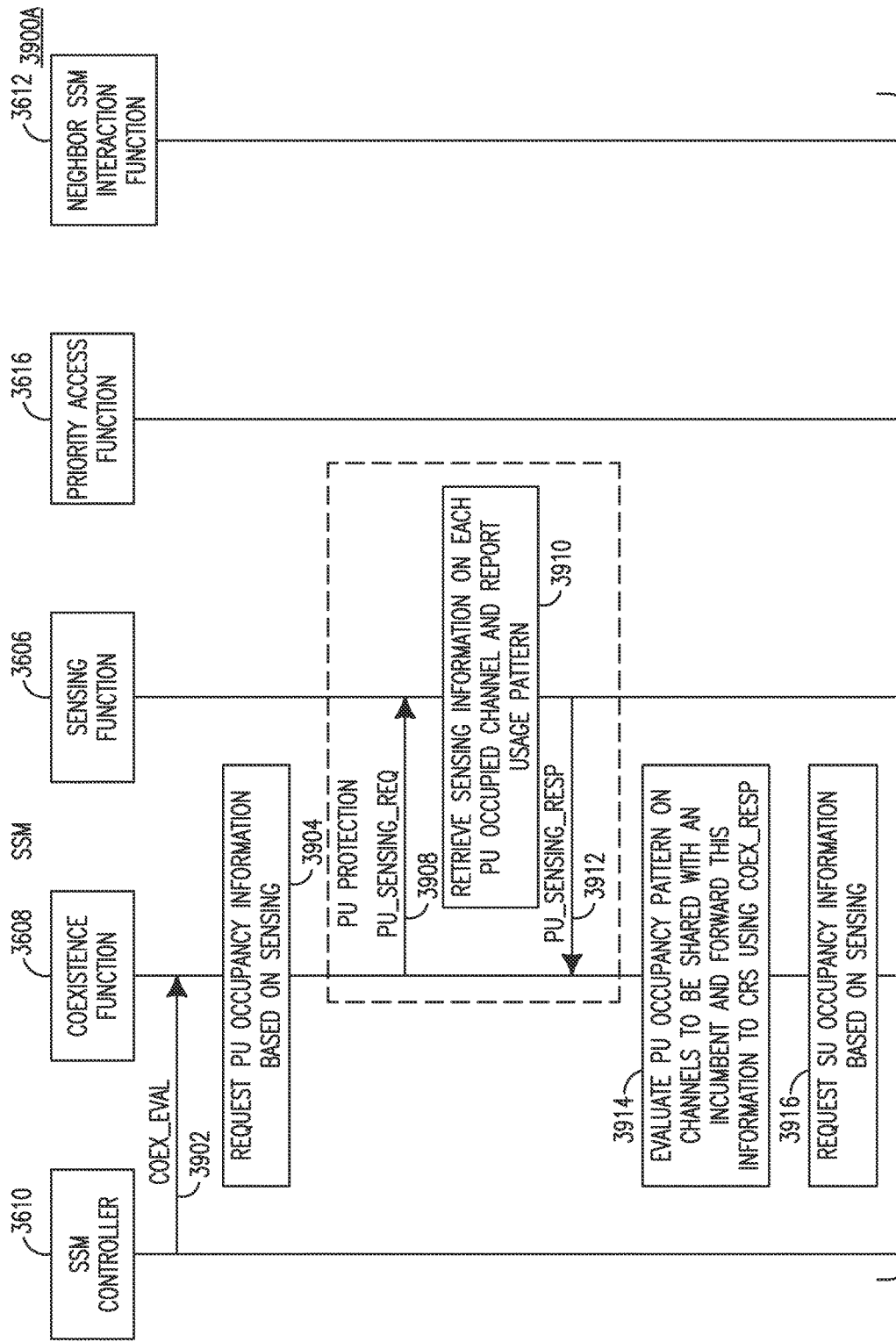
FIGS. 39A, 39B and 39C are a flow diagram of example SSM procedures to enable coexistence.
Figure 39B:
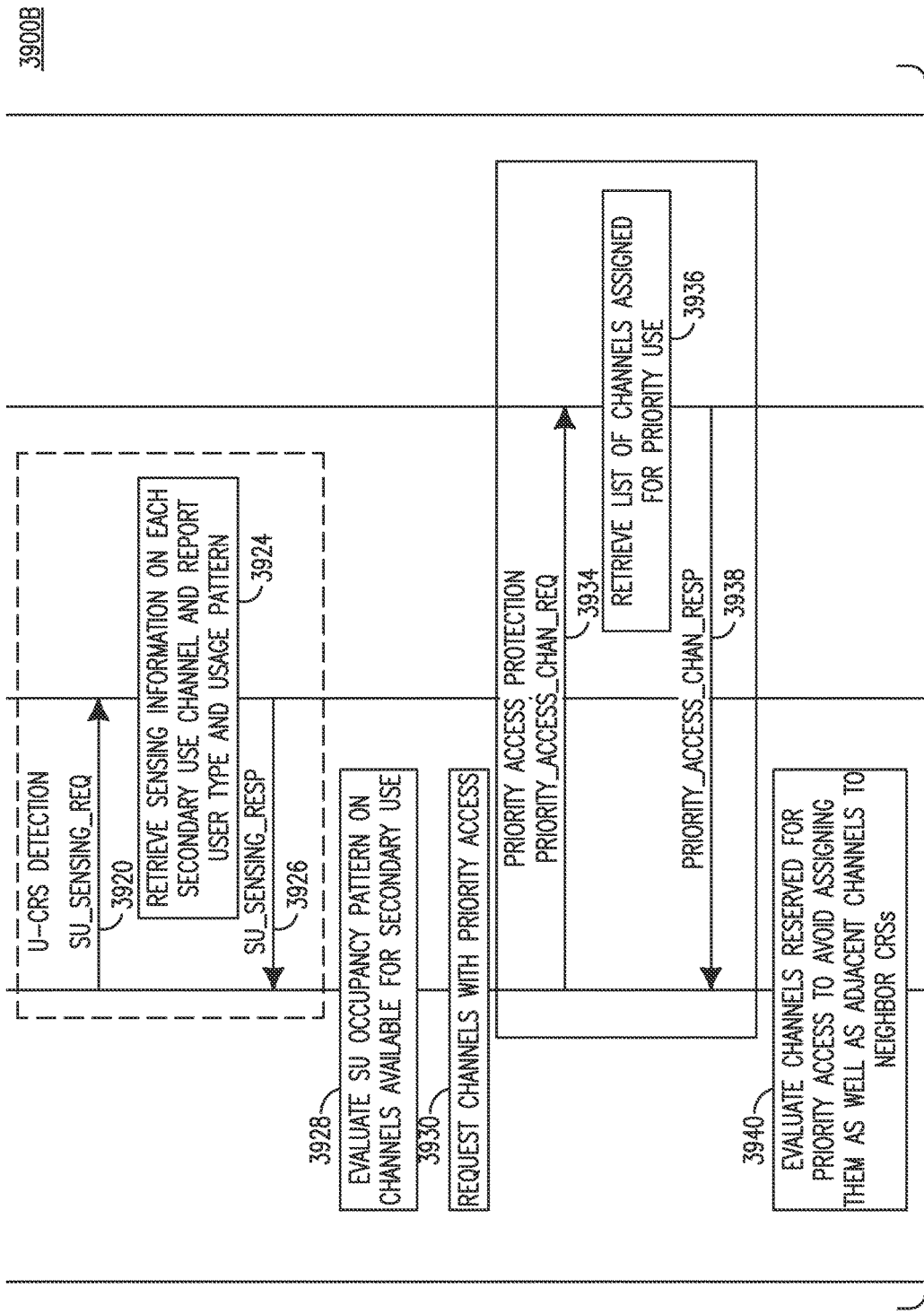
Figure 39C:
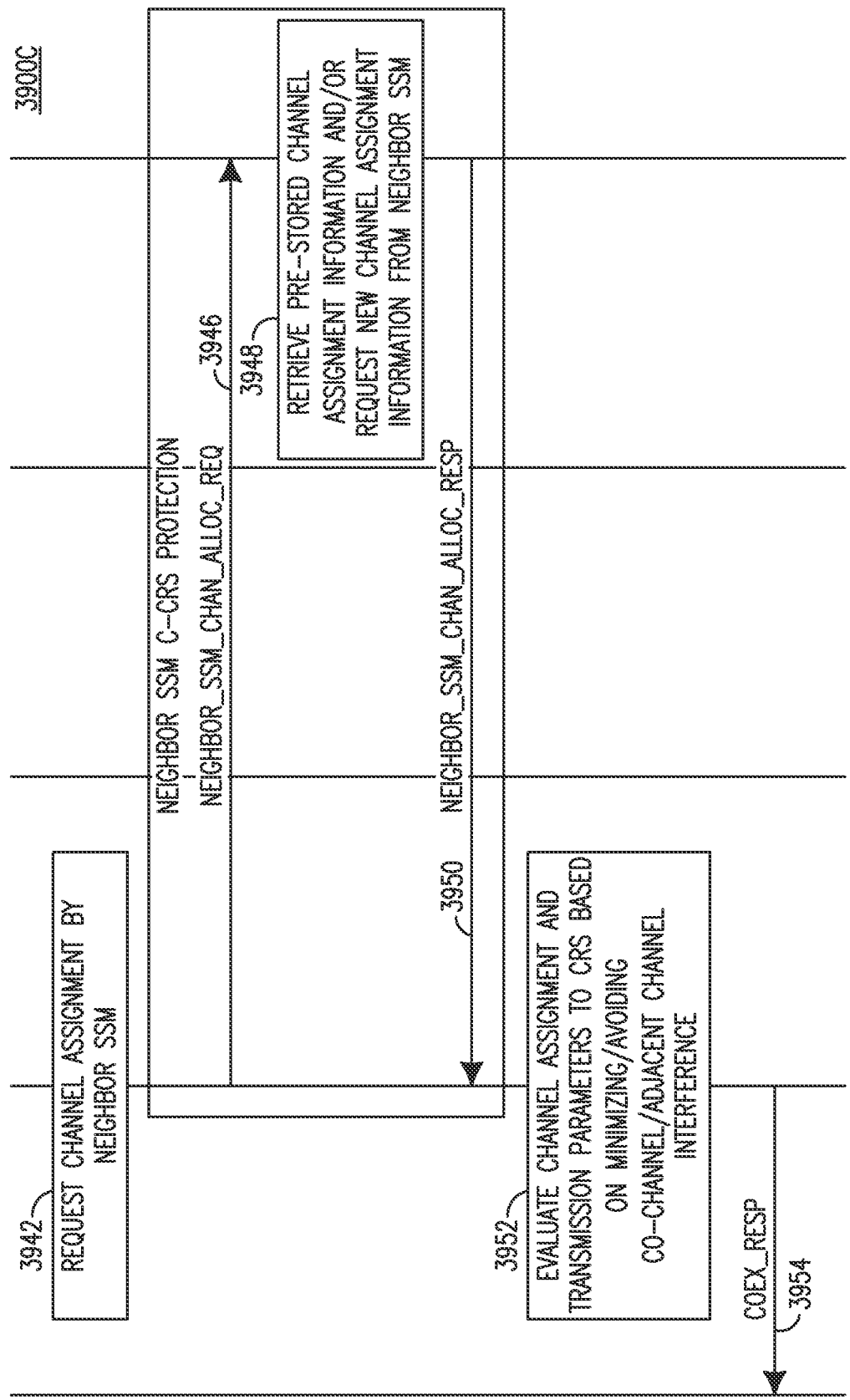

FIGS. 39A, 39B and 39C are a flow diagram 3900*a*/3900*b*/3900*c* of example SSM procedures to enable coexistence. In the example illustrated in FIGS. 39A, 39B and 39C, an SSM controller 3610 requests a coexistence evaluation from the coexistence function 3608 via a Coex_Eval signal (3902). In response to the Coex_Eval signal, the coexistence function 3608 may request primary user occupancy information based on sensing (3904) by sending a PU_Sensing_Req signal to the sensing function 3608 (3906). The sensing function 3608 may retrieve sensing information on each primary spectrum user occupied channel and report a usage pattern to the coexistence function 3608 (3910) via a PU_Sensing_Resp message (3912).

The coexistence function 3608 may evaluate the primary spectrum user occupancy pattern on the channels to be shared with an incumbent spectrum user and forward this information to the CRS using a Coex_Resp message (3914). The coexistence function 3608 may also request secondary spectrum user occupancy information based on sensing (3916) by sending an SU_Sensing_Req message to the sensing function 3606 (3920). The sensing function 3606 may retrieve sensing information regarding each secondary use channel and report a user type and usage pattern to the coexistence function 3608 (3924) via an SU_Sensing_Resp message (3926).

The coexistence function 3608 may evaluate the secondary spectrum user occupancy pattern on the channels available for secondary use (3928) and request channels with priority access (3930) by sensing a Priority_Access_Chan_Req signal to the priority access function 3616 (3934). In response to the Priority_Access_Chan_Req signal, the priority access function 3616 may retrieve a list of channels assigned for priority use (3936) and send the list to the coexistence function 3608 via a Priority_Access_Chan_Resp signal (3938).

The coexistence function 3608 may evaluate the channels reserved for priority access to avoid assigning them and adjacent channels to neighbor CRSs (3940). It may also request channel assignment by neighbor SSMs (3942) by sending a Neighbor_SSM_Chan_Alloc_Req signal to the neighbor SSM interaction function 3612 (3946). In response to the Neighbor_SSM_Chan_Alloc_Req signal, the neighbor SSM interaction function 3612 may retrieve pre-stored channel assignment information and/or request new channel assignment information from neighbor SSMs (3948) and send information about the channel assignments to the coexistence function 3608 via a Neighbor_SSM_Chan_Alloc_Resp signal (3950).

The coexistence function 3608 may evaluate channel assignment and transmission parameters for a requesting CRS based on minimizing or avoiding co-channel and/or adjacent channel interference (3952) and send a Coex_Resp signal to the SSM controller 3610 (3954) with the results of the evaluation.

Figure 40A:
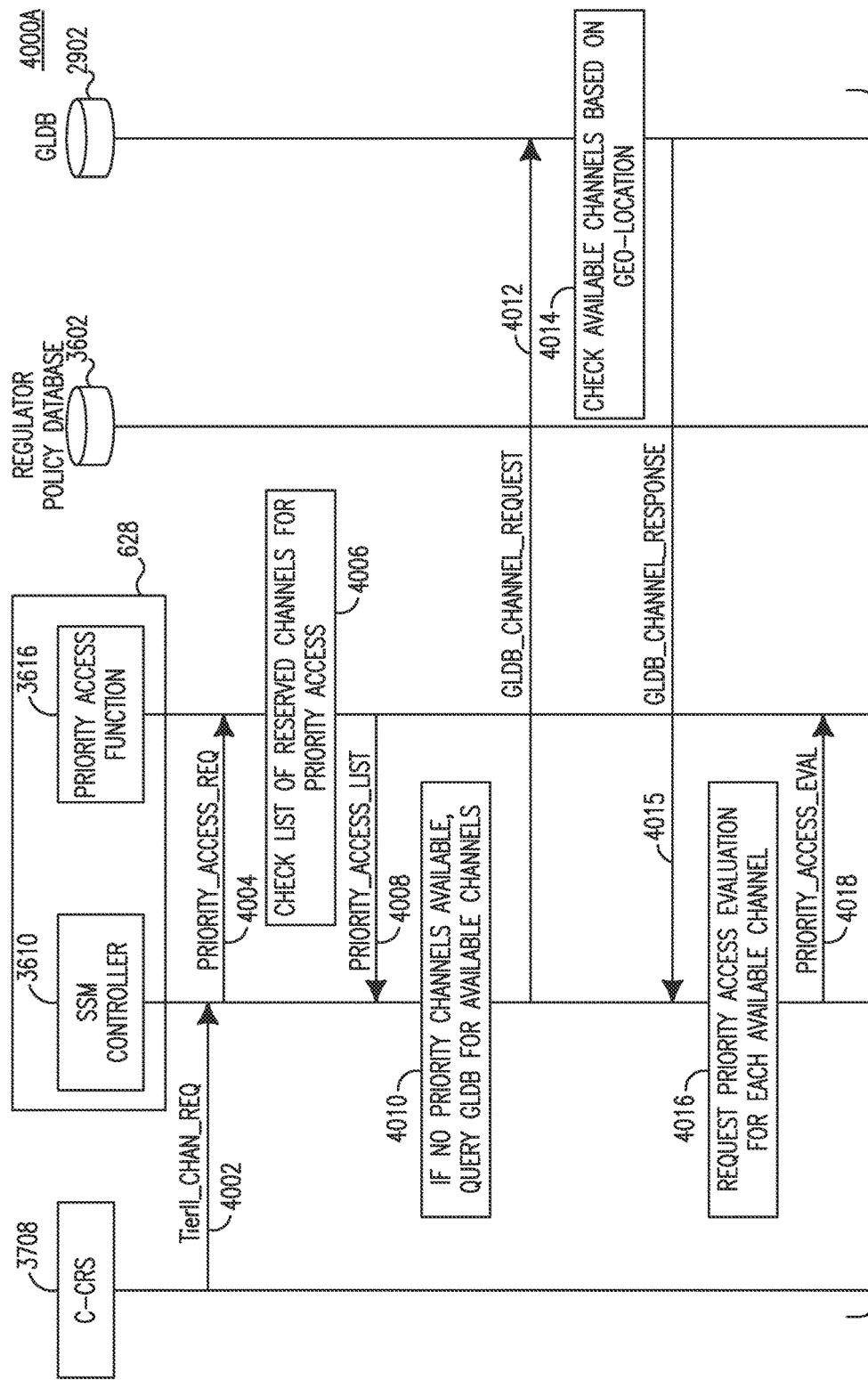
FIGS. 40A and 40B are a flow diagram of a procedure for priority access to a channel.
Figure 40B:
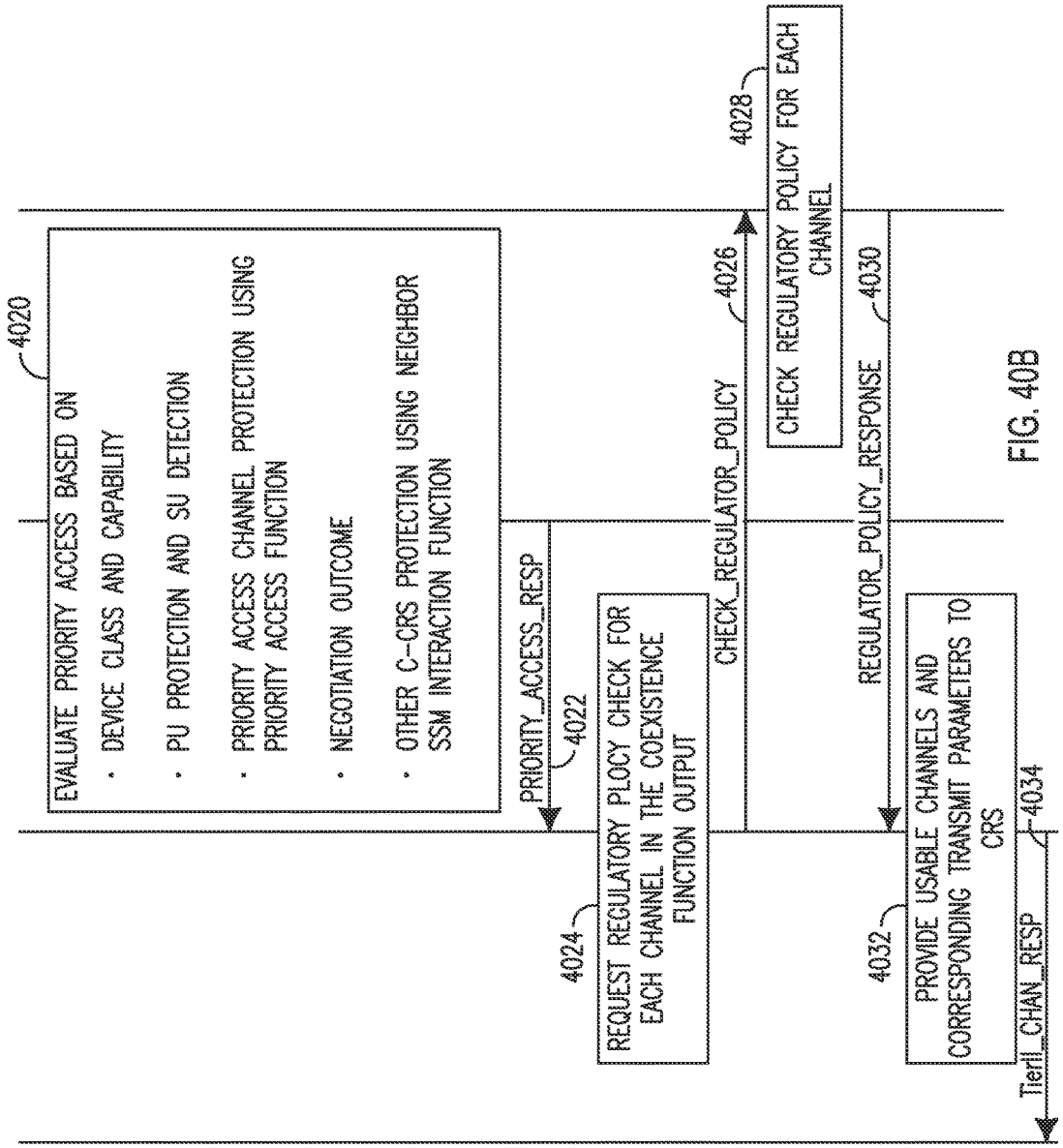

FIGS. 40A and 40B are a flow diagram 4000a/4000b of a procedure for priority access to a channel. In the example illustrated in FIGS. 40A and 40B, a C-CRS 3708 requests a Tier 2 channel from the SSM 628 using a TierII_Channel_Request signal (4002). In response to the TierII_Channel_Request signal, the SSM controller 3610 in the SSM 628 may query the priority access function 3616 in the SSM 628 for channels reserved for Tier 2 spectrum users using a Priority_Access_Req signal (4004). The priority access function 3616 may check to see if it has any channels reserved for Tier 2 access (4006) and respond to the SSM controller 3610 with a list of such channels using a Priority_Access_List signal or report that no channels are available (4008).

If the priority access function reports that no channels are available, the SSM controller 3610 may query the GLDB 2902 for available channels based on the CRS's geo-location (4010) using a GLDB_Channel_Request signal (4012). The GLDB 2902 may check available channels for the CRS (4014) and report a list of available channels to the SSM controller 3610 using a GLDB_Channel_Response signal (4015). The channels reported by the GLDB 2902 may be channels that are available for secondary use with no primary user occupying them at any time (e.g., secondary usage channels) or may be channels occupied by a primary spectrum user but available for secondary use when a primary spectrum user is not operating (e.g., primary user assigned channels). The channels may be expected to be identified by a binary tag to indicate which of the two categories they each correspond to.

The SSM controller 3610 may then initiate a priority access evaluation for each available channel (e.g., provided by the GLDB) (4016) by contacting the priority access function 3616 using a Priority_Access_Eval signal (4018). The priority access function 3616 may evaluate each channel based on, for example, device class and capability, primary spectrum user protection and uncoordinated CRS (U-CRS) detection using the sensing function, priority access channel protection using the priority access function, negotiation outcome, and/or other C-CRS protection using the neighbor SSM interaction function (4020). It may then determine a new list of channels and corresponding transmit parameters to ensure coexistence among CRSs in the requesting CRS's neighborhood (4020) and report it back to the SSM controller 3610 using a Priority_Access_Resp signal (4022).

The SSM controller 3610 may query the regulatory policy database 3602 to check polices for each channel (4024) using a Check_Regulatory_Policy signal (4026). The policy may be, for example, with regard to the transmit power limit, usage time, or adjacent channel leakage. The regulatory policy database 3602 may check for a regulatory policy for each channel (4028) and respond to the SSM controller 3610 with policies for each channel using a Regulatory_Policy_Response signal (4030). The SSM controller 3610 may then provide a list of usable channels and their corresponding transmit parameters, usage time, etc. to the C-CRS 3708 to ensure priority usage and regulatory policy adherence (4032) using a TierII_Chan_Resp signal (4034).

Figure 41B:
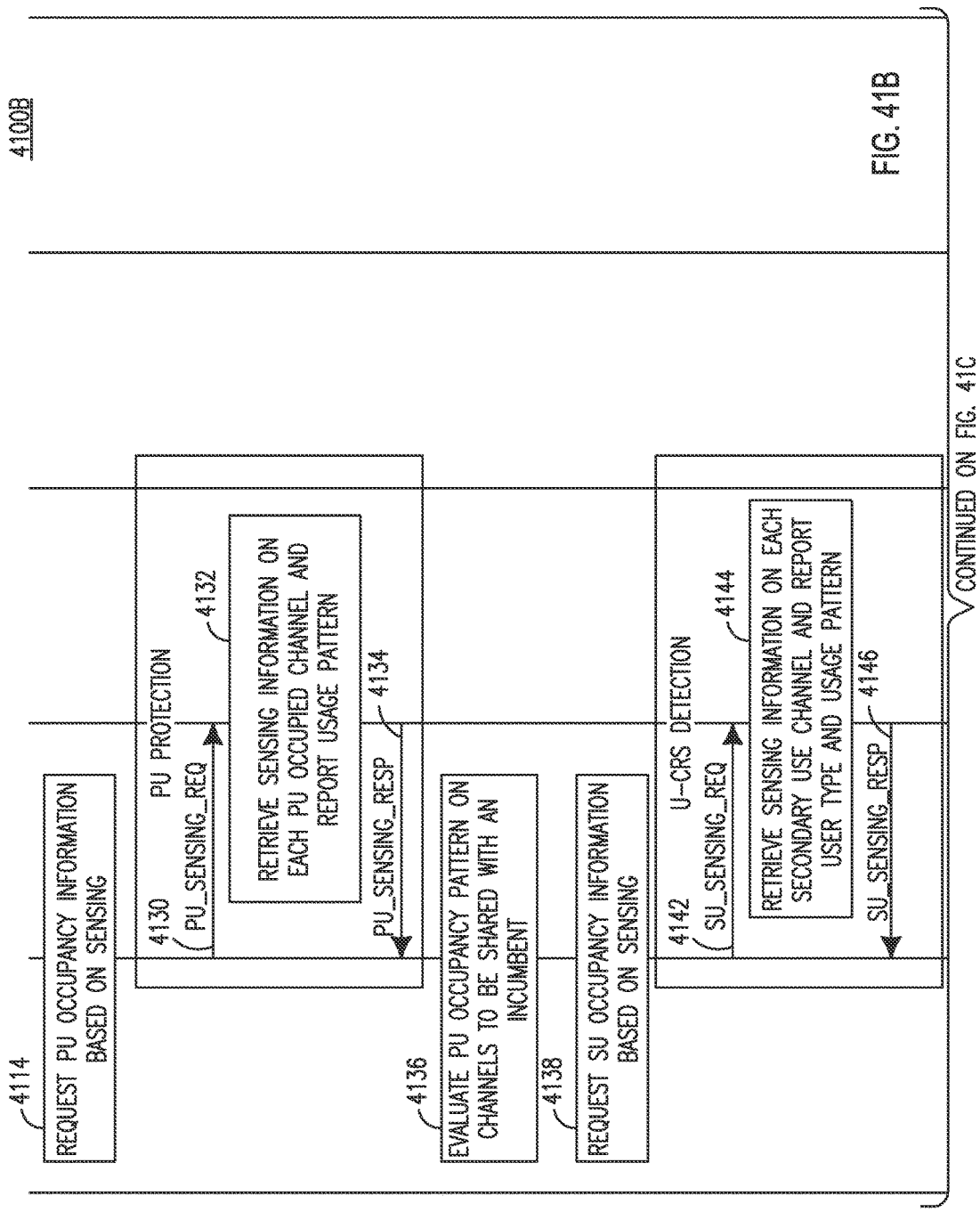
Figure 41C:
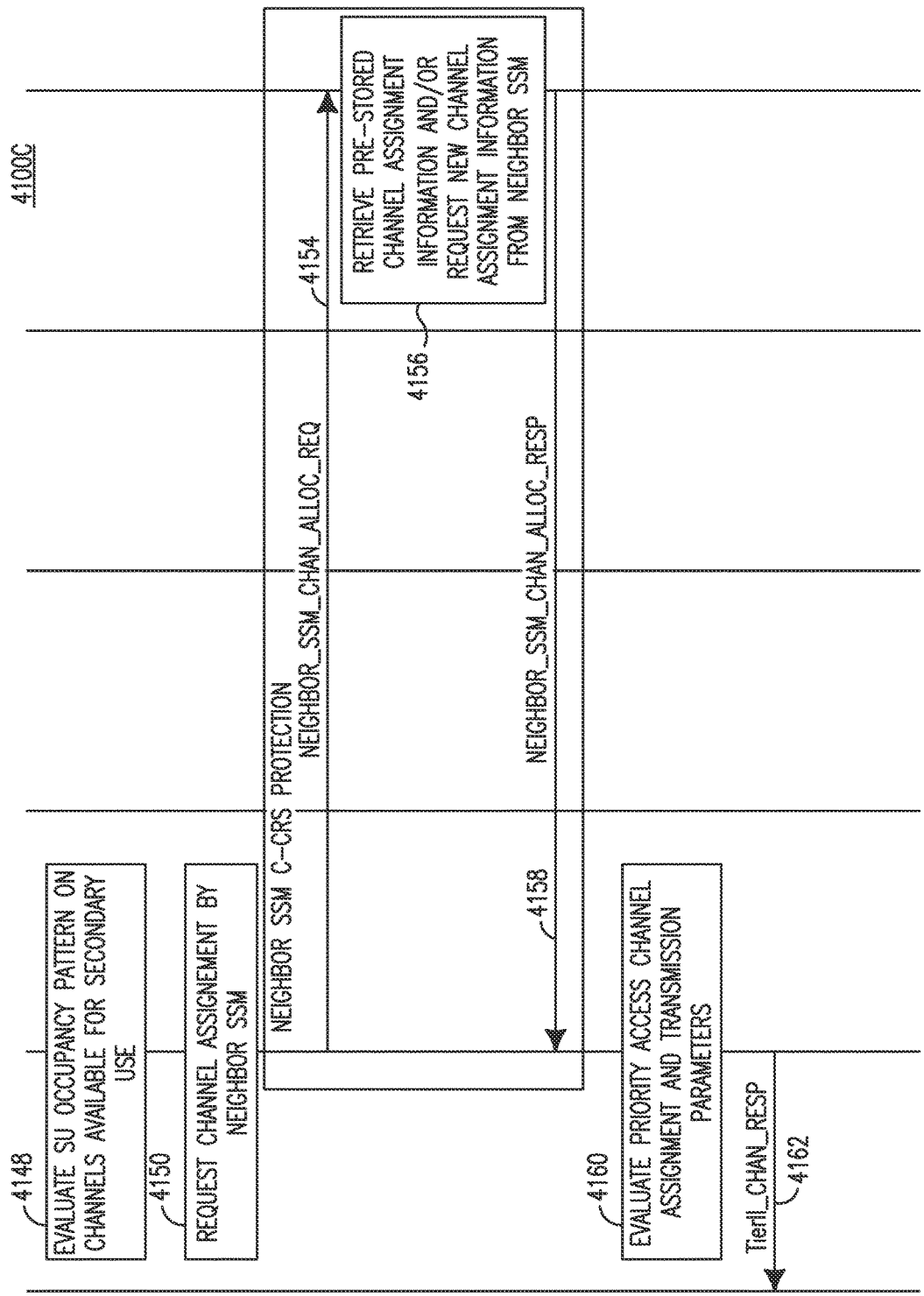

FIGS. 41A, 41B and 41C are a flow diagram 4100a/4100b/4100c of an SSM procedure for priority access. In the example illustrated in FIGS. 41A, 41B and 41C, an SSM controller 3610 makes a request for Tier 2 channels to the priority access function 3616 using a TierII_Chan_Req signal (4102). In response to the TierII_Chan_Req signal 4102, the priority access function 3616 may request priority access authorization for a WSD (4104) by sending a Check_Priority_Access Authorization message to the registered CRS database 3620 (4108). The registered CRS database 3620 may check for priority access authorization for the WSD (4110) and respond to the priority access function 3616 with a Priority_Access_Authorization Confirm signal (4112).

The priority access function 3616 may then request an outcome of a negotiation for channels by WSDs (4114) by sending a Negotiation_Outcome_Request signal to the negotiation function 3618 (4118). The negotiation function 3618 may retrieve the outcome of negotiations for channels by WSDs (4120) and send the requested negotiation outcomes to the priority access function 3616 via a Negotiation_Outcome signal (4122). The priority access function 3616 may then store any priority access information for the CRS in the registered CRS database 3620 via a Store_Priority_Access_Info signal (4124).

The priority access function 3616 may request priority spectrum user occupancy information based on sensing (4126) by sending a PU_Sensing_Req signal to the sensing function 3606 (4130). The sensing function 3606 may retrieve sensing information on each priority-spectrum-user-occupied-channel and report a usage pattern to the priority access function 3616 (4132) via a PU_Sensing_Resp signal (4134).

The priority access function 3616 may evaluate the priority spectrum user occupancy pattern on channels to be shared with an incumbent spectrum user (4136) and request secondary spectrum user occupancy information based on sensing (4138) by sending an SU_Sensing_Req signal to the sensing function 3606 (4142). The sensing function 3606 may retrieve sensing information for each secondary use channel and report a user type and usage pattern to the priority access function 3616 (4144) via an SU_Sensing_Resp signal (4146).

The priority access function 3616 may evaluate the secondary spectrum user occupancy pattern on channels available for secondary use (4148) and request channel assignments by neighbor SSMs (4150) by sending a neighbor_SSM_Chan_Alloc_Req signal to the neighbor SSM interaction function 3612 (4154). The neighbor SSM interaction function 3612 may retrieve pre-stored channel assignment information and/or request new channel assignment information from neighbor SSMs (4156) and report it to the priority access function 3616 via a Neighbor_SSM_Chan_Alloc_Resp signal (4158).

The priority access function 3616 may evaluate priority access channel assignments and transmission parameters (4160) and provide an assignment of Tier 2 channels to the SSM controller 3610 via a TierII_Chan_Resp signal (4162).

In order to assign priority channels, the SSM 628 may use the negotiation function 3618 to make channel assignments that adhere to the requirement from each C-CRS 3702 requiring priority access.

Figure 42A:
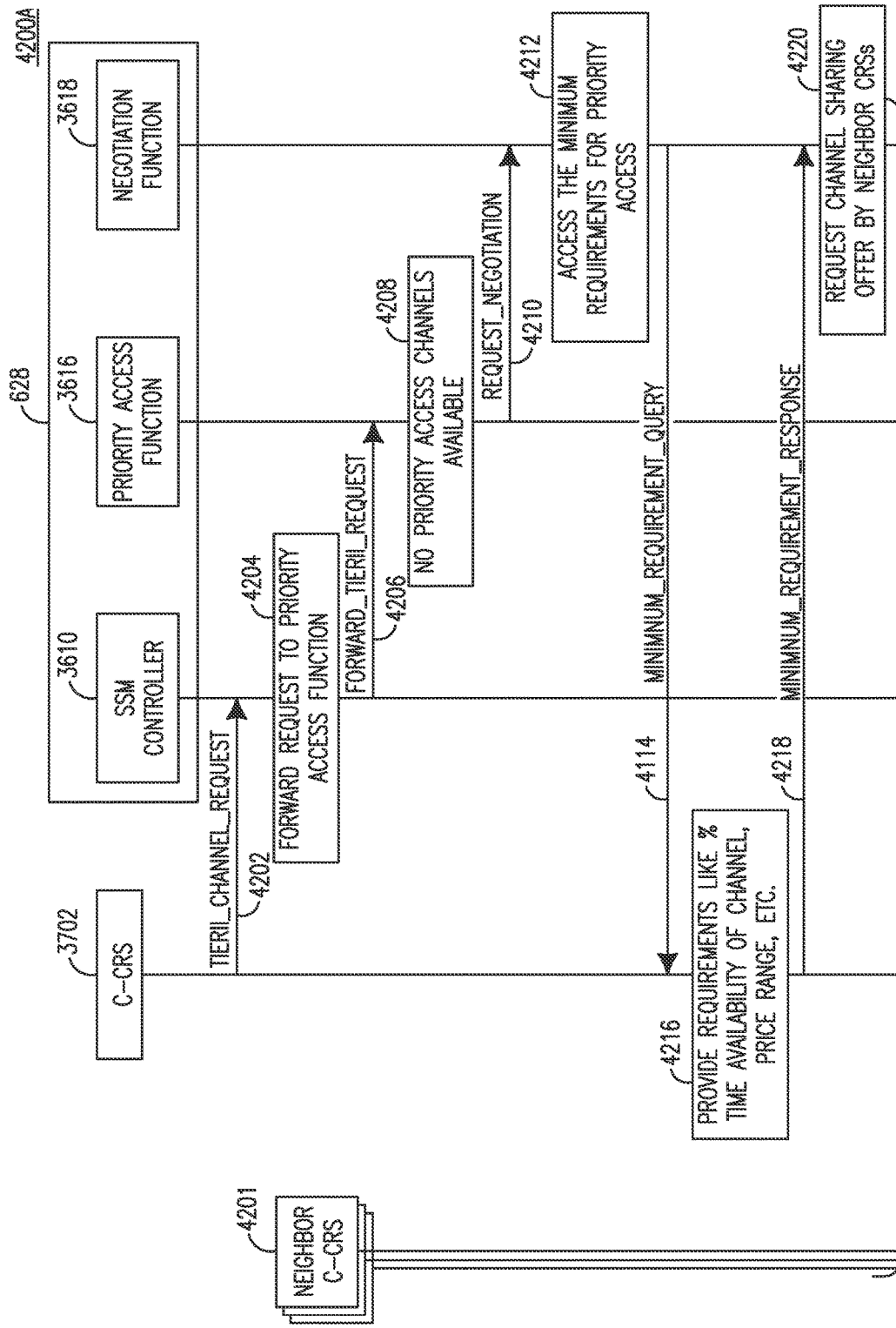
FIGS. 42A, 42B and 42C are a flow diagram of an example negotiation procedure.
Figure 42B:
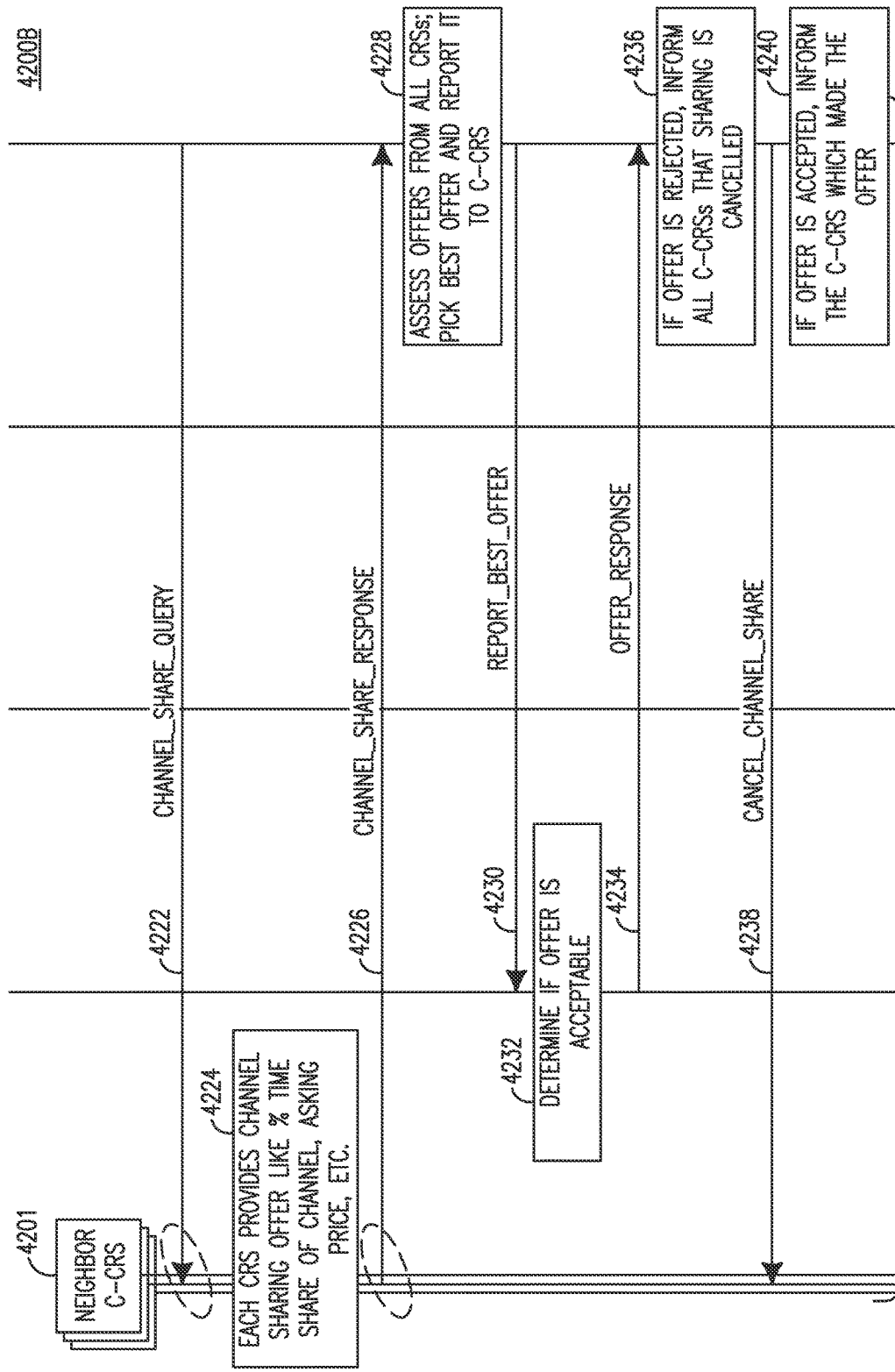
Figure 42C:
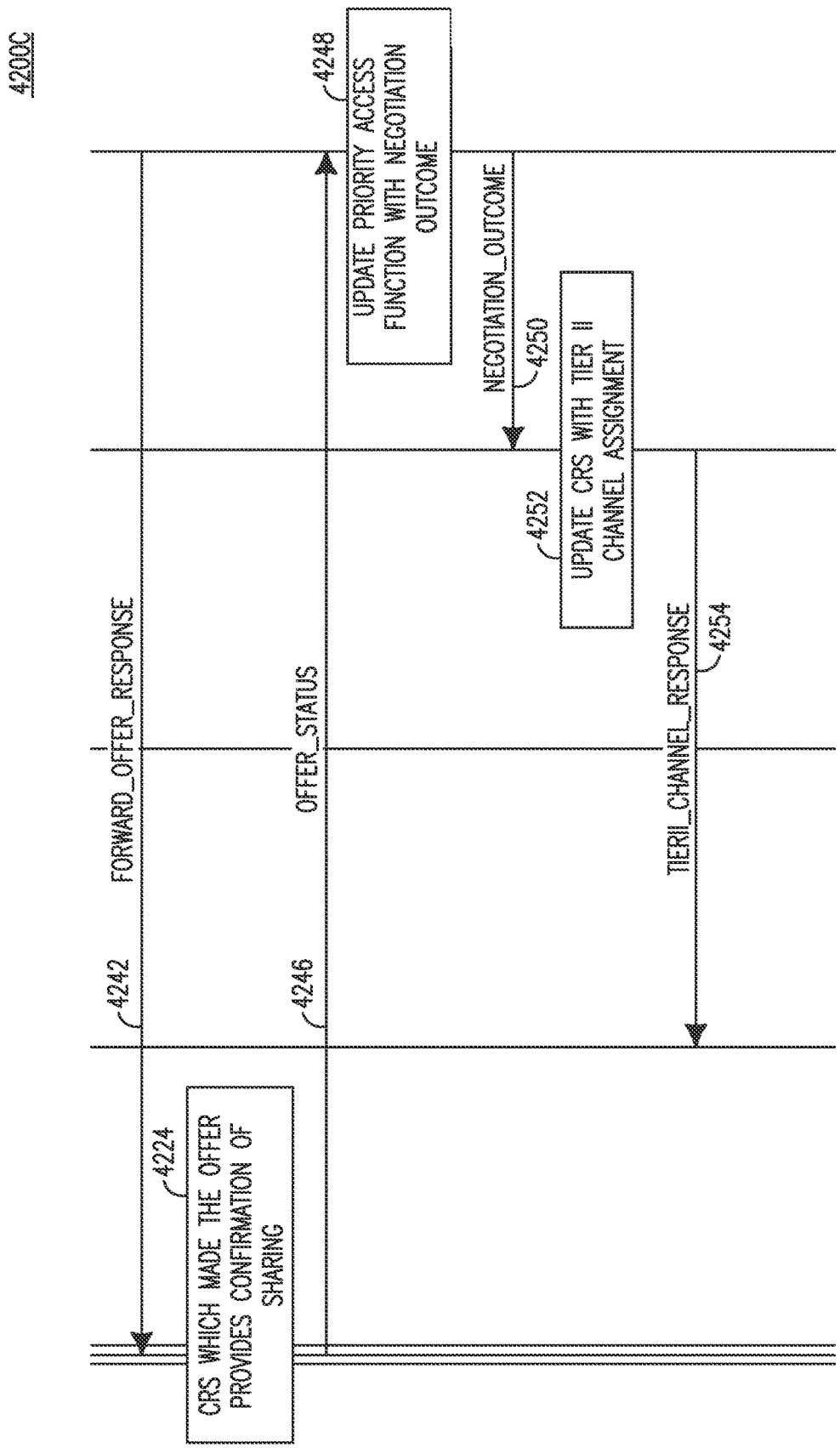

FIGS. 42A, 42B and 42C are a flow diagram 4200a/4200b/4200c of an example negotiation procedure. In the example illustrated in FIGS. 42A, 42B and 42C, the negotiation starts by the SSM collecting minimum requirements from each C-CRS 3702.

The C-CRS 3702 may first send a TierII_Channel_Request signal to the SSM 628 (4202). The SSM controller 3610 in the SSM 628 may forward the request to the priority access function 2616 (4204) via a Forward_TierII_Request (4206). On a condition that the priority access function 3616 determines that no priority access channels are available (4208), it may send a Request Negotiation signal to the negotiation function 3618 (4210).

The negotiation function 3618 may access the minimum requirements for priority access (4212) and send a Minimum_Requirement_Query to the C-CRS 3702 (4214). The C-CRS 3702 may provide its minimum requirements to the negotiation function 3618 (4216) via a Minimum_Requirement_Response signal (4218). The minimum requirements may include, for example, percentage time availability of channel and/or price range.

The negotiation function may then request a channel sharing offer by neighbor CRSs (4220) by sending a Channel_Share_Query to at least one neighbor C-CRS 4201 (4222). Each neighbor CRS 4201 may provide a channel sharing offer (e.g., percentage time share of channel and/or asking price) (4224) via a Channel_Share_Response signal (4226).

The negotiation function 3618 may assess offers from all CRSs, select the best offer and report it to the requesting C-CRS 3701 (4228) via a Report_Best_Offer signal (4230). The C-CRS 3702 may determine whether the offer is acceptable (4232) and respond to the offer by sending an Offer_Response signal to the negotiation function 3618 (4234). If the offer is rejected, the negotiation function 3618 may inform all C-CRSs that sharing is canceled (4236) by sending a Cancel_Channel_Share message to all of the C-CRSs (4238). If the offer is accepted, the negotiation function 3618 may inform the offering C-CRS (4240) via Forward_Offer_Response signal (4242). The C-CRS that made the offer may provide a confirmation of sharing (4244) and send an Offer_Status signal to the negotiation function 3618 (4246).

The negotiation function 3618 may update the priority access function 3616 with the negotiation outcome (4248) via a Negotiation_Outcome signal (4250). The priority access function 3616 may update the C-CRS 3702 with a Tier 2 channel assignment (4252) via a TierII_Channel_Response signal (4254).

Embodiments

1. A method of spectrum coordination comprising a spectrum coordinator receiving a request for shared spectrum from a cognitive radio system (CRS) that the spectrum coordinator supports, the request including at least one minimum protection requirement 2. The method of embodiment 1, further comprising the spectrum coordinator determining protection criteria for the CRS based on the at least one minimum protection requirement received from the CRS; and 3. The method of embodiment 2, further comprising the spectrum coordinator sending the protection criteria for the CRS to a geo-location database (GLDB) for use in assigning shared spectrum to other CRSs that the spectrum coordinator does not support.

4. The method of any one of embodiments 1-3, further comprising the spectrum coordinator sending a registration request to the GLDB including information about the geographic location of cognitive radio systems (CRSs) that the spectrum coordinator supports.

5. The method any one of embodiments 1-4, wherein the at least one minimum protection requirement is at least one of a minimum bandwidth, a minimum signal-to-noise ratio (SINR), or a maximum allowable interference level.

6. The method of any one of embodiments 1-5, further comprising the spectrum coordinator allocating shared spectrum to the CRS that the spectrum coordinator supports with a specific quality of service (QoS) guarantee based at least on the at least one minimum protection requirement.

7. The method of embodiment 6, further comprising the spectrum coordinator sending information about the allocated shared spectrum to the CRS along with a validity time at which the allocated spectrum will become available for use by the CRS.

8. The method of any one of embodiments 1-7, wherein the request for shared spectrum further includes at least one specific performance requirement, the at least one specific performance requirement including at least one of a required availability time, a maximum interference level or a quality of service (QoS) during the required availability time.

9. The method of embodiment 8, further comprising the spectrum coordinator sending usage parameters to the GLDB based on the at least one specific performance requirement.

10. The method of any one of embodiments 1-9, further comprising the spectrum coordinator communicating actual spectrum usage of the allocated spectrum to the GLDB, indicating to the GLDB to store and use the protection criteria.

11. The method of any one of embodiments 2-10, wherein the protection criteria are for use by the GLDB, along with the protection criteria for incumbent users, to allocate spectrum for requests by other CRSs that obtain spectrum directly from the GLDB in a manner that protects the CRSs supported by the SC from interference.

12. A wireless transmit/receive unit (WTRU) comprising a processing unit configured to communicate with a spectrum coordinator (SC) to obtain white space resources from the SC that are provided by a geo-location database (GLDB) in a first mode.

13. The WTRU of embodiment 12, wherein the processing unit is further configured to communicate directly with the GLDB to obtain the white space resources that are provided by the GLDB in a second mode.

14. The WTRU of embodiments 12 or 13, further comprising a transceiver configured to perform wireless communication using the white space resources obtained from the SC in the first mode or directly from the GLDB in the second mode.

15. The WTRU of any one of embodiments 12-14, wherein the processing unit is further configured to, in the first mode, communicate with the SC to receive a guarantee of protection from an agreed upon level of interference from other WTRUs that obtain white space resources from the SC, other WTRUs that obtain white space resources directly from the GLDB and other WTRUs that obtain white space resources from a neighbour SC.

16. The WTRU of embodiment 15, wherein the guaranteed protection for the WTRU from the agreed upon level of interference from the other WTRUs that obtain the white spaces resources from the neighbour SCis obtained via a link between the SC and the neighbour SC.

17. The WTRU of embodiment 15, wherein the processing unit is configured to communicate with the SC to obtain the white space resources from the SC that are provided by the GLDB via a television white space (TVWS) managerial link between the SC and the GLDB.

18. The method of embodiments 16 or 17, wherein the processing unit is configured to communicate with the SC to obtain, from the GLDB via the TVWS managerial link, the guaranteed protection for the WTRU from the agreed upon level of interference from the other WTRUs that obtain the white space resources directly from the GLDB.

19. The WTRU of any one of embodiments 12-18, further comprising circuitry configured to establish a first link with the geo-location database for communication with the geo-location database in the first mode, the first link being a link that uses one of regulation defined by the Federal Communications Commission (FCC), regulation defined by the Office of Communications (OFCOM) or a protocol defined by Protocol to Access White Space Database (PAWS).

20. The WTRU of any one of embodiments 13-19, further comprising circuitry configured to establish a second link to communicate with the SC in the second mode.

21. The WTRU of any one of embodiments 12-20, wherein the WTRU is a white space device (WSD).

22. A method for a requesting system to obtain shared spectrum for use by one or more WTRUs, the method comprising transmitting, to a shared spectrum manager (SSM), a spectrum request for an assignment of shared spectrum to use for wireless communications.

23. The method of embodiment 22, wherein the spectrum request includes information about a bandwidth requirement for the requested assignment of the shared spectrum and at least one characteristic regarding a quality of access for wireless communications on the shared spectrum.

24. The method of embodiments 22 or 23, further comprising receiving, in response to the spectrum request, a spectrum assignment response that includes an assignment of the shared spectrum for one or more WTRUs to use for wireless communications that meets the bandwidth requirement and the at least one characteristic regarding the quality of access included in the spectrum request.

25. The method of any one of embodiments 23 or 24, wherein the bandwidth requirement includes one of a specific bandwidth that the one or more WTRUs will utilize or an amount of spectrum that the one or more WTRUs will utilize.

26. The method of any one of embodiments 23-25, wherein the at least one characteristic regarding the quality of access includes at least one of a minimum level of quality of service for the requested assignment or an indication that the one or more WTRUs do not require any minimum level of quality of access for the requested assignment, a range of acceptable prices that the requesting system is willing to pay for the assignment of spectrum, a desired maximum transmission power for wireless communications on the requested spectrum, a duration of time over which requesting system is requesting to use the requested spectrum, or a required coverage or a required geographical range of operation.

27. The method of any one of embodiments 24-26, wherein the spectrum assignment response includes a cost associated with using the assignment of the shared spectrum.

28. The method of any one of embodiments 24-27, wherein the spectrum assignment response further includes at least one parameter associated with the assignment of the shared spectrum, the at least one parameter including at least one of a maximum power for transmitting on the shared spectrum, information about a requirement for the one or more WTRUs to sense the shared spectrum, at least one rule regarding conditions with respect to which the one or more WTRUs are required to evacuate the shared spectrum, or overall duration of the assignment of the shared spectrum.

29. The method of any one of embodiments 24-27, wherein the requesting system is further configured to transmit to the SSM, in response to the spectrum assignment response, a spectrum use indicator that indicates to the SSM that the one or more WTRUs have begun using the allocated shared spectrum for communications.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:
1. A method of spectrum coordination comprising:
a spectrum coordinator receiving a spectrum request from a cognitive radio system (CRS) that the spectrum coordinator supports, the spectrum request including a minimum protection requirement for the CRS and network device location information, the minimum protection requirement including a required availability time;
the spectrum coordinator determining protection criteria for the CRS based on the minimum protection requirement received from the CRS; and
the spectrum coordinator sending the protection criteria for the CRS and the network device location information to a geo-location database (GLDB) for use in assigning shared spectrum to other CRSs that the spectrum coordinator does not support, wherein the protection criteria are for use by the GLDB, along with protection criteria for incumbent users of the shared spectrum, to allocate spectrum for requests by other CRSs that obtain spectrum directly from the GLDB in a manner that protects the CRSs supported by the spectrum coordinator from interference.

2. The method of claim 1, further comprising the spectrum coordinator sending a registration request to the GLDB including information about the geographic location of CRSs that the spectrum coordinator supports.

3. The method of claim 1, wherein the minimum protection requirement further includes a minimum bandwidth and a maximum interference level.

4. The method of claim 1, further comprising the spectrum coordinator allocating shared spectrum to the CRS that the spectrum coordinator supports with a specific quality of service (QoS) guarantee based at least on the minimum protection requirement.

5. The method of claim 4, further comprising the spectrum coordinator sending information about the allocated shared spectrum to the CRS along with a validity time at which the allocated shared spectrum will become available for use by the CRS.

6. The method of claim 1, wherein the minimum protection requirement further includes a QoS during the required availability time.

7. The method of claim 6, further comprising the spectrum coordinator sending usage parameters to the GLDB based on the minimum protection requirement.

8. The method of claim 4, further comprising the spectrum coordinator communicating actual spectrum usage of the allocated shared spectrum to the GLDB, indicating to the GLDB to store and use the protection criteria.

9. The method of claim 1, wherein the network device location information is location information for one of a base station, a wireless router, a Node B, an eNode B, a Home Node B, or a Home eNode B.

10. A wireless transmit/receive unit (WTRU) comprising:
a processing unit configured to:
communicate with a spectrum coordinator (SC) to obtain white space resources from the SC that are provided by a geo-location database (GLDB), via a television white space (TVWS) managerial link between the SC and the GLDB, in a first mode,
communicate with the SC to obtain, from the GLDB via the TVWS, a guarantee of protection from an agreed upon level of interference from other WTRUs that obtain white space resources from the SC, other WTRUs that obtain white space resources directly from the GLDB, and other WTRUs that obtain white space resources from a neighbour SC; and
communicate directly with the GLDB to obtain the white space resources that are provided by the GLDB in a second mode; and
a transceiver configured to perform wireless communication using the white space resources obtained from the SC in the first mode or directly from the GLDB in the second mode.

11. The WTRU of claim 10, wherein the guarantee of protection for the WTRU from the agreed upon level of interference from the other WTRUs that obtain the white space resources from the neighbour SC is obtained via a link between the SC and the neighbour SC.

12. The WTRU of claim 10, further comprising circuitry configured to establish a first link with the geo-location database for communication with the geo-location database in the first mode, the first link being a link that uses one of regulation defined by the Federal Communications Commission (FCC), regulation defined by the Office of Communications (OFCOM) or a protocol defined by Protocol to Access White Space Database (PAWS).

13. The WTRU of claim 10, further comprising circuitry configured to establish a second link to communicate with the SC in the second mode.

14. The WTRU of claim 10, wherein the WTRU is a white space device (WSD).

15. A method for a requesting system to obtain shared spectrum for use by one or more WTRUs, the method comprising:
transmitting, to a shared spectrum manager (SSM), a spectrum request for an assignment of shared spectrum to use for wireless communications, the spectrum request including a minimum protection requirement for the shared spectrum and network device location information, the minimum protection requirement including a required availability time; and
receiving, in response to the spectrum request, a spectrum assignment response that includes an assignment of the shared spectrum for one or more WTRUs to use for wireless communications that meets the minimum protection requirement included in the spectrum request,
wherein the spectrum request includes a characteristic regarding a quality of access that comprises at least one of:
a minimum level of quality of service for a requested assignment of shared spectrum or an indication that the one or more WTRUs do not require any minimum level of quality of access for the requested assignment,
a range of acceptable prices that the requesting system is willing to pay for the assignment of shared spectrum,
a desired maximum transmission power for wireless communications on the requested spectrum,
a duration of time over which requesting system is requesting to use the requested spectrum, or
a required coverage or a required geographical range of operation.

16. The method of claim 15, wherein the spectrum request includes a plurality of minimum protection requirements that comprise a minimum bandwidth and a maximum interference level.

17. The method of claim 15, wherein the spectrum assignment response includes a cost associated with using the assignment of the shared spectrum.

18. The method of claim 15, wherein the spectrum assignment response further includes at least one parameter associated with the assignment of the shared spectrum, the at least one parameter including at least one of a maximum power for transmitting on the shared spectrum, information about a requirement for the one or more WTRUs to sense the shared spectrum, at least one rule regarding conditions with respect to which the one or more WTRUs are required to evacuate the shared spectrum, or overall duration of the assignment of the shared spectrum.

19. The method of claim 15, further comprising transmitting to the SSM, in response to the spectrum assignment response, a spectrum use indicator that indicates to the SSM that the one or more WTRUs have begun using the allocated shared spectrum for communications.

* * * * *